United States Patent
Okamura et al.

(10) Patent No.: US 8,229,016 B2
(45) Date of Patent: Jul. 24, 2012

(54) MIMO RECEIVER AND MIMO COMMUNICATION SYSTEM

(75) Inventors: Shutai Okamura, Osaka (JP); Masayuki Orihashi, Kanagawa (JP); Takaaki Kishigami, Tokyo (JP); Yutaka Murakami, Osaka (JP)

(73) Assignee: Panasonic Corporation, Osaka (JP)

(*) Notice: Subject to any disclaimer, the term of this patent is extended or adjusted under 35 U.S.C. 154(b) by 818 days.

(21) Appl. No.: 12/294,804

(22) PCT Filed: Mar. 30, 2007

(86) PCT No.: PCT/JP2007/057216
§ 371 (c)(1),
(2), (4) Date: Sep. 26, 2008

(87) PCT Pub. No.: WO2007/114374
PCT Pub. Date: Oct. 11, 2007

(65) Prior Publication Data
US 2010/0172421 A1 Jul. 8, 2010

(30) Foreign Application Priority Data
Mar. 31, 2006 (JP) ................. 2006-099973
Mar. 28, 2007 (JP) ................. 2007-085225

(51) Int. Cl.
H04L 27/28 (2006.01)
H04L 27/06 (2006.01)
(52) U.S. Cl. ...................... 375/267; 375/346
(58) Field of Classification Search .............. 375/267, 375/346, 347, 316, 349; 455/101
See application file for complete search history.

(56) References Cited

U.S. PATENT DOCUMENTS

| | | | | |
|---|---|---|---|---|
| 6,137,788 A * | 10/2000 | Sawahashi et al. | ........... | 370/342 |
| 2001/0053143 A1* | 12/2001 | Li et al. | ........... | 370/344 |
| 2002/0067761 A1* | 6/2002 | Kong et al. | ........... | 375/148 |
| 2003/0067993 A1* | 4/2003 | Viswanathan | ........... | 375/267 |
| 2004/0082356 A1* | 4/2004 | Walton et al. | ........... | 455/522 |
| 2004/0142665 A1* | 7/2004 | Papathanasion et al. | ....... | 455/101 |
| 2004/0156328 A1* | 8/2004 | Walton et al. | ........... | 370/313 |

(Continued)

FOREIGN PATENT DOCUMENTS

CN 1523769 8/2004

(Continued)

OTHER PUBLICATIONS

Lan Zhao and V.K. Dubey "Detection Schemes for Space-Time Block Code and Spatial Multiplexing Combined System", Nanyang Technological University, Singapore, Jan. 2005, IEEE.*

(Continued)

*Primary Examiner* — Aristocratis Fotakis
(74) *Attorney, Agent, or Firm* — Dickinson Wright PLLC

(57) ABSTRACT

An MIMO receiver and MIMO communication system which can have a small hardware scale even if the number of antennas used for MIMO communication. In a radio communication device (200), a receiving section (220) receives a spatially multiplexed signal generated by mutually-different and spatially multiplexing transmission signals, a first signal demultiplexing section (230) subjects a linear operation to the received spatial multiplexed signal to demultiplex the spatial multiplexed signal, and a second signal demultiplexing section (240) demultiplexer the demultiplexed spatially multiplexed signal into the transmission signals. When the received signal is demultiplexed by a single demultiplexing, as the number of multiplexed spatial multiplexed signal increases, the demultiplexer becomes complicated, and the hardware scale increases. When the received signal is demultiplexed by a plurality of demultiplexings, the hardware scale is relatively small.

4 Claims, 36 Drawing Sheets

U.S. PATENT DOCUMENTS

| | | | |
|---|---|---|---|
| 2004/0165675 A1 | 8/2004 | Ito | |
| 2004/0184398 A1* | 9/2004 | Walton et al. | 370/203 |
| 2005/0031050 A1 | 2/2005 | Kim | |
| 2005/0135500 A1* | 6/2005 | Nam et al. | 375/267 |
| 2005/0249306 A1* | 11/2005 | Chae et al. | 375/267 |
| 2006/0045200 A1* | 3/2006 | Bocquet | 375/267 |
| 2006/0120478 A1* | 6/2006 | Kim et al. | 375/267 |
| 2007/0098103 A1 | 5/2007 | Murakami | |

FOREIGN PATENT DOCUMENTS

| | | |
|---|---|---|
| JP | 2004-364294 | 12/2004 |
| JP | 2006-504335 | 2/2006 |
| WO | 2005/053260 | 6/2005 |

OTHER PUBLICATIONS

S. Sfar, et al., "Optimal diversity-multiplexing tradeoff with group detection for MIMO systems," Jul. 2005, IEEE Transactions on Communications, vol. 53, Issue 7, p. 1178-1190, http://ieeexplore.ieee.org/ie15/26/31495/01468440.pdf?tp-Scisnumber=31495&arnumber 1468440&punumber=26.

V. Pammer, et al., "A Low Complexity Suboptimal MIMO Receiver: The Combined ZF-MLD Algorithm," Sep. 10, 2003, Personal, Indoor and Mobile Radio Communications, 2003. PIMRC 2003. 14th IEEE Proceedings on, vol. 3, pp. 2271-2275, http://ieeexplore.ieee.org/ie15/8905/28147/01259122.pdf?tp-&isnumber=28147&arnumber=1259122&punumben=8905.

G. J. Foschini, "Layered Space-Time Architecture for Wireless Communication in a Fading Environment When Using Multi-Element Antenna," Bell Labs Technical Journal, Autumn 1996, pp. 41-59.

John. G. Proakis, "Digital Communications Fourth Edition," Chap. 14, pp. 878-885 McGraw-Hill, 2001.

B. Vucetic and J. Yuan, "Space-Time Coding" Chap. 3, pp. 91-101, Wiley, Jun. 2003.

Y. Murakami et al., "MIMO System ni okeru Bubunbit-hantei wo riyoosita Yuudohantei-Hoohoo no Kento (Likelihood Detection Utilizing Decision of Partial Bits in MIMO Systems)," Technical Report of IEICE, IT2003-90, ISEC2003-130, WBS23003-208, pp. 97-102, Mar. 2004.

Chinese Office Action dated Nov. 9, 2011.

* cited by examiner

MIMO RECEIVER AND MIMO COMMUNICATION SYSTEM

TECHNICAL FIELD

The present invention relates to a MIMO receiving apparatus and MIMO communication system.

BACKGROUND ART

In recent years, there has been a remarkable increase in the demand for larger capacity and higher speed in radio communications, and much research has been conducted into methods of further improving the efficient utilization of limited frequency resources. Utilization of the space domain is drawing attention as one such method. Technologies that utilize the space domain include so-called space division multiplexing (SDM) transmission or MIMO (Multi-Input Multi-Output) technologies whereby different data sequences are transmitted to a terminal apparatus using same-time, same-frequency, same-code physical channels, by utilizing spatial orthogonality in a propagation path.

With MIMO technology, different signals transmitted simultaneously from a plurality of transmitting antennas using the same frequency band are received using a receiver equipped with a plurality of receiving antennas. With this system, system capacity is improved by having the receiver eliminate same-frequency interference by applying adaptive signal processing in the space domain, and detecting a transmitted signal.

Information on MIMO technology is disclosed in Non-patent Document 1, for example. Both the transmitter and receiver are equipped with a plurality of antenna elements, and spatial multiplexing transmission can be implemented in a propagation environment with low correlativity of received signals between antennas. In this case, different data sequences are transmitted from a plurality of antennas with which a transmitter is equipped using a same-time, same-frequency, same-code physical channel on an antenna-by-antenna basis, and a receiver demultiplexes and receives different sequences based on received signals at a plurality of antennas with which the receiver is equipped.

Information regarding the demultiplexing and reception method in this case is disclosed in Non-patent Document 2, for example. It is possible to use a means such as ZF (Zero Forcing), MMSE (Minimum Mean Square Error), MLD (Maximum Likelihood Detection), or an interference canceller, for transmission sequences from a plurality of radio transmitting apparatuses. In this way, it is possible to achieve faster radio communication without using M-ary modulation by employing a plurality of spatial modulation channels.

Also, in the case of an environment in which many scatterers are present between a transmitter and receiver under adequate S/N (signal to noise ratio) conditions, equipping the transmitter and the receiver with the same number of antennas makes possible an increase in communication speed proportional to the number of antennas.

Non-patent Document 1: G. J. Foschini, "Layered space-time architecture for wireless communication in a fading environment when using multi-element antennas," Bell Labs Tech. J., pp. 41-59, Autumn 1996

Non-patent Document 2: John G. Proakis, "Digital Communications Fourth Edition," Chap. 14, McGrawHill, 2001

DISCLOSURE OF INVENTION

Problems to be Solved by the Invention

In order to improve the transmission speed using MIMO technology, the number of transmitting antennas and receiving antennas may be increased, increasing the number of signals simultaneously transmitted by spatial multiplexing transmission. However, when the degree of multiplexing increases, the number of possible signal points in received signal determination increases exponentially, and the hardware scale of a receiving terminal increases. For example, if the degree of multiplexing of spatially multiplexed signals modulated by 16QAM is increased from 2 to 4, when MLD is used as the demultiplexing method, diversity gain doubles, but the possible number of signal points in received signal determination increases from 256 to 65,536, and implementation is difficult with a practical hardware scale.

The present invention has been implemented taking into account the problems described above, and it is an object of the present invention to provide a MIMO receiving apparatus and MIMO communication system that enable the hardware scale to be kept small even if the number of antennas used for MIMO communication increases.

Means for Solving the Problems

A MIMO receiving apparatus of the present invention employs a configuration having: a receiving section that receives a spatially multiplexed signal in which mutually different transmission signals are spatially multiplexed; a first signal demultiplexing section that executes linear computation on a received spatially multiplexed signal and demultiplexes the spatially multiplexed signal; and a second signal demultiplexing section that demultiplexes the demultiplexed spatially multiplexed signal into individual transmission signals.

A MIMO communication system of the present invention is equipped with: a radio transmitting apparatus having a transmission signal composing section that composes mutually different transmission signals, and a transmitting section that transmits the transmission signals via different antennas; and a radio receiving apparatus having a receiving section that receives a degree-of-multiplexing-N spatially multiplexed signal in which the transmission signals are spatially multiplexed, a first signal demultiplexing section that executes linear computation on a received spatially multiplexed signal and demultiplexes that signal into a group of spatially multiplexed signals composed of a number of the transmission signals smaller than the degree-of-multiplexing N, a second signal demultiplexing section that demultiplexes a spatially multiplexed signal of each group into individual transmission signals contained in that spatially multiplexed signal, and a signal processing section that processes the demultiplexed transmission signals.

ADVANTAGEOUS EFFECT OF THE INVENTION

According to the present invention, a MIMO receiving apparatus and MIMO communication system are provided that enable the hardware scale to be kept small even if the number of antennas used for MIMO communication increases.

BEST MODE FOR CARRYING OUT THE INVENTION

Embodiments of the present invention will now be described in detail with reference to the accompanying drawings. In the embodiments, identical configuration elements are assigned the same reference codes, and duplicate descriptions are omitted.

(Embodiment 1)

Figure 1:
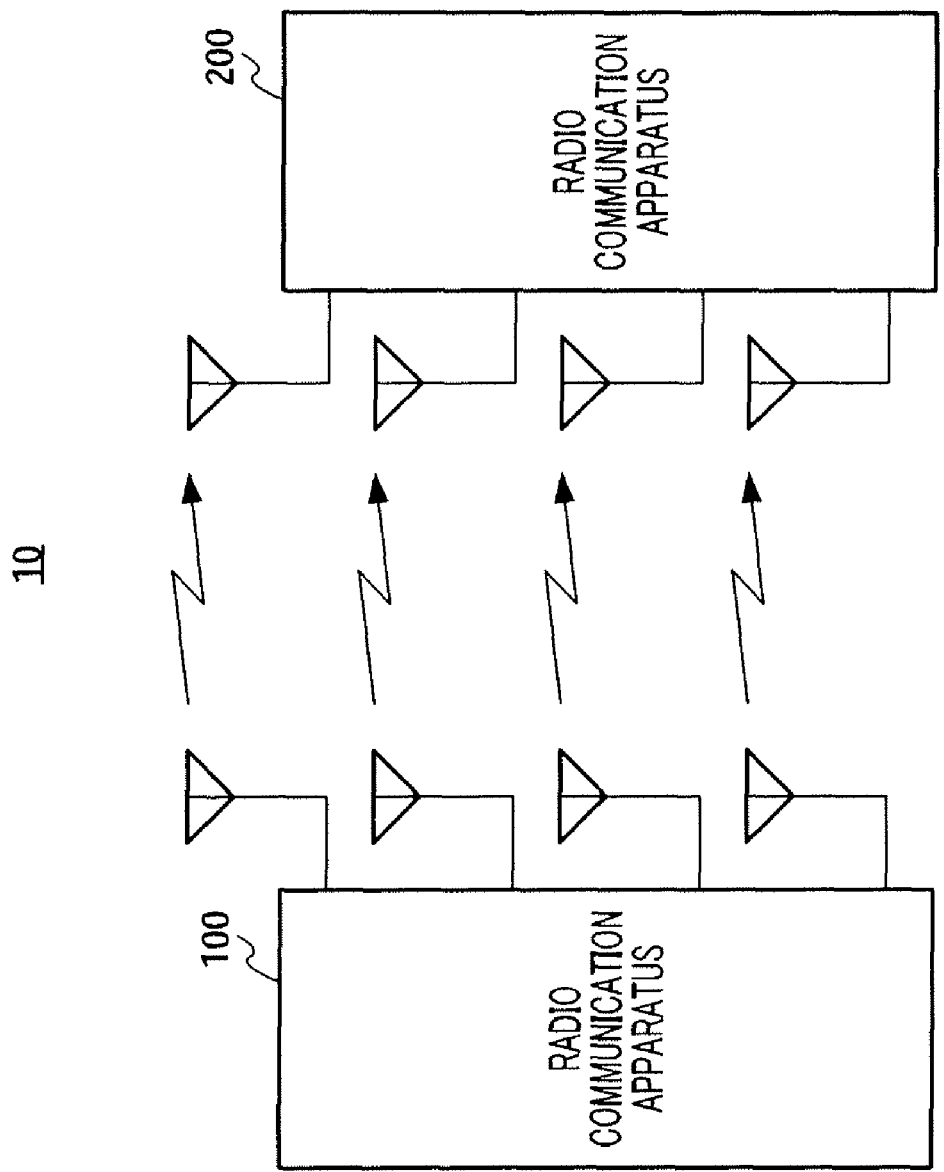
FIG. 1 is a drawing showing a configuration of a radio communication system according to Embodiment 1 of the present invention.

As shown in FIG. 1, radio communication system 10 according to Embodiment 1 of the present invention has radio communication apparatus 100 and radio communication apparatus 200, and transmits and receives spatially multiplexed signals by means of a MIMO communication method or the like, for example. FIG. 1 shows a case in which radio communication apparatus 100 and radio communication apparatus 200 each have four antennas, radio communication apparatus 100 transmits a spatially multiplexed signal using four antennas, and radio communication apparatus 200 receives a spatially multiplexed signal using four antennas. That is to say, radio communication apparatus 100 transmits a transmit signal from each antenna, and these transmit signals are spatially multiplexed until they reach radio communication apparatus 200. Radio communication apparatus 200 receives a spatially multiplexed signal propagated via a different propagation path at each antenna.

Figure 2:
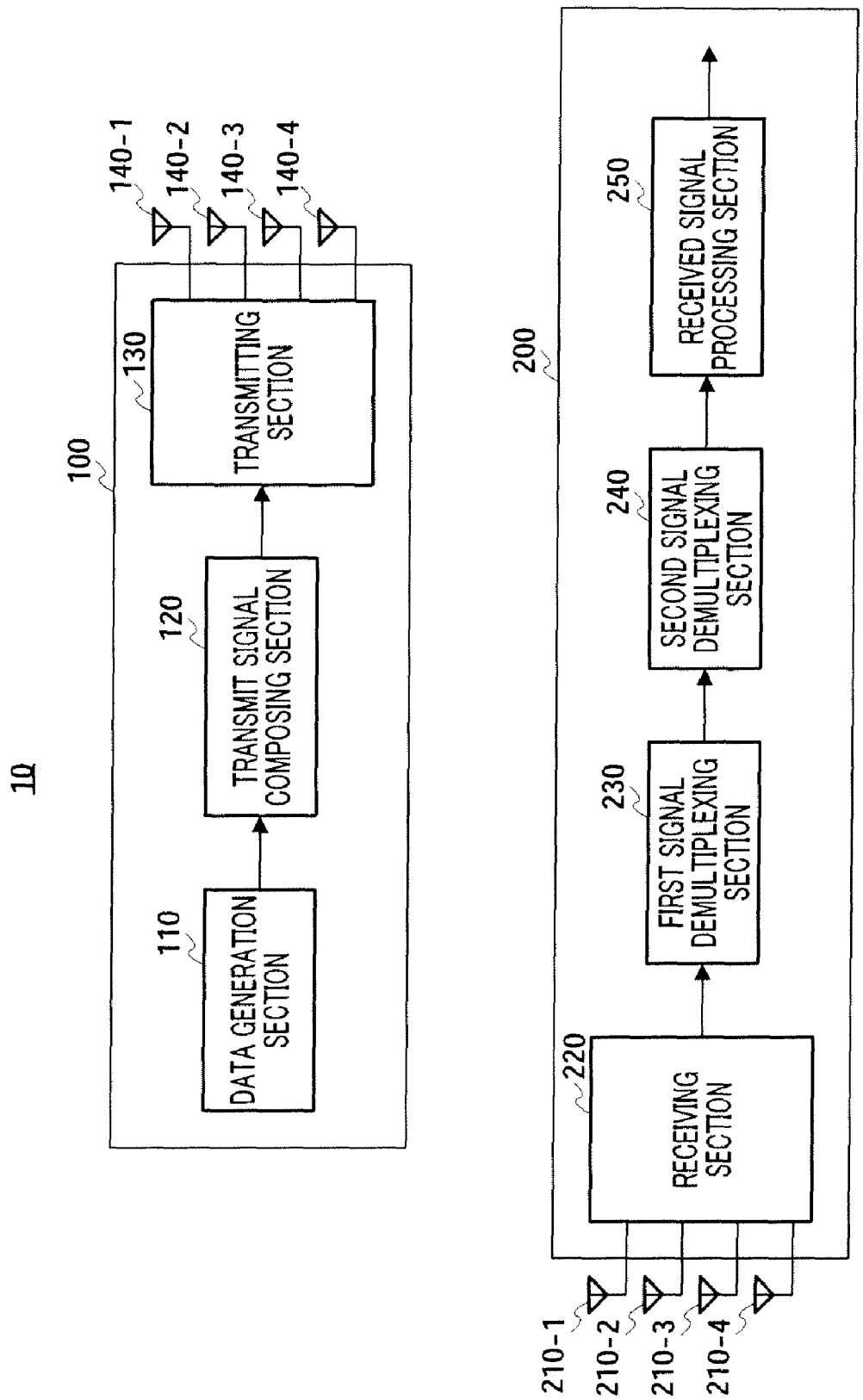
FIG. 2 is a drawing showing the detailed configuration of the radio communication system in FIG. 1.

FIG. 2 is a drawing showing the general configuration of radio communication apparatus 100 and radio communication apparatus 200. As shown in FIG. 2, radio communication apparatus 100 has data generation section 110, transmit signal composing section 120, transmitting section 130, and plurality of antennas 140-1 through 140-N (here, N=4). On the other hand, radio communication apparatus 200 has plurality of antennas 210-1 through 210-M (where M≧N; here, M=4), receiving section 220, first signal demultiplexing section 230, second signal demultiplexing section 240, and received signal processing section 250.

Data generation section 110 generates transmit data and outputs this to transmit signal composing section 120.

From one line of transmit data generated by data generation section 110, transmit signal composing section 120 generates N transmit signals corresponding to the number of antennas 140.

Transmitting section 130 executes predetermined radio transmission processing (D/A conversion, up-conversion, and so forth) on each of the N transmit signals generated by transmit signal composing section 120, and transmits each post-radio-transmission-processing transmit signal from a different antenna 140.

Receiving section 220 receives a degree-of-multiplexing-N spatially multiplexed signal in which mutually different transmission signals (radio communication apparatus 100 transmit signals) are spatially multiplexed via a plurality of propagation paths. Receiving section 220 executes radio reception processing (down-conversion, A/D conversion, and so forth) for each spatially multiplexed signal received at an antenna 210, and outputs the post-radio-reception-processing spatially multiplexed signals to first signal demultiplexing section 230.

First signal demultiplexing section 230 executes first demultiplexing processing, which is rough demultiplexing processing by means of predetermined linear computation, on the post-radio-reception-processing spatially multiplexed signals.

Second signal demultiplexing section 240 executes second demultiplexing processing, which is precision demultiplexing processing, on the signals that have undergone first demultiplexing processing, and obtains N received signals corresponding to the transmit signals transmitted from radio communication apparatus 100.

Received signal processing section 250 executes received signal processing on each of the received signals from second signal demultiplexing section 240, and outputs receive data.

Normally, when a spatially multiplexed signal is demultiplexed, demultiplexing into received signals is performed by one-stage demultiplexing processing, but with the present invention, rough demultiplexing is first performed as a first stage, and precision demultiplexing processing is performed as a second stage. By dividing demultiplexing processing conventionally performed in one stage into a plurality of stages becoming progressively more precise, even if the number of antennas of the radio communication apparatuses (100, 200) increases—that is, the degree of spatially-multiplexed-signal multiplexing increases—the amount of processing of one stage decreases, and a conventional demultiplexing apparatus can be used in each stage, enabling development costs to be reduced. In particular, when a received signal is demultiplexed by one-stage demultiplexing processing, the demultiplexing apparatus becomes more complicated as the degree of spatially-multiplexed-signal multiplexing increases, and the hardware scale increases, but dividing the demultiplexing processing into a plurality of stages enables the hardware scale to be kept relatively small.

Figure 3:
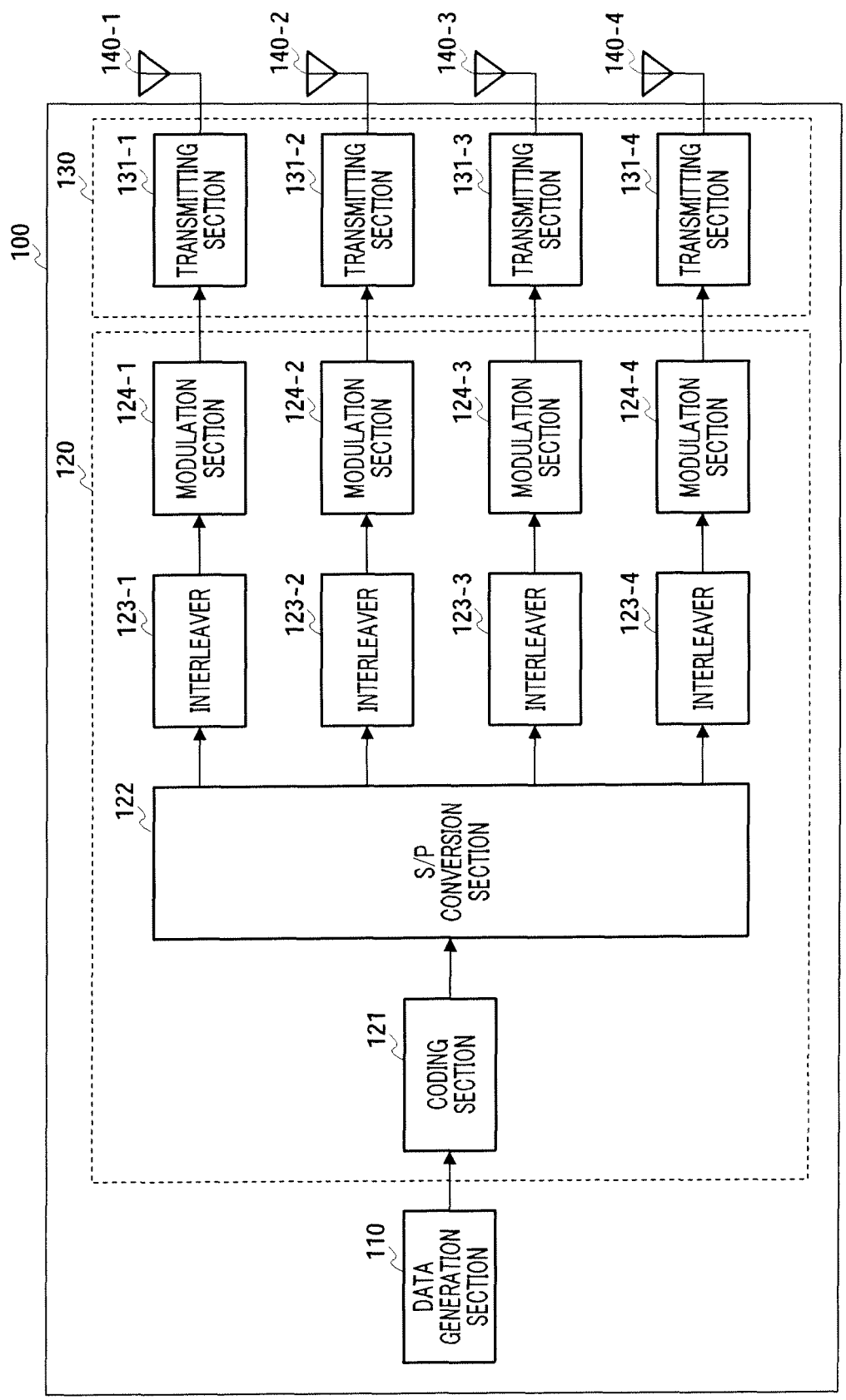
FIG. 3 is a block diagram showing a configuration of a radio communication apparatus (transmitting-side) in FIG. 2.

FIG. 3 is a drawing showing the detailed configuration of radio communication apparatus 100. As shown in FIG. 3, transmit signal composing section 120 has coding section 121, S/P conversion section 122, interleavers 123-1 through 123-4, and modulation sections 124-1 through 124-4. Transmitting section 130 has transmitting sections 131-1 through 131-4.

Coding section 121 executes error correction coding using a predetermined coding rate, and outputs post-error-correction-coding transmit data (coded data sequence c(n)) to S/P conversion section 122.

S/P conversion section 122 has post-error-correction-coding transmit data as input, and generates parallel data sequences by executing serial/parallel conversion. Here, since a different transmit signal is transmitted from each of antennas 140-1 through 140-4, four parallel data sequences are generated. In this embodiment, these parallel data sequences (transmission sequences $x_n(k)$, where n=1 to 4) become transmit signals. S/P conversion section 122 outputs each of the four generated parallel data sequences to a different one of interleavers 123-1 through 123-4.

Interleavers 123 perform interleaving on their respective input parallel data sequences, and output the interleaved parallel data sequences to modulation sections 124.

Modulation sections 124-1 through 124-4 perform modulation processing—that is, processing to make a bit sequence a baseband signal mapped to a modulation signal on the IQ plane using predetermined M-ary modulation—on the input interleaved parallel data sequences, and output the post-modulation-processing parallel data sequences to transmitting section 130 as transmit signals.

Transmitting section 130 executes predetermined radio transmission processing (D/A conversion, up-conversion, and so forth) on each transmit signal generated by transmit signal composing section 120, and transmits each post-radio-transmission-processing transmit signal from a different antenna 140.

Figure 4:
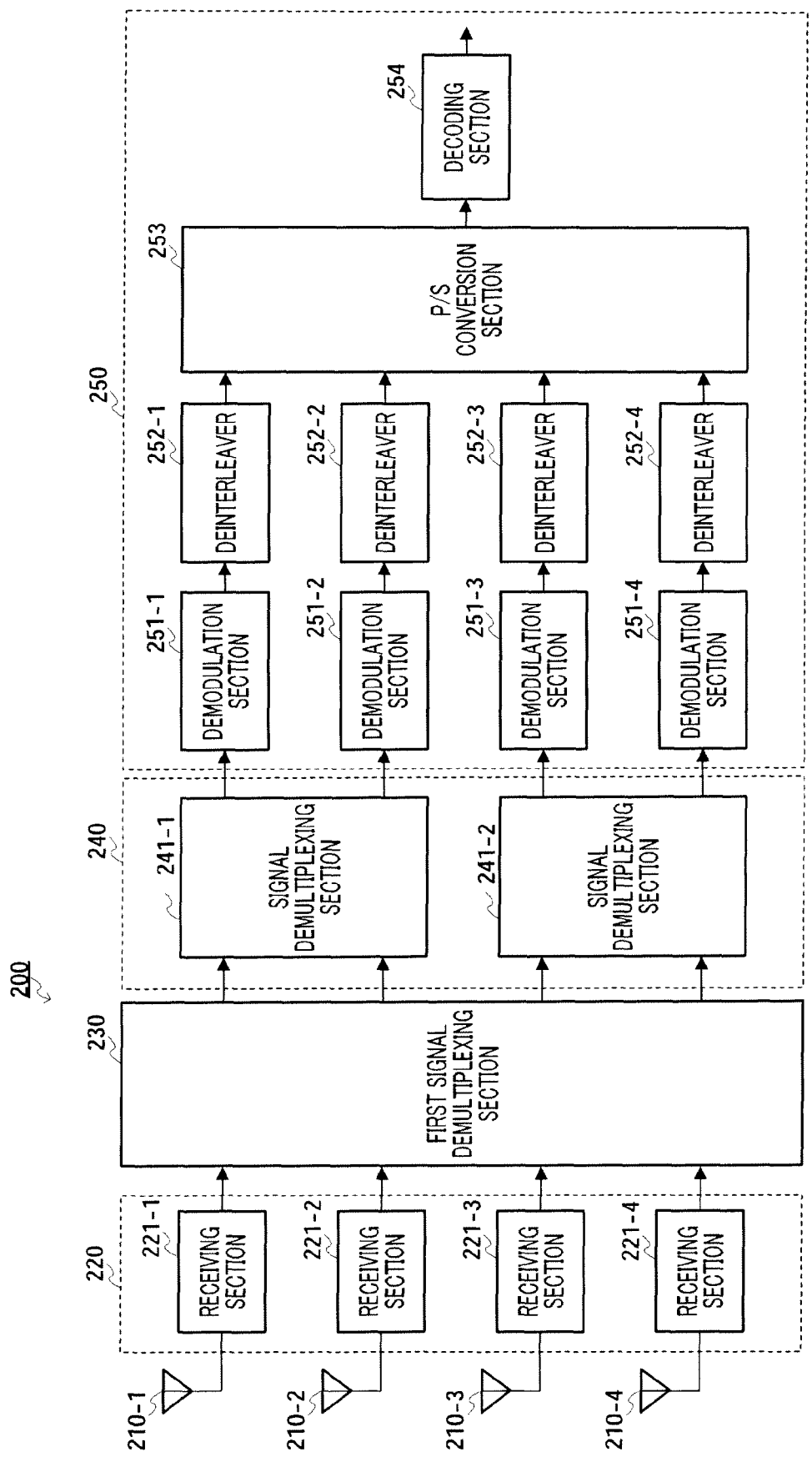
FIG. 4 is a block diagram showing a configuration of a radio communication apparatus (receiving-side) in FIG. 2.

FIG. 4 is a drawing showing the detailed configuration of radio communication apparatus 200. As shown in FIG. 4, receiving section 220 has receiving sections 221-1 through 221-4. Second signal demultiplexing section 240 has two signal demultiplexing sections 241-1 and 241-2. Received signal processing section 250 has demodulation sections 251-1 through 251-4, deinterleavers 252-1 through 252-4, P/S conversion section 253, and decoding section 254.

Receiving sections 221-1 through 221-4 execute predetermined radio reception processing (down-conversion, A/D conversion, and so forth) on spatially multiplexed signals received via respective corresponding antennas 210, and output a post-radio-reception-processing spatially multiplexed signal to first signal demultiplexing section 230.

First signal demultiplexing section 230 executes linear computation on the (degree-of-multiplexing-N) spatially multiplexed signal from receiving section 220, performs demultiplexing into spatially multiplexed signal groups composed of a number of transmission signals (radio communication apparatus 100 transmit signals) smaller than degree-of-multiplexing N, and outputs these groups to second signal demultiplexing section 240.

Second signal demultiplexing section 240 has the spatially multiplexed signal groups demultiplexed by first signal demultiplexing section 230 as input, and demultiplexes a spatially multiplexed signal of each group into transmission signals contained in that spatially multiplexed signal. Here, second signal demultiplexing section 240 has a number of signal demultiplexing sections 241 corresponding to the number of groups into which the input signals were divided by first signal demultiplexing section 230 (in this embodiment, two signal demultiplexing sections 241-1 and 241-2), and each signal demultiplexing section 241 demultiplexes a spatially multiplexed signal of one group into the transmission signals contained in that spatially multiplexed signal.

Demodulation sections 251 perform demodulation processing corresponding to the radio communication apparatus 100 modulation method on each transmission signal (radio communication apparatus 100 transmit signal) demultiplexed by second signal demultiplexing section 240.

Deinterleavers 252 perform deinterleaving in a pattern corresponding to the radio communication apparatus 100 interleaving pattern on each post-demodulation-processing transmission signal.

P/S conversion section 253 performs parallel/serial conversion that is the reverse of the radio communication apparatus 100 serial/parallel conversion on the deinterleaved transmission signals, and outputs a serial data sequence.

Decoding section 254 executes decoding processing corresponding to the radio communication apparatus 100 coding method on the serial data sequence, and outputs receive data corresponding to the radio communication apparatus 100 transmit data.

Next, the operation of radio communication apparatus 100 and radio communication apparatus 200 in radio communication system 10 having the above configuration will be described.

Data generation section 110 generates data sequence z(n) that is transmit data to be transmitted to radio communication apparatus 200. Coding section 121 performs error correction coding on data sequence z(n) using a predetermined coding rate, and generates coded data sequence c(n).

S/P conversion section 122 converts coded data sequence c(n) to transmission sequences $x_n(k)$ (where n=1 to 4) comprising four parallel data sequences. Here, a column vector having four elements of transmission sequence $x_n(k)$ is written as x(k).

Transmission sequences $x_n(k)$ (where n=1 to 4) are then interleaved by interleavers 123 on a sequence-by-sequence basis, and undergo modulation processing by modulation sections 124 to become baseband signals. Transmission sequences $x_n(k)$ that have become baseband signals undergo frequency conversion and band-limiting processing in transmitting section 130, and are transmitted from antennas 140 as transmit signals that are high-frequency signals after amplification.

It is also possible to transmit using a number of antennas greater than the number of transmission sequences. This can be implemented using a method whereby a transmission sequence is multiplied by a directivity weight that forms a desired directivity, or a method whereby space time coding such as STBC (Space Time Block Coding) is executed. Here, a case is described in which the number of antennas used for transmission by radio communication apparatus 100 and the number of transmission sequences are the same.

A degree-of-multiplexing-N (where N=4) spatially multiplexed signal received by antennas 210 undergoes orthogonal detection after amplification and frequency conversion by receiving sections 221-1 through 221-4, is converted to a baseband signal on the IQ plane, and is output to first signal demultiplexing section 230 as received signal y(k) represented by a complex digital signal using an A/D converter. In this description, it is assumed that frequency synchronization, phase synchronization, and symbol synchronization have been established.

Here, y(k) is a column vector containing received signals received via antennas 210 as elements. This received signal y(k)—that is, a received signal at discrete time k obtained in a flat fading propagation environment corresponding to transmission sequence $x_n(k)$ from radio communication apparatus 100 is expressed by Equation (1).

$$y(k) = H(k)x(k) + n(k) \quad (1)$$

H(k) in Equation (1) indicates propagation path fluctuation received by radio communication apparatus 100 transmission sequence $x_n(k)$, and is a matrix comprising (number of radio communication apparatus 200 receiving antennas: 4) rows × (number of radio communication apparatus 100 transmitting antennas: 4) columns. Here, n(k) indicates a noise vector having four elements added at the time of reception by radio communication apparatus 200 antennas 210.

Writing Equation (1) in detail gives Equation (2).

$$\begin{bmatrix} y_1(k) \\ y_2(k) \\ y_3(k) \\ y_4(k) \end{bmatrix} = \begin{bmatrix} h_{11}(k) & h_{12}(k) & h_{13}(k) & h_{14}(k) \\ h_{21}(k) & h_{22}(k) & h_{23}(k) & h_{24}(k) \\ h_{31}(k) & h_{32}(k) & h_{33}(k) & h_{34}(k) \\ h_{41}(k) & h_{42}(k) & h_{43}(k) & h_{44}(k) \end{bmatrix} \begin{bmatrix} x_1(k) \\ x_2(k) \\ x_3(k) \\ x_4(k) \end{bmatrix} + \begin{bmatrix} n_1(k) \\ n_2(k) \\ n_3(k) \\ n_4(k) \end{bmatrix} \quad (2)$$

H(k) row-i, column-j matrix element $h_{ij}$ indicates propagation path fluctuation on a propagation path when a signal transmitted from j'th antenna 140 of radio communication apparatus 100 is received by i'th antenna 210 of radio communication apparatus 200.

First signal demultiplexing section 230 transforms Equation (2) into Equation (3) by performing linear computation on received signal y(k) using propagation path fluctuation estimate B for propagation path fluctuation H estimated by utilizing a known pilot signal or the like transmitted from radio communication apparatus 100.

$$\begin{bmatrix} v_1(k) \\ v_2(k) \\ v_3(k) \\ v_4(k) \end{bmatrix} = \begin{bmatrix} g_{11}(k) & g_{12}(k) & 0 & 0 \\ g_{21}(k) & g_{22}(k) & 0 & 0 \\ 0 & 0 & g_{33}(k) & g_{34}(k) \\ 0 & 0 & g_{43}(k) & g_{44}(k) \end{bmatrix} \begin{bmatrix} x_1(k) \\ x_2(k) \\ x_3(k) \\ x_4(k) \end{bmatrix} + \begin{bmatrix} e_1(k) \\ e_2(k) \\ e_3(k) \\ e_4(k) \end{bmatrix} \quad (3)$$

First signal demultiplexing section 230 can use any linear computation that transforms Equation (2) into Equation (3). An example of linear computation executed by first signal demultiplexing section 230 is shown below.

First, in step 1, the following operations are executed:

$$y_1(k) - \frac{h_{14}(k)}{h_{44}(k)} y_4(k), \quad y_2(k) - \frac{h_{24}(k)}{h_{44}(k)} y_4(k), \quad y_{31}(k) - \frac{h_{34}(k)}{h_{44}(k)} y_4(k)$$

and Equation (4) is obtained as a result.

$$\begin{bmatrix} y_1^1(k) \\ y_2^1(k) \\ y_3^1(k) \\ y_4^1(k) \end{bmatrix} = \begin{bmatrix} h_{11}^1(k) & h_{12}^1(k) & h_{13}^1(k) & 0 \\ h_{21}^1(k) & h_{22}^1(k) & h_{23}^1(k) & 0 \\ h_{31}^1(k) & h_{32}^1(k) & h_{33}^1(k) & 0 \\ h_{41}^1(k) & h_{42}^1(k) & h_{43}^1(k) & h_{44}^1(k) \end{bmatrix} \begin{bmatrix} x_1(k) \\ x_2(k) \\ x_3(k) \\ x_4(k) \end{bmatrix} + \begin{bmatrix} n_1^1(k) \\ n_2^1(k) \\ n_3^1(k) \\ n_4^1(k) \end{bmatrix} \quad (4)$$

In step 2, the following operations are executed:

$$y_1^1(k) - \frac{h_{13}^1(k)}{h_{33}^1(k)} y_3^1(k), \quad y_2^1(k) - \frac{h_{12}^1(k)}{h_{33}^1(k)} y_3^1(k), \quad y_{31}^1(k) - \frac{h_{34}(k)}{h_{44}(k)} y_4(k)$$

and Equation (5) is obtained as a result.

$$\begin{bmatrix} y_1^2(k) \\ y_2^2(k) \\ y_3^2(k) \\ y_4^2(k) \end{bmatrix} = \begin{bmatrix} h_{11}^2(k) & h_{12}^2(k) & 0 & 0 \\ h_{21}^2(k) & h_{22}^2(k) & 0 & 0 \\ h_{31}^2(k) & h_{32}^2(k) & h_{33}^2(k) & h_{34}^2(k)0 \\ h_{41}^2(k) & h_{42}^2(k) & h_{43}^2(k) & h_{44}^2(k) \end{bmatrix} \begin{bmatrix} x_1(k) \\ x_2(k) \\ x_3(k) \\ x_4(k) \end{bmatrix} + \begin{bmatrix} n_1^2(k) \\ n_2^2(k) \\ n_3^2(k) \\ n_4^2(k) \end{bmatrix} \quad (5)$$

In step 3, the following operations are executed:

$$y_3^2(k) - \frac{h_{31}^2(k)}{h_{11}^2(k)} y_1^2(k), \quad y_4^2(k) - \frac{h_{41}^2(k)}{h_{11}^2(k)} y_1^2(k)$$

and Equation (6) is obtained as a result.

$$\begin{bmatrix} y_1^3(k) \\ y_2^3(k) \\ y_3^3(k) \\ y_4^3(k) \end{bmatrix} = \begin{bmatrix} h_{11}^3(k) & h_{12}^3(k) & 0 & 0 \\ h_{21}^3(k) & h_{22}^3(k) & 0 & 0 \\ 0 & h_{32}^3(k) & h_{33}^3(k) & h_{34}^3(k) 0 \\ 0 & h_{42}^3(k) & h_{43}^3(k) & h_{44}^3(k) \end{bmatrix} \begin{bmatrix} x_1(k) \\ x_2(k) \\ x_3(k) \\ x_4(k) \end{bmatrix} + \begin{bmatrix} n_1^3(k) \\ n_2^3(k) \\ n_3^3(k) \\ n_4^3(k) \end{bmatrix} \quad (6)$$

In step 4, the following operations are executed:

$$y_3^3(k) - \frac{h_{32}^3(k)}{h_{12}^3(k)} y_1^3(k), \quad y_4^3(k) - \frac{h_{42}^3(k)}{h_{12}^3(k)} y_1^3(k)$$

and Equation (7) is obtained as a result.

$$\begin{bmatrix} y_1^4(k) \\ y_2^4(k) \\ y_3^4(k) \\ y_4^4(k) \end{bmatrix} = \begin{bmatrix} h_{11}^4(k) & h_{12}^4(k) & 0 & 0 \\ h_{21}^4(k) & h_{22}^4(k) & 0 & 0 \\ 0 & 0 & h_{33}^4(k) & h_{34}^4(k) 0 \\ 0 & 0 & h_{43}^4(k) & h_{44}^4(k) \end{bmatrix} \begin{bmatrix} x_1(k) \\ x_2(k) \\ x_3(k) \\ x_4(k) \end{bmatrix} + \begin{bmatrix} n_1^4(k) \\ n_2^4(k) \\ n_3^4(k) \\ n_4^4(k) \end{bmatrix} \quad (7)$$

By performing the linear computation in above steps 1 through 4 in this way, first signal demultiplexing section 230 obtains the expression shown in Equation (3). Here, if transmission sequences $x_1$ and $x_2$ are defined as a first group, and $x_3$ and $x_4$ are defined as a second group, it can be seen that $v_1$ and $v_2$ in Equation (3) contain only first group components (transmission signals), and $v_3$ and $v_4$ contain only second group components (transmission signals). That is to say, first signal demultiplexing section 230 performs a ZF (Zero Forcing) operation that eliminates interference between the two groups on a degree-of-multiplexing-4 spatially multiplexed signal, and performs demultiplexing into groups composed of two degree-of-multiplexing-2 spatially multiplexed signals. The linear computation in above steps 1 through 4 is ZF (Zero Forcing) computation, but computation is not performed up to a final stage of demultiplexing all the transmission signals contained in a spatially multiplexed signal as is usually done, but is halted prior to that.

The groups of spatially multiplexed signals demultiplexed by first signal demultiplexing section 230 are input to second signal demultiplexing section 240. In second signal demultiplexing section 240, the spatially multiplexed signals of each group are demultiplexed into the individual transmission signals contained in those spatially multiplexed signals. Specifically, $v_1(k)$ and $v_2(k)$ of the first group are input to signal demultiplexing section 241-1 and demultiplexed into $x_1(k)$ and $x_2(k)$ by signal demultiplexing section 241-1, and $v_3(k)$ and $v_4(k)$ of the second group are processed in a similar way by signal demultiplexing section 241-2.

In second signal demultiplexing section 240, ZF (Zero Forcing), MMSE (Minimum Mean Square Error), MLD (Maximum Likelihood Detection), or the like can be used as an algorithm for demultiplexing transmission signals contained in the spatially multiplexed signal groups. Using an MLD demultiplexing method enables diversity gain to be obtained (equivalent to diversity gain obtained in spatial multiplexing transmission with two transmitting-side antennas and two receiving-side antennas (2×2 spatial multiplexing transmission)).

Here, with 4×4 spatial multiplexing transmission, even if an attempt is made to demultiplex all transmission signals by one-stage demultiplexing processing by means of MLD, the amount of computation is extremely large, and therefore the processing time is lengthy and implementation with a practical hardware scale is difficult. However, by dividing the demultiplexing processing into two stages as described above, implementation with practical hardware becomes possible. That is to say, in first signal demultiplexing section 230 that performs first-stage demultiplexing processing, linear computation is executed on a spatially multiplexed signal, demultiplexing is performed into spatially multiplexed signal groups composed of a number of transmit signals smaller than spatially multiplexed signal degree-of-multiplexing N, and inter-group interference is eliminated.

Then, in second signal demultiplexing section 240 that performs second-stage demultiplexing processing, demultiplexing processing is performed using signals from which an interference signal from the other group has been eliminated by first signal demultiplexing section 230, and therefore, even with MLD used for second-stage signal demultiplexing, the number of signal point candidates in MLD can be reduced, making implementation with practical hardware possible. Furthermore, dividing the demultiplexing processing into two stages, while not enabling the diversity gain obtained by 4×4 spatial multiplexing transmission to be obtained, does enable the diversity gain obtained by 2×2 spatial multiplexing transmission to be obtained.

Transmission signals demultiplexed by second signal demultiplexing section 240 are demodulated by demodulation sections 251, deinterleaved by deinterleavers 252, and input to P/S conversion section 253. Specifically, first-group signal sequences $x_1(k)$ and $x_2(k)$ are converted from a symbol data sequence modulated by a predetermined modulation method to a bit data sequence by demodulation sections 251-1 and 251-2 respectively, and the bit data sequences obtained by demodulation sections 251-1 and 251-2 have their bit order restored by operations by de interleavers 252-1 and 252-2 that are the reverse of the interleaving executed on the transmitting side. The same kind of processing is also performed for second-group signal sequences $x_3(k)$ and $x_4(k)$.

The bit data sequences whose bit order has been restored by deinterleavers 252 undergo parallel/serial conversion by P/S conversion section 253, and are output as a serial data sequence. In decoding section 254, decoding processing corresponding to the coding method used by radio communication apparatus 100 is executed on the serial data sequence, and receive data corresponding to the radio communication apparatus 100 transmit data is output.

The demultiplexing algorithm in signal demultiplexing sections 241-1 and 241-2 of second signal demultiplexing section 240 may be the same in both signal demultiplexing sections 241-1 and 241-2, or may be changed for each in a fixed manner or adaptively according to the number of modulation multi-values of the transmission sequences, the number of received signals, or the like. For example, MLD could be used in the case of BPSK or QPSK having a small number of modulation multi-values, while a linear method such as MMSE could be used in the case of 16QAM or 64QAM having a large number of modulation multi-values.

Thus, according to this embodiment, in radio communication apparatus 200 that receives transmission signals transmitted from radio communication apparatus 100 via a plurality of antennas, spatially multiplexed signals received by the antennas are divided into a plurality of groups, and with those groups as individual units, first signal demultiplexing section 230 performs signal demultiplexing by means of ZF computation that eliminates inter-group interference. Then second signal demultiplexing section 240 performs demultiplexing into the transmission signals contained in each group. By this means, conventional circuitry configured to demultiplex a degree-of-multiplexing-2 spatially multiplexed signal, for example, can be used as it is for processing subsequent to first signal demultiplexing section 230.

As a result, in a radio communication apparatus handling reception of a spatially multiplexed signal with a plural degree of multiplexing, reception circuitry can be partially shared by different degrees of multiplexing, and the hardware scale of the radio communication apparatus can be reduced. Moreover, little circuitry needs to be newly developed to handle reception of a plural degree of multiplexing, enabling hardware development costs to be reduced.

With regard to processing subsequent to first signal demultiplexing section 230, since it is possible for reception decoding processing to be applied on an individual group basis, when there are a plurality of transmission sequences it is necessary ultimately to convert parallel data to serial data. However, in this embodiment, the configuration enables reception decoding processing to be performed simultaneously in parallel on a group-by-group basis. Therefore, input data to P/S conversion section 253 is not weighted, and no new buffer memory need be provided to store input data temporarily. Consequently, data processing delays can be kept short, and an increase in hardware due to memory expansion can be suppressed.

Also, better reception characteristics can be obtained than by demultiplexing a spatially multiplexed signal into transmission signals in one stage by means of ZF, MMSE, or the like. The reason is that, while diversity gain due to reception by a plurality of antennas is lost when a spatially multiplexed signal is subjected to signal demultiplexing by means of linear processing such as ZF or MMSE, when this configuration is used, MLD can be employed on a group-by-group basis after demultiplexing into groups is performed by first signal demultiplexing section 230, enabling 2-branch diversity gain to be obtained.

If a degree-of-multiplexing-4 signal is demultiplexed directly by means of MLD in 4×4 spatial multiplexing transmission, 4-branch diversity gain is obtained, but when a modulation method with many signal points such as 16QAM or 64QAM is used, the number of signal points increases dramatically, making implementation with a practical hardware scale difficult.

Also, if transmission is performed after multiplication by a transmission weight based on channel matrix singular value decomposition, eigenvalue decomposition of a matrix comprising the product of a channel matrix and its Hermitian conjugate, or the like, optimal reception characteristics can be obtained on the receiving side without using MLD, but implementation is difficult because of the necessity of channel matrix feedback to the transmitting side and singular value decomposition or eigenvalue decomposition computations.

In contrast, with this embodiment, second signal demultiplexing section 240 is provided with two signal demultiplexing sections 241, and the configuration subsequent to first signal demultiplexing section 230 comprises independent reception systems that receive degree-of-multiplexing-2 spatially multiplexed signals, composed of a signal demultiplexing section 241, demodulation sections 251, and deinterleavers 252 for first group use, and a signal demultiplexing section 241, demodulation sections 251, and deinterleavers 252 for second group use.

Figure 5:
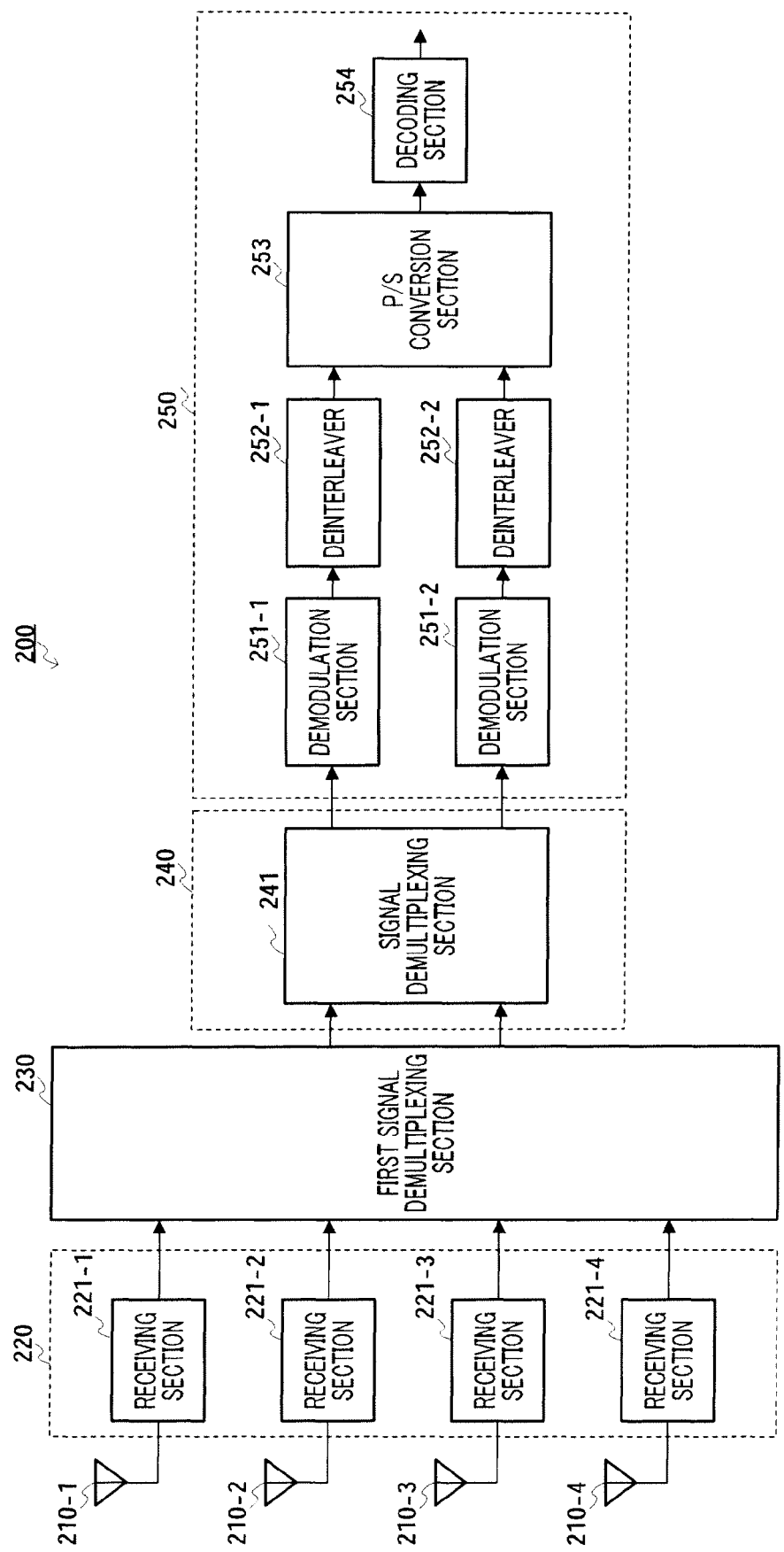
FIG. 5 is a block diagram showing another configuration of a radio communication apparatus (receiving-side)

The configuration is not limited to this, and a configuration may also be used, as shown in FIG. 5, that comprises one system of signal demultiplexing section 241, demodulation sections 251, and deinterleavers 252, and by equipping first signal demultiplexing section 230 with a memory section that stores signals (not shown), a reception system that receives one degree-of-multiplexing-2 spatially multiplexed signal is used by the first group and second group on a time division basis.

By using the above-described configuration, adding first signal demultiplexing section 230 to the circuit configuration that receives a degree-of-multiplexing-2 spatially multiplexed signal enables a circuit configuration to be implemented that receives a degree-of-multiplexing-4 spatially multiplexed signal. Also, in this case, it is possible to implement a configuration whereby input to second signal demultiplexing section 241 is switched sequentially by providing a suitable indicator (transmission sequence permissible delay amount, data classification, or the like) based on the transmission sequence QoS, and setting priorities for performing reception processing for each group after first signal demultiplexing. This enables an effect of simplifying the configuration of radio communication apparatus 200 to be obtained.

With regard to processing for spatially multiplexed signals of the first group and processing for spatially multiplexed signals of the second group, as well as the above-described method of finishing processing for spatially multiplexed signals of one group before performing processing for spatially multiplexed signals of the other group, switching of the spatially multiplexed signal group for which processing is executed may also be performed alternately at fixed intervals.

In this embodiment, first signal demultiplexing section 230 is configured so as to perform signal demultiplexing with $x_1(k)$ and $x_2(k)$ as the first group and $x_3(k)$ and $x_4(k)$ as the second group, but the sets of transmission sequences $x_n(k)$ contained in the groups may be different. For example, if a configuration is employed in which two transmission sequences for which the QoS is the same or almost the same are made one group, and an appropriate signal demultiplexing section 241 is used based on the transmission sequence QoS, MLD can be used in the signal demultiplexing section 241 for a group composed of transmission sequences with a high QoS, and MMSE can be used in the signal demultiplexing section 241 for a group of transmission sequences with a low QoS.

Methods 1) and 2) below may be used in first signal demultiplexing section 230 as an evaluation criterion for determining the sets of transmission sequences $x_n$ making up groups. A combination of a plurality of methods may also be used as an evaluation criterion.

1) Evaluation Criterion Based on Reception Quality

The reception SNR or reception SIR for transmission sequence $x_n(k)$ transmitted from the n'th transmitting antenna is used as evaluation criterion Qn. In this case, a reception SNR based evaluation criterion can be established by means of evaluation criterion Qn shown in Equation (8) below. Here, trace(X) is an operator that calculates the trace (diagonal sum) of matrix X. In the case of SIR evaluation, application of a method is possible whereby dispersion is evaluated for an estimate of a pilot signal used in channel estimation.

$$Q_n = \frac{1}{M(n)} trace(B_n^H B_n) \tag{8}$$

2) Evaluation Criterion Based on QoS

A suitable indicator (transmission sequence permissible delay amount, data classification, or the like) is provided based on the QoS for transmission sequence $x_n(k)$ transmitted from the n'th transmitting antenna, priorities for performing reception processing are set for each transmission sequence, and the permissible delay amount for transmission delay is used as an evaluation criterion.

In this embodiment, first signal demultiplexing section 230 is configured so as to perform signal demultiplexing with $x_1(k)$ and $x_2(k)$ as the first group and $x_3(k)$ and $x_4(k)$ as the second group, but signal demultiplexing may also be performed using grouping such that transmission sequences transmitted by spatially mutually-distant antennas 140 are in the same group. Also, a configuration may be used whereby signal demultiplexing is performed using grouping such that transmission sequences transmitted from spatially close antennas 140 are not in the same group. By so doing, the spatial correlation between transmission sequences on which signal demultiplexing is performed in second signal demultiplexing section 240 can be made low, making it possible to improve signal demultiplexing processing performance when there is spatial correlation.

In this embodiment, first signal demultiplexing section 230 is configured so as to perform signal demultiplexing with $x_1(k)$ and $x_2(k)$ as the first group and $x_3(k)$ and $x_4(k)$ as the second group. As another grouping method, signal demultiplexing may be performed whereby, when radio communication apparatus 100 transmits transmission sequences modulated by means of a plurality of modulation methods, transmission sequences modulated by means of the same modulation method are in the same group. By so doing, modulation methods can be unified when MLD is used in second signal demultiplexing section 240.

In this embodiment, the first signal demultiplexing section is configured so as to perform signal demultiplexing with $x_{1(k)}$ and $x_2(k)$ as the first group and $x_3(k)$ and $x_4(k)$ as the second group. As another grouping method, signal demultiplexing may be performed whereby, when radio communication apparatus 100 transmits transmission sequences modulated by means of a plurality of modulation methods, transmission sequences modulated by means of different modulation methods are not in the same group. For example, if radio communication apparatus 100 simultaneously transmits two transmission sequences modulated by means of 16QAM and two transmission sequences modulated by means of QPSK, grouping is performed so that one 16QAM-modulated transmission sequence and one QPSK-modulated transmission sequence form a group. By so doing, the number of candidate signal points can be made 64 in each case when MLD is performed by second signal demultiplexing section 240. In contrast, if QPSK-modulated transmission sequences are grouped together, MLD with 256 candidate signal points and MLD with 16 candidate signal points are necessary.

Figure 6:
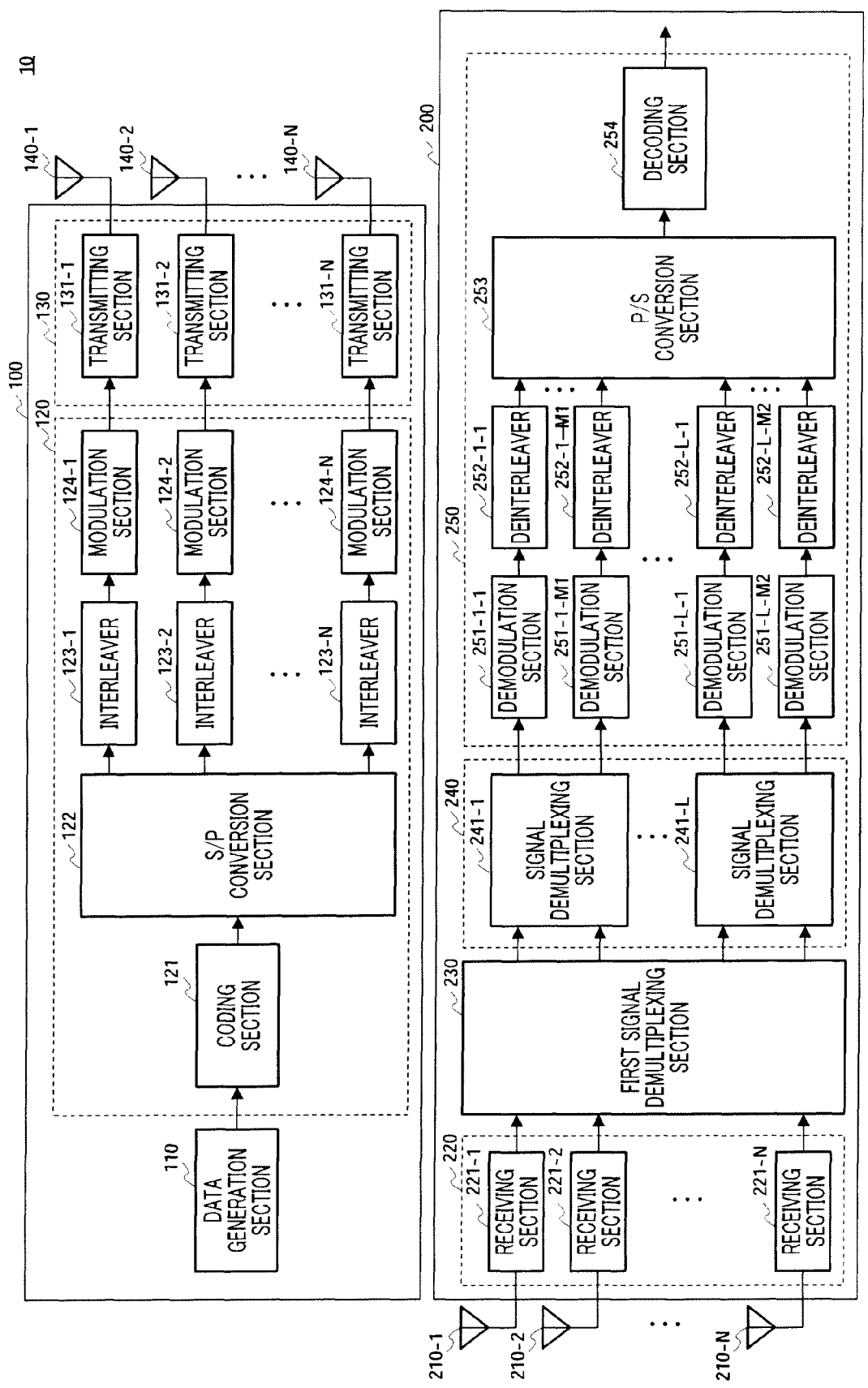
FIG. 6 is a drawing showing another configuration of a radio communication system according to Embodiment 1.

In this embodiment, a radio communication apparatus that performs degree-of-multiplexing-4 spatial multiplexing transmission has been described, but the present invention is not limited to this case, and can be applied to a radio communication apparatus that performs arbitrary degree-of-multiplexing-N spatial multiplexing transmission, as shown in FIG. 6. In this case, first signal demultiplexing section 230 demultiplexes a degree-of-multiplexing-N spatially multiplexed signal into L spatially multiplexed signals. At this time, the degree of multiplexing of the L spatially multiplexed signals is expressed as M1, M2, . . . , ML.

(Embodiment 2)

Figure 7:
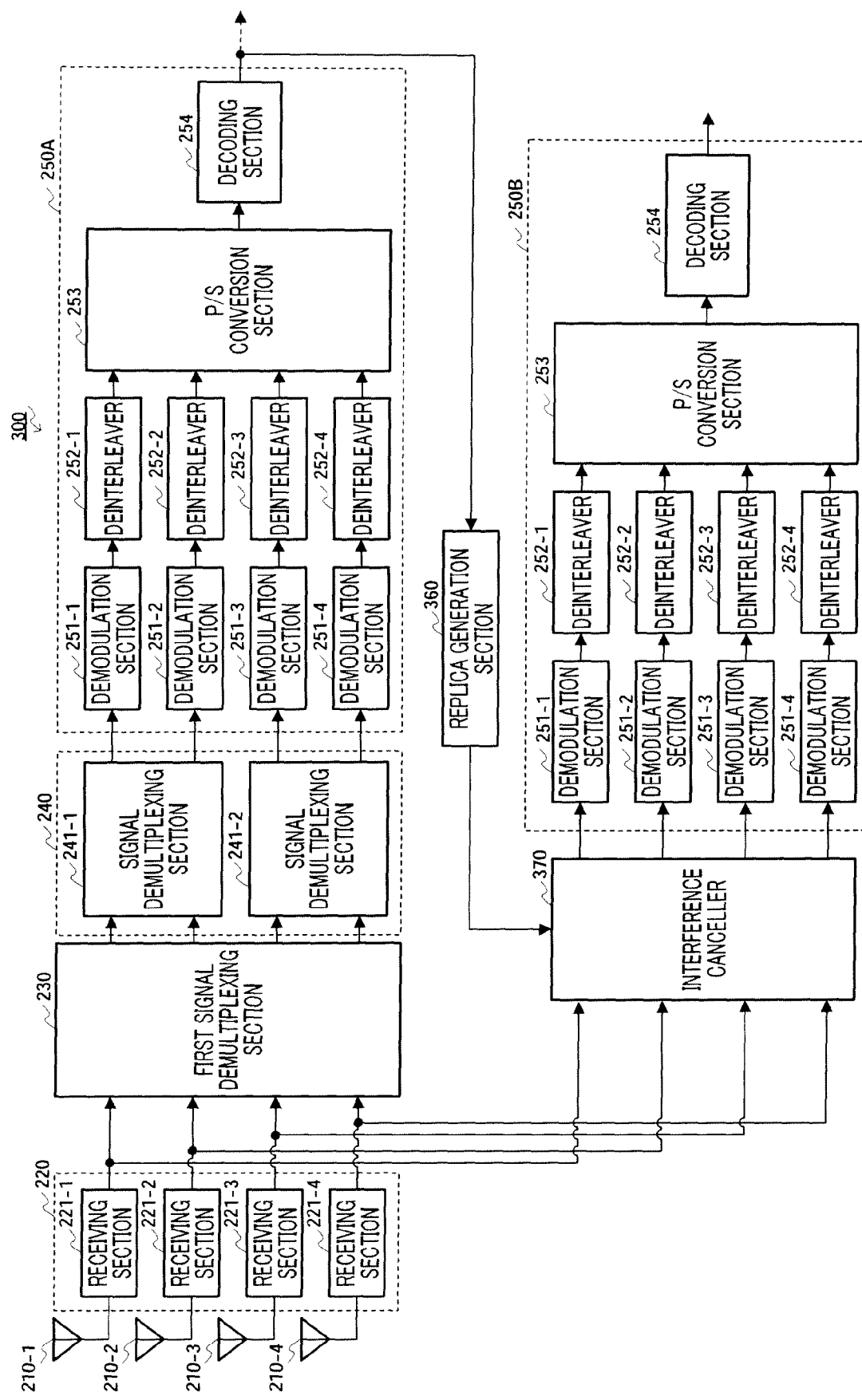
FIG. 7 is a block diagram showing a configuration of a radio communication apparatus (receiving-side) of Embodiment 2.

FIG. 7 is a drawing showing the configuration of radio communication apparatus 300 according to Embodiment 2. As shown in FIG. 7, receiving-side radio communication apparatus 300 is equipped with replica generation section 360 that creates a replica of a transmitting-side (radio communication apparatus 100) transmit signal from a post-received-signal-processing signal specifically, a decoded data sequence and multiplies this transmit signal replica by propagation path fluctuation to create a reception-time transmission signal replica, and interference canceller 370 that cancels that reception-time transmission signal replica from an actual received signal. Radio communication apparatus 300 also has received signal processing section 250 (received signal processing section 250B in FIG. 7) on the output side of interference canceller 370.

Figure 8:
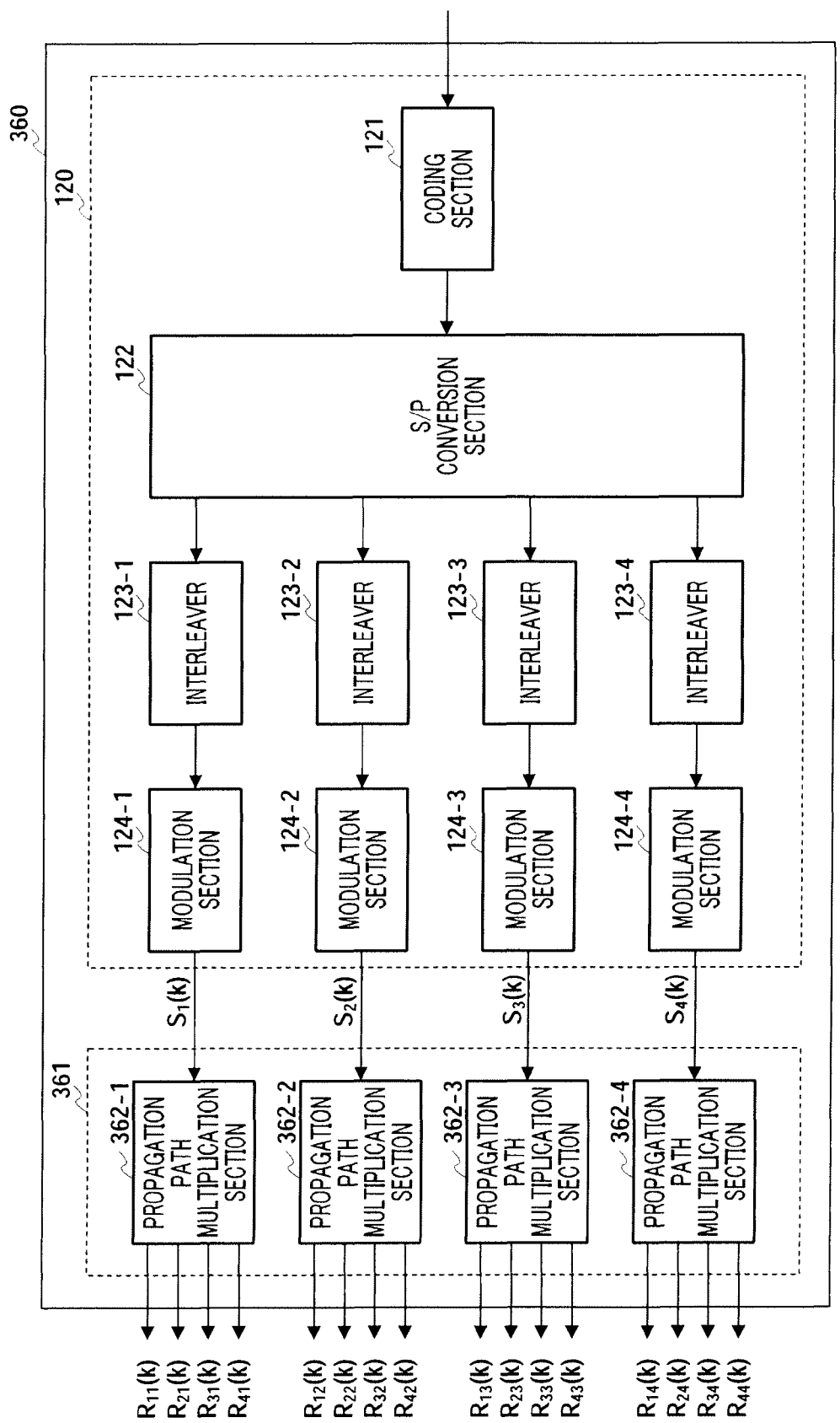
FIG. 8 is a block diagram showing the configuration of the replica generation section in FIG. 7.

As shown in FIG. 8, replica generation section 360 has the same kind of transmit signal composing section 20 as transmitting-side radio communication apparatus 100, and propagation path multiplication section 361. Propagation path multiplication section 361 has propagation path multiplication sections 362-1 through 362-4 that perform multiplication by propagation path fluctuation on each transmit signal transmitted from transmitting-side radio communication apparatus 100. Propagation path multiplication sections 362 multiply a transmit signal replica created based on a signal that has undergone received signal processing by received signal processing section 250A by propagation path fluctuation, and create a reception-time transmission signal replica. In FIG. 8, propagation path multiplication section 362 output $R_{mn}$ is a reception-time replica of a transmission signal transmitted from the n'th antenna of transmitting-side radio communication apparatus 100 and received by the m'th antenna of receiving-side radio communication apparatus 300.

Figure 9:
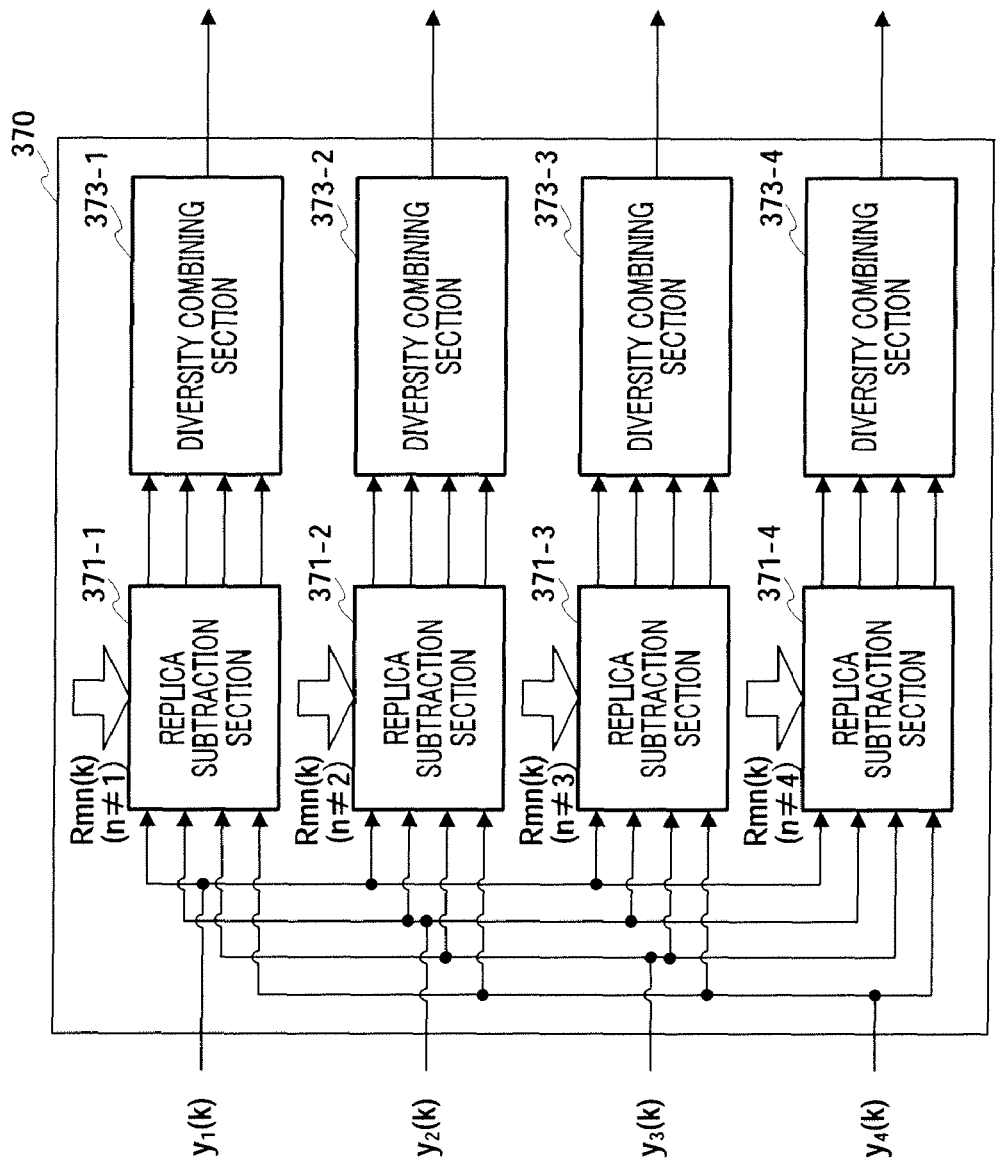
FIG. 9 is a block diagram showing the configuration of the interference canceller in FIG. 7.
Figure 10:
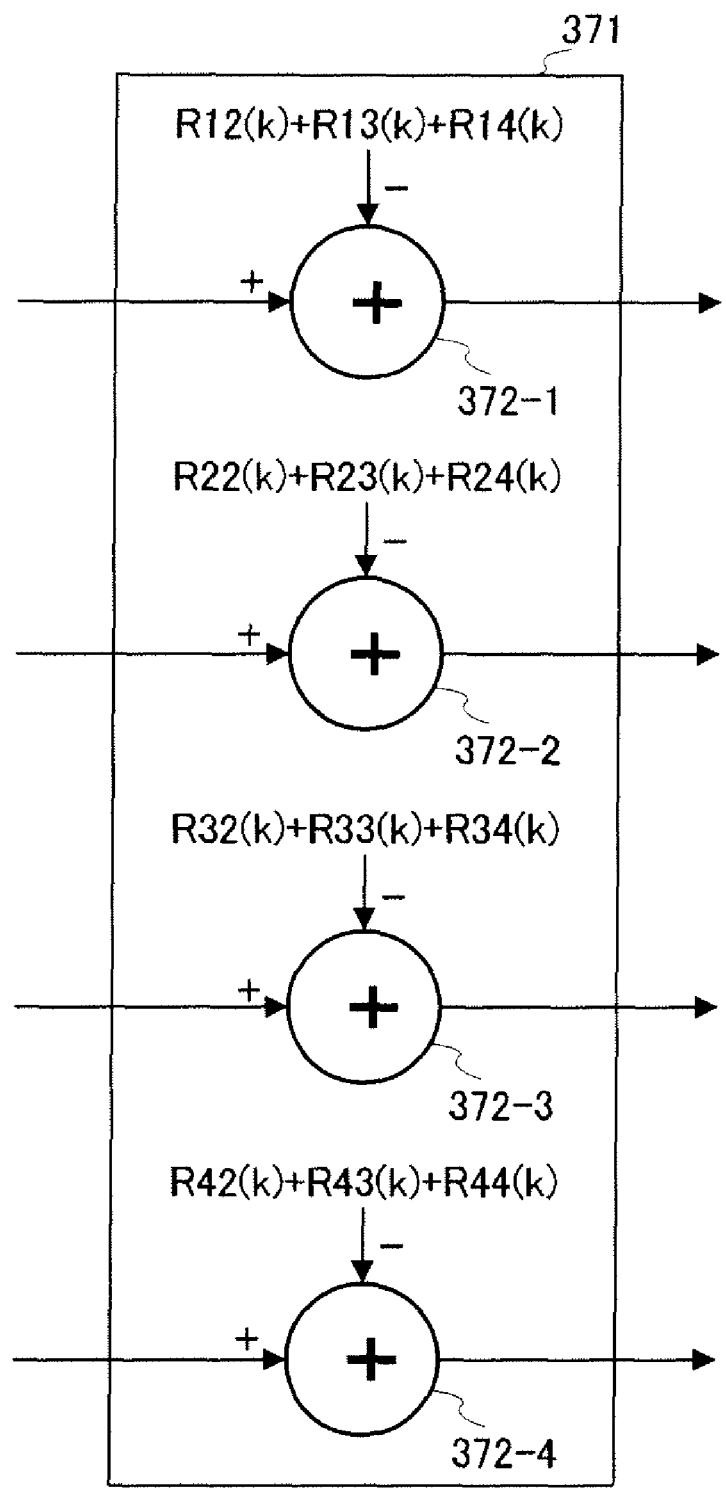
FIG. 10 is a drawing showing the configuration of a replica subtraction section in FIG. 9.

As shown in FIG. 9, interference canceller 370 has replica subtraction sections 371 and diversity combining sections 373. As shown in FIG. 10, replica subtraction sections 371 have subtracters 372.

Replica subtraction sections 371 acquire the aforementioned single transmission signal by subtracting reception-time replicas of transmission signals other than one transmission signal from spatially multiplexed signals demultiplexed into groups by first signal demultiplexing section 230. Replica subtraction sections 371 comprise replica subtraction sections 371-1 through 371-4 for acquiring the respective transmission signals. For example, replica subtraction section 371-1 acquires only a transmission signal transmitted by the transmitting-side first antenna from the spatially multiplexed signals ($y_1(k)$ through $y_4(k)$ in FIG. 9) received by antennas 210.

Here, since radio communication apparatus 300 has four antennas, four transmission signals transmitted by the first antenna are obtained. Subtracter 372-1 shown in FIG. 10 subtracts a reception-time replica of a transmission signal transmitted from other than the transmitting-side first antenna when received by the receiving-side first antenna from a spatially multiplexed signal received by the first antenna of radio communication apparatus 300, and outputs a transmission signal transmitted from the transmitting-side first antenna and received by the receiving-side first antenna to diversity combining section 373. Subtracters 372-2 through 372-4 output only a transmission signal transmitted from the transmitting-side first antenna and received by the receiving-side second, third, and fourth antenna respectively.

Diversity combining sections 373 perform diversity combining for each transmission signal (radio communication apparatus 100 transmit signal), and output a post-diversity-combining transmission signal to received signal processing section 250B. Received signal processing section 250B performs the same kind of processing as received signal processing section 250A, and outputs receive data.

Next, the operation of radio communication apparatus 300 having the above configuration will be described.

In radio communication apparatus 300, receiving section 220 outputs received signal y(k) represented by a complex digital signal. The processing performed on this received signal y(k) by second signal demultiplexing section 240 and received signal processing section 250A is the same as in Embodiment 1. In this embodiment, received signal processing section 250A output is not used directly as receive data, but is output to replica generation section 360.

Replica generation section 360 creates transmission signal reception-time replicas from received signal processing section 250A output. Specifically, received signal processing section 250A output is treated as transmit data, and replicas of radio communication apparatus 100 transmit signals are generated by transmit signal composing section 120. In FIG. 8, $S_n(k)$ (where n=1 to 4) indicates a transmit signal replica. In propagation path multiplication section 361, the transmit signal replicas are multiplied by propagation path response estimate B, and transmission signal reception-time replicas $R_{mn}(k)$ are generated. Replicas $R_{mn}(k)$ are expressed by Equation (9) through Equation (12) below.

$$\begin{bmatrix} R_{11}(k) \\ R_{21}(k) \\ R_{31}(k) \\ R_{41}(k) \end{bmatrix} = \begin{bmatrix} B_{11}(k) \\ B_{21}(k) \\ B_{31}(k) \\ B_{41}(k) \end{bmatrix} S_1(k) \qquad (9)$$

$$\begin{bmatrix} R_{12}(k) \\ R_{22}(k) \\ R_{32}(k) \\ R_{42}(k) \end{bmatrix} = \begin{bmatrix} B_{12}(k) \\ B_{22}(k) \\ B_{32}(k) \\ B_{42}(k) \end{bmatrix} S_2(k) \qquad (10)$$

$$\begin{bmatrix} R_{13}(k) \\ R_{23}(k) \\ R_{33}(k) \\ R_{43}(k) \end{bmatrix} = \begin{bmatrix} B_{13}(k) \\ B_{23}(k) \\ B_{33}(k) \\ B_{43}(k) \end{bmatrix} S_3(k) \qquad (11)$$

$$\begin{bmatrix} R_{14}(k) \\ R_{24}(k) \\ R_{34}(k) \\ R_{44}(k) \end{bmatrix} = \begin{bmatrix} B_{14}(k) \\ B_{24}(k) \\ B_{34}(k) \\ B_{44}(k) \end{bmatrix} S_4(k) \qquad (12)$$

Interference canceller 370 performs interference cancellation using reception sequences y(k) and transmission signal reception-time replicas $R_{mn}(k)$. Specifically, replica subtraction section 371-1 subtracts reception-time replica transmission signals other than those relating to transmission sequence $x_1(k)$ from reception sequences y(k) by means of subtracters 372-1 through 372-4. Diversity combining section 373-1 performs diversity combining of the outputs of subtracters 372-1 through 372-4. As the diversity combining algorithm, Maximum Ratio Combining (MRC) that maximizes the post-diversity-combining Signal-to-Noise power Ratio (SNR), or MMSE combining that maximizes the post-diversity-combining Signal-to-Noise plus Interference power Ratio (SINR), can be used. If interference cancellation is performed without error on replicas $R_{mn}(k)$ at this time, 4-branch diversity gain is obtained. The same kind of processing is also performed by replica subtraction sections 371-2 through 371-4 and diversity combining sections 373-2 through 373-4.

Post-diversity-combining signal sequences—that is, transmission—signals undergo received signal processing by received signal processing section 250B and are output as receive data.

In the above description, a configuration in which interference cancellation processing is performed only once has been described, but a configuration may also be used in which replicas are generated again from receive data sequences obtained by interference cancellation processing, thus performing interference cancellation processing a plurality of times. By so doing, replica $R_{mn}(k)$ reliability can be improved as the number of times interference cancellation processing is performed increases, and the probability of a receive data sequence being erroneous decreases as a result.

In the above description, also, received signal processing section 250B is provided in addition to received signal processing section 250A, but a configuration may also be used in which received signal processing section 250B is not included, and interference canceller 370 output is fed back to received signal processing section 250A.

Thus, according to this embodiment, a degree-of-multiplexing-4 spatially multiplexed signal transmitted from radio communication apparatus 100 can be received by a configuration that uses an interference canceller. This enables reception characteristics close to full diversity gain to be obtained with a practical hardware scale without using MLD on a degree-of-multiplexing-4 spatially multiplexed signal.

Performing interference cancellation processing repeatedly can also improve reception characteristics in a conventional configuration that uses an interference canceller after direct ZF or MMSE demultiplexing of a degree-of-multiplexing-4 spatially multiplexed signal. However, according to this embodiment, eliminating interference between groups by means of first signal demultiplexing section 230 and using MLD in second signal demultiplexing section 240 allows 2-branch diversity gain to be obtained at the point of second-stage signal demultiplexing, enabling replica reliability to be improved compared with a conventional configuration. As a result, for the same number of interference canceller iterations, better reception reliability can be obtained than with a conventional configuration. Also, the number of iterations needed to obtain desired reception characteristics can be reduced compared with a conventional configuration. Furthermore, much of the reception circuitry has many elements common to degree-of-multiplexing-2 spatially multiplexed signal reception circuitry, enabling the circuit scale to be reduced and development costs to be cut.

Figure 11:
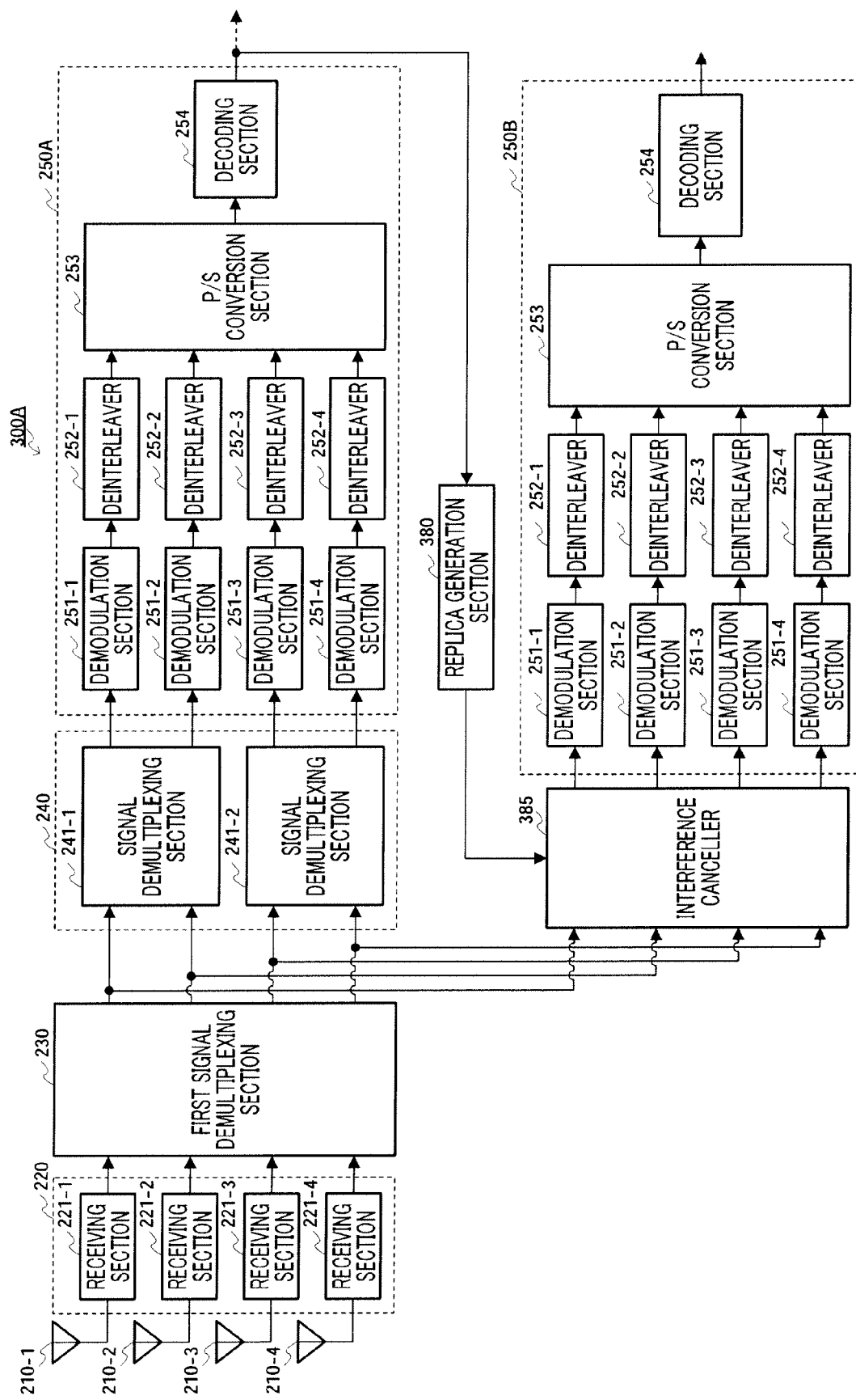
FIG. 11 is a block diagram showing another configuration of a radio communication apparatus (receiving-side) of Embodiment 2.

While radio communication apparatus 300 according to this embodiment employs the configuration shown in FIG. 7, the configuration shown in FIG. 11 may also be used. Radio communication apparatus 300A shown in FIG. 11 has replica generation section 380 and interference canceller 385. Unlike interference canceller 370, interference canceller 385 subtracts a replica signal from first signal demultiplexing section 230 output v(k).

Figure 12:
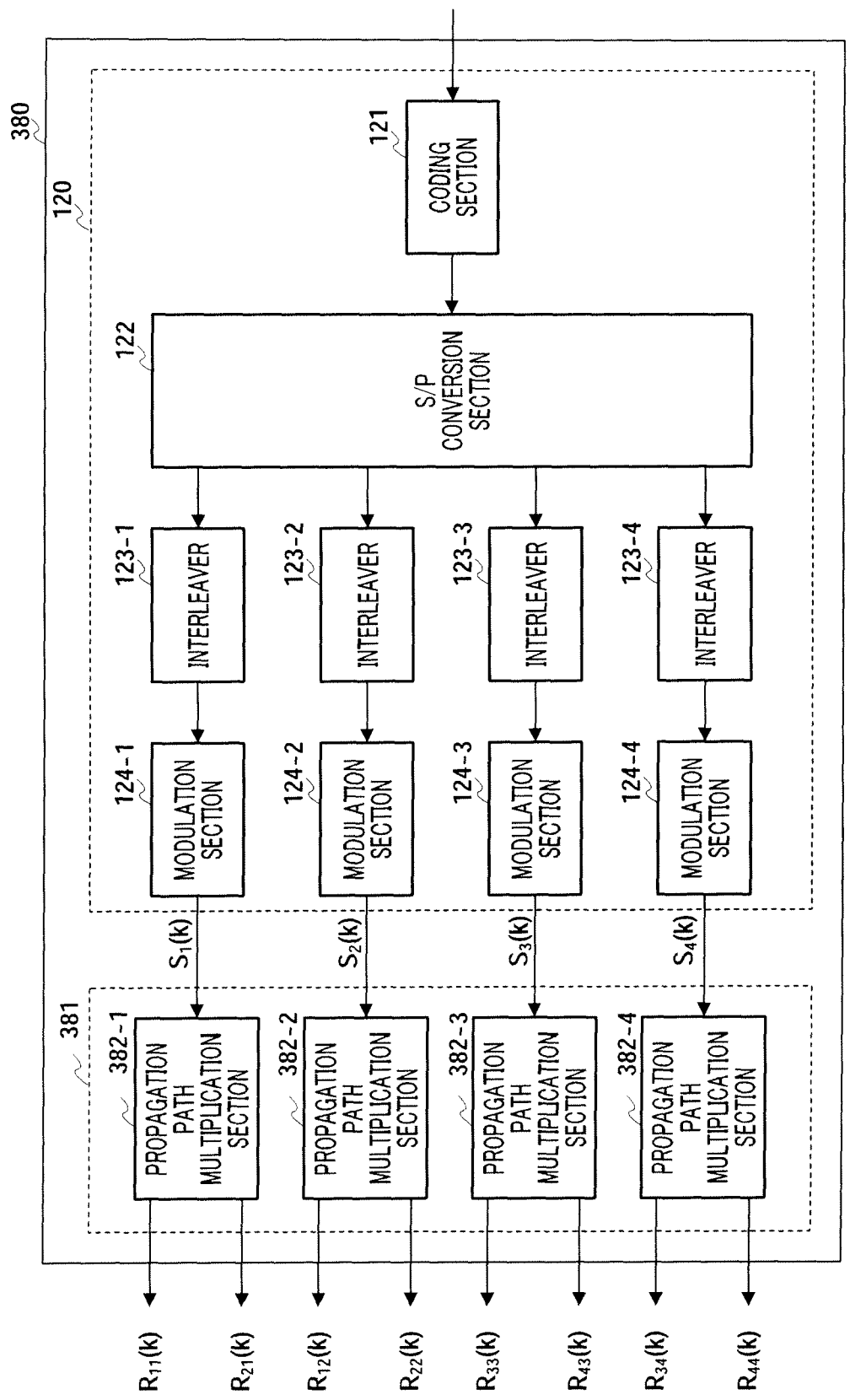
FIG. 12 is a block diagram showing the configuration of the replica generation section in FIG. 11.

As shown in FIG. 12, replica generation section 380 has propagation path multiplication section 381. Propagation path multiplication section 381 has propagation path multiplication sections 382-1 through 382-4 that multiply the respective transmit signals transmitted from transmitting-side radio communication apparatus 100 by propagation path fluctuation. Here, in radio communication apparatus 300A, as described above, interference canceller 385 subtracts a replica signal from first signal demultiplexing section 230 output v(k)—that is, from a spatially multiplexed signal demultiplexed into groups—and therefore only reception-time replicas of transmission signals contained in the spatially multiplexed signal groups are output from propagation path multiplication sections 382-1 through 382-4.

Figure 13:
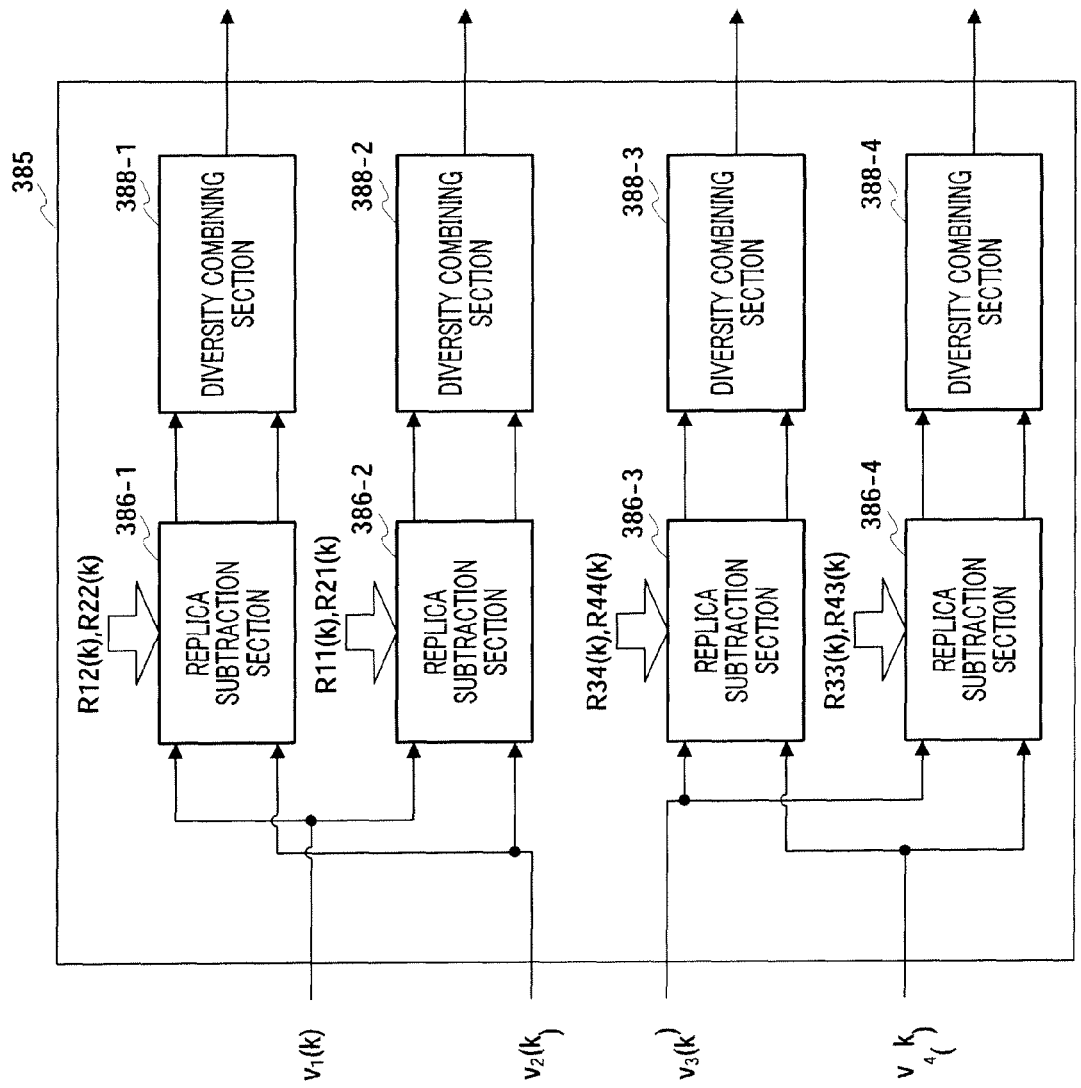
FIG. 13 is a block diagram showing the configuration of the interference canceller in FIG. 11.
Figure 14:
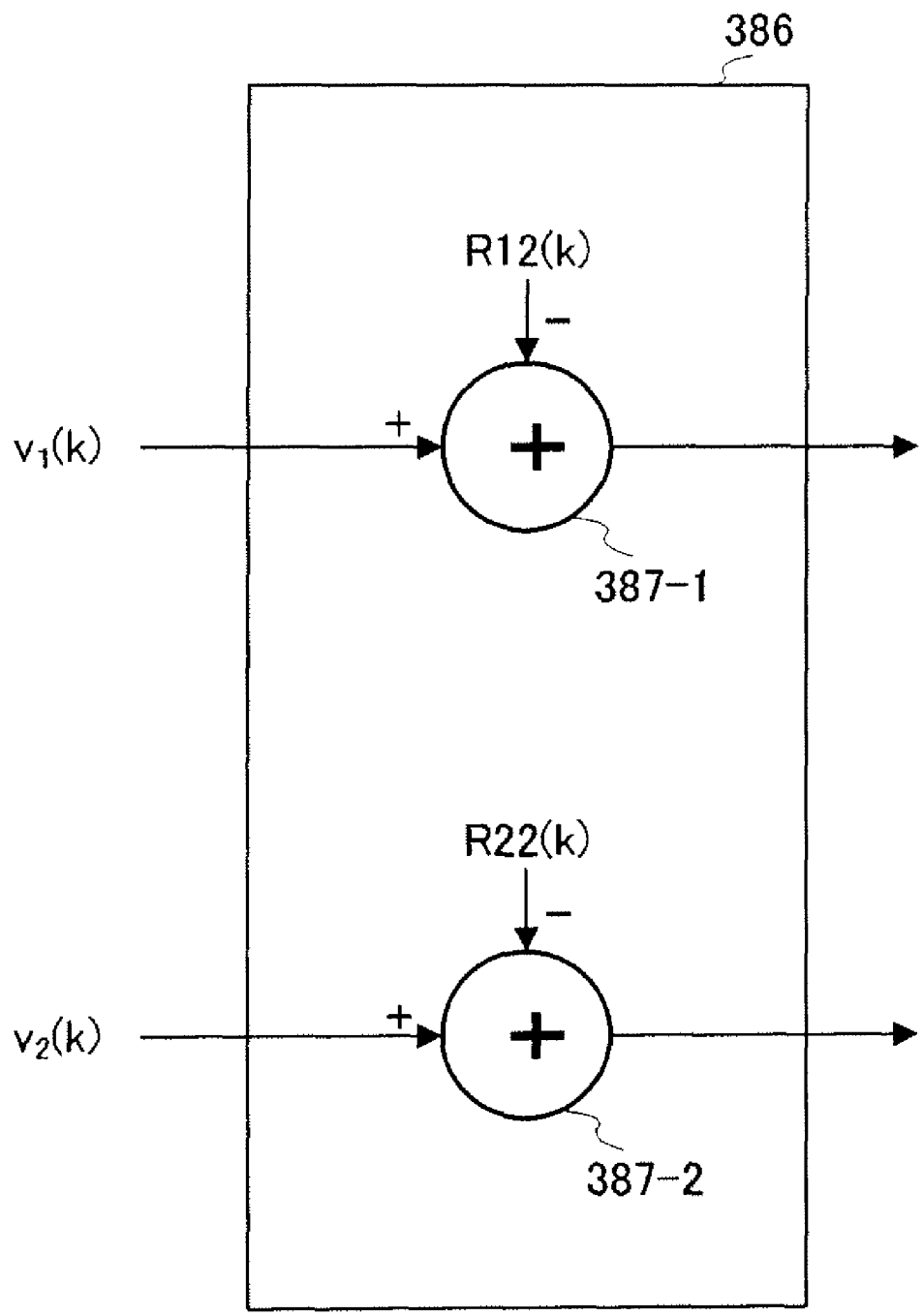
FIG. 14 is a drawing showing the configuration of a replica subtraction section in FIG. 13.

As shown in FIG. 13, interference canceller 385 has replica subtraction sections 386 and diversity combining sections 388. As shown in FIG. 14, replica subtraction sections 386 have subtracters 387.

Replica subtraction sections 386 acquire the aforementioned single transmission signal by subtracting reception-time replicas of transmission signals other than one transmission signal from spatially multiplexed signals demultiplexed into groups by first signal demultiplexing section 230. Interference canceller 385 has replica subtraction sections 386-1 through 386-4 for obtaining transmission signals. For example, replica subtraction section 386-1 acquires only a transmission signal transmitted by the transmitting-side first antenna from first-group spatially multiplexed signals ($v_1(k)$ and $v_2(k)$ in FIG. 13) demultiplexed by first signal demultiplexing section 230. Here, since two spatially multiplexed signals are contained in the first group, two transmission signals transmitted by the first antenna are obtained.

Subtracter 387-1 shown in FIG. 14 subtracts a reception-time replica of a transmission signal transmitted from other than the transmitting-side first antenna corresponding to the first group when received by the receiving-side first antenna from a spatially multiplexed signal received using the first antenna of radio communication apparatus 300A, and outputs a transmission signal transmitted from the transmitting-side first antenna and received using the receiving-side first antenna to diversity combining section 388. Subtracter 387-2 outputs only a transmission signal transmitted from the transmitting-side first antenna and received using the receiving-side second antenna.

Diversity combining sections 388 perform diversity combining for each transmission signal (radio communication apparatus 100 transmit signal), and output a post-diversity-combining transmission signal to received signal processing section 250B.

Next, the operation of radio communication apparatus 300A having the above configuration will be described.

Replica generation section 380 creates transmission signal reception-time replicas from received signal processing section 250A output. Specifically, received signal processing section 250A output is treated as transmit data, and replicas of radio communication apparatus 100 transmit signals are generated. In FIG. 8, $S_n(k)$ (where n=1 to 4) indicates a transmit signal replica. In propagation path multiplication section 381, the transmit signal replicas are multiplied by estimate D of propagation path response G after first signal demultiplexing, and transmission signal reception-time replicas $R_{mn}(k)$ are generated. Replicas $R_{mn}(k)$ are expressed by Equation (13) through Equation (16) below.

$$\begin{bmatrix} R_{11}(k) \\ R_{21}(k) \end{bmatrix} = \begin{bmatrix} d_{11}(k) \\ d_{21}(k) \end{bmatrix} S_1(k) \qquad (13)$$

$$\begin{bmatrix} R_{12}(k) \\ R_{22}(k) \end{bmatrix} = \begin{bmatrix} d_{12}(k) \\ d_{22}(k) \end{bmatrix} S_2(k) \qquad (14)$$

$$\begin{bmatrix} R_{33}(k) \\ R_{43}(k) \end{bmatrix} = \begin{bmatrix} d_{33}(k) \\ d_{43}(k) \end{bmatrix} S_3(k) \qquad (15)$$

$$\begin{bmatrix} R_{34}(k) \\ R_{44}(k) \end{bmatrix} = \begin{bmatrix} d_{34}(k) \\ d_{44}(k) \end{bmatrix} S_4(k) \qquad (16)$$

Interference canceller 385 performs interference cancellation using reception sequences v(k)—that is, spatially multiplexed signals demultiplexed into groups by first signal demultiplexing section 230 and replicas $R_{mn}(k)$. Specifically, replica subtraction section 386-1 subtracts replica signals of transmission signals transmitted from the transmitting-side second antenna and received at an antenna of radio communication apparatus 300A corresponding to the first group from reception sequences $v_1(k)$ and $v_2(k)$ by means of subtracters 387-1 and 387-2. Diversity combining section 388-1 performs diversity combining of the outputs of subtracters 387-1 and 387-2.

As the diversity combining algorithm, Maximum Ratio Combining (MRC) diversity that maximizes the post-diversity-combining Signal-to-Noise power Ratio (SNR), MMSE combining diversity that maximizes the post-diversity-combining Signal-to-Noise plus Interference power Ratio (SINR), selective combining diversity that selects and outputs the highest-reliability branch, or the like, can be used. If interference cancellation is performed without error on replicas $R_{mn}(k)$ at this time, 2-branch diversity gain is obtained. The same kind of processing is also performed by replica subtraction sections 386-2 through 386-4 and diversity combining sections 388-2 through 388-4.

Post-diversity-combining signal sequences—that is, transmission signals—undergo received signal processing by received signal processing section 250B and are output as receive data.

By this means, although diversity gain obtained after interference cancellation is lower than when radio communication apparatus 300 configured as shown in FIG. 7 is used, the following two effects are obtained: 1) the amount of computation and circuit scale can be reduced since the number of replicas created is smaller; and 2) the configuration of an interference canceller for a degree-of-multiplexing-2 spatially multiplexed signal can be used as it is.

Figure 15:
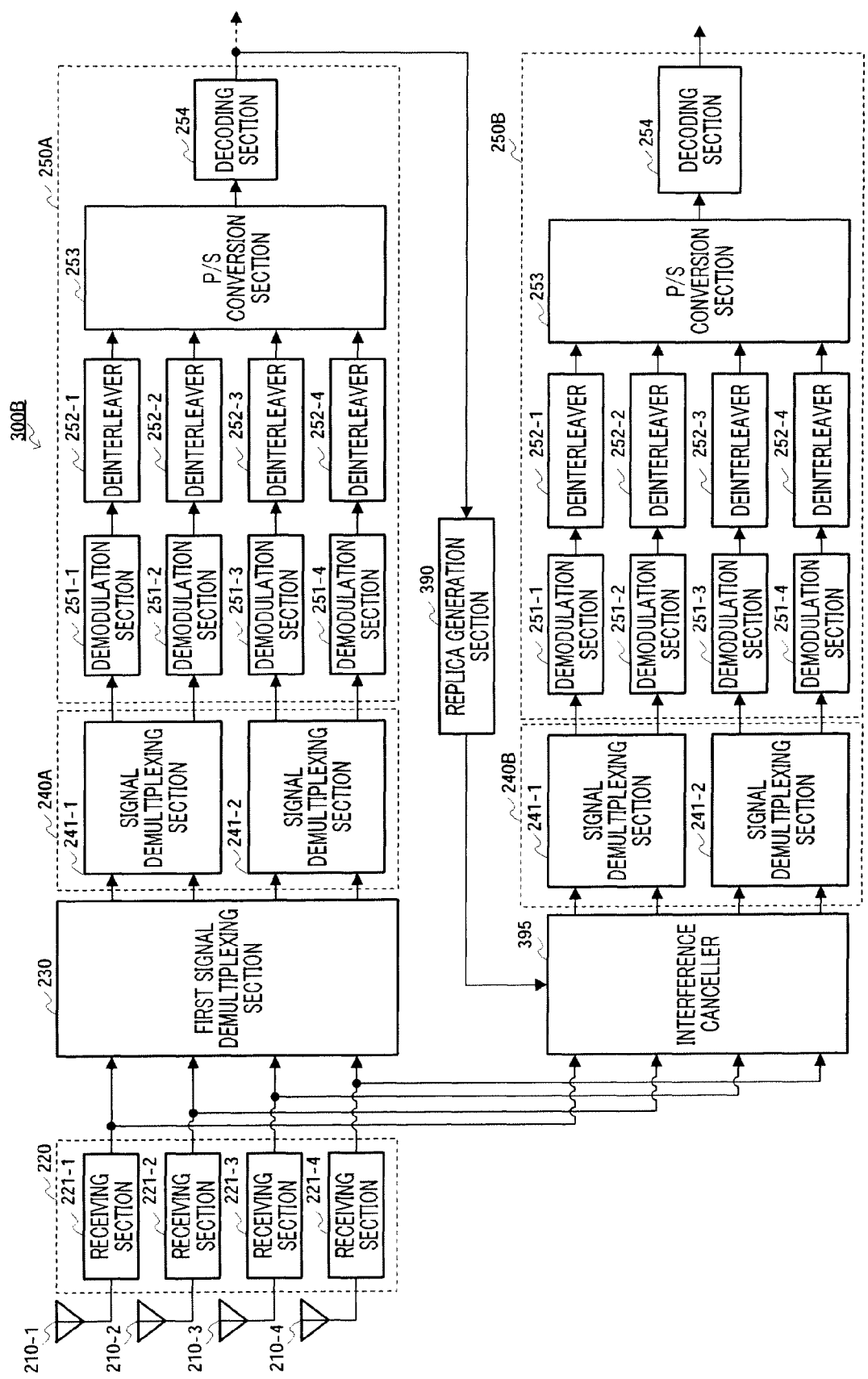
FIG. 15 is a block diagram showing another configuration of a radio communication apparatus (receiving-side) of Embodiment 2.

While radio communication apparatus 300 according to this embodiment employs the configuration shown in FIG. 7, the configuration shown in FIG. 15 may also be used. Radio communication apparatus 300B shown in FIG. 15 has replica generation section 390, interference canceller 395, and second signal demultiplexing section 240B. Radio communication apparatus 300B is configured in such a way that the degree of spatially multiplexed signal multiplexing by interference canceller 395 is reduced in the same way as with first signal demultiplexing section 230 (here, reduced from degree-of-multiplexing 4 to 2), and thereafter signal demultiplexing is performed by second signal demultiplexing section 240B.

Figure 16:
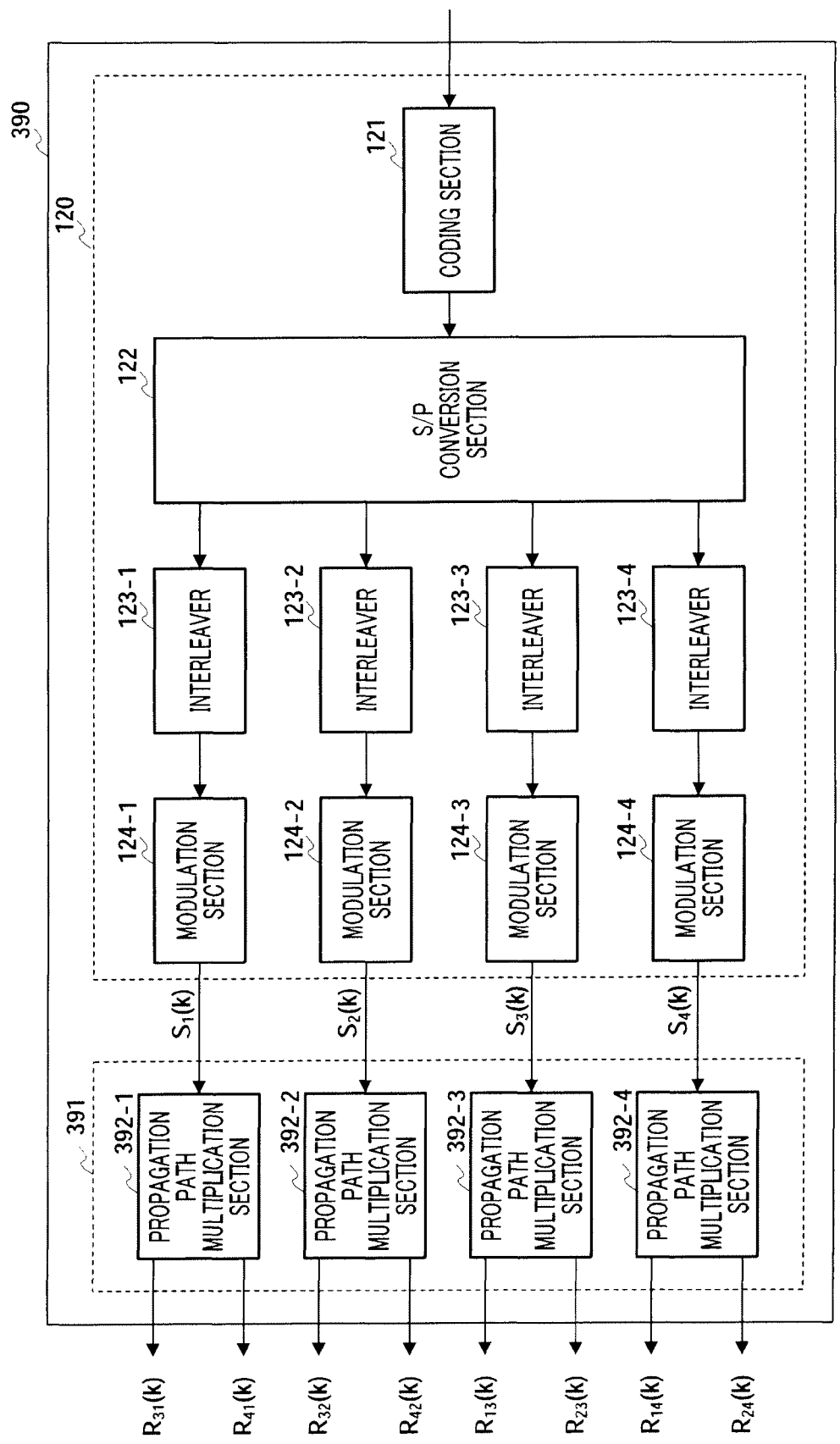
FIG. 16 is a block diagram showing the configuration of the replica generation section in FIG. 15.

As shown in FIG. 16, replica generation section 390 has propagation path multiplication section 391. Propagation path multiplication section 391 has propagation path multiplication sections 392-1 through 392-4 that multiply the respective transmit signals transmitted from transmitting-side radio communication apparatus 100 by propagation path fluctuation. Here, in radio communication apparatus 300B, interference canceller 395 output is a spatially multiplexed signal containing the same kind of transmission signal combinations as first signal demultiplexing section 230 output, and therefore only reception-time replicas of transmission signals eliminated by first signal demultiplexing section 230 are output.

Figure 17:
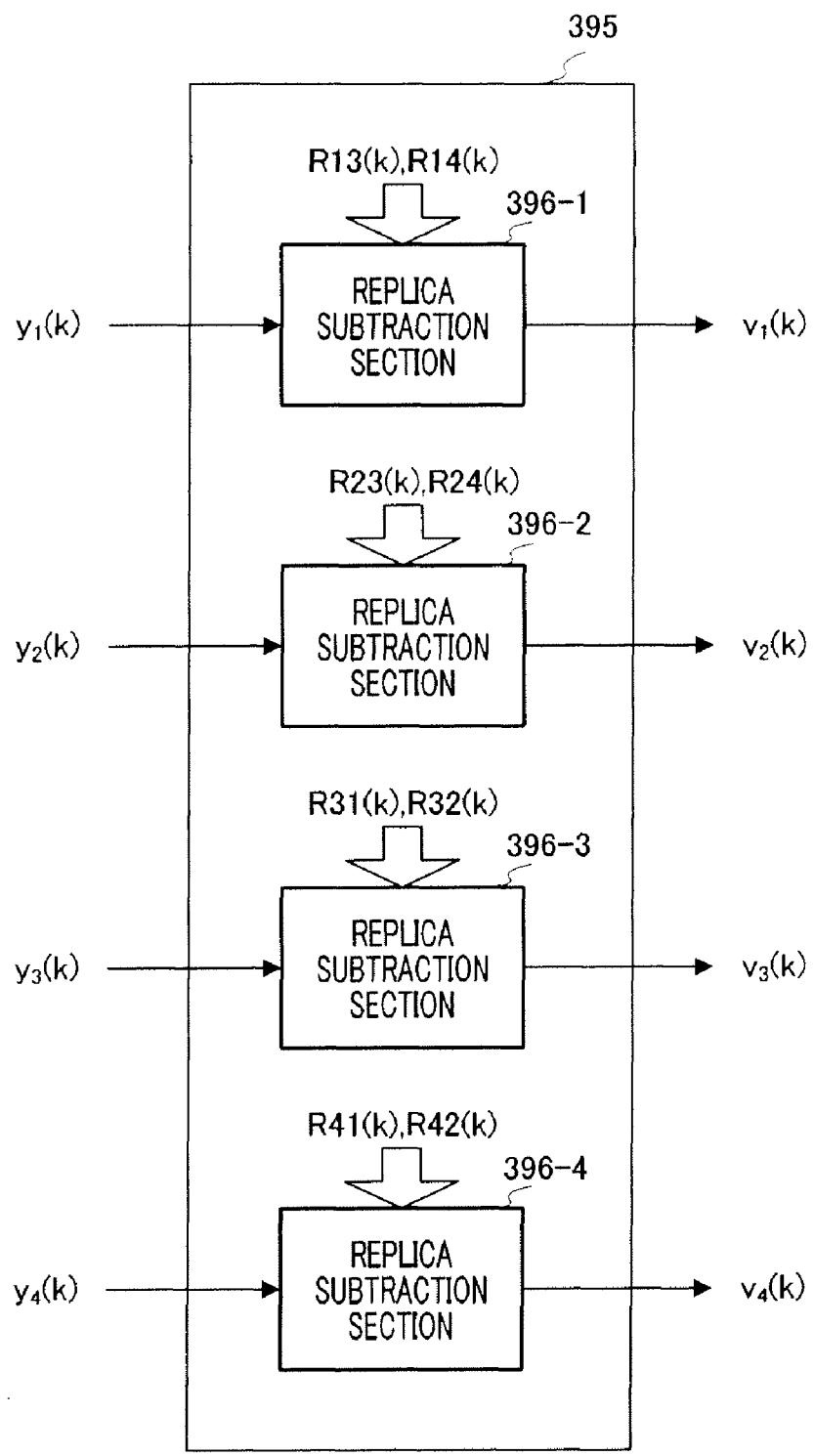
FIG. 17 is a block diagram showing the configuration of the interference canceller in FIG. 15.
Figure 18:
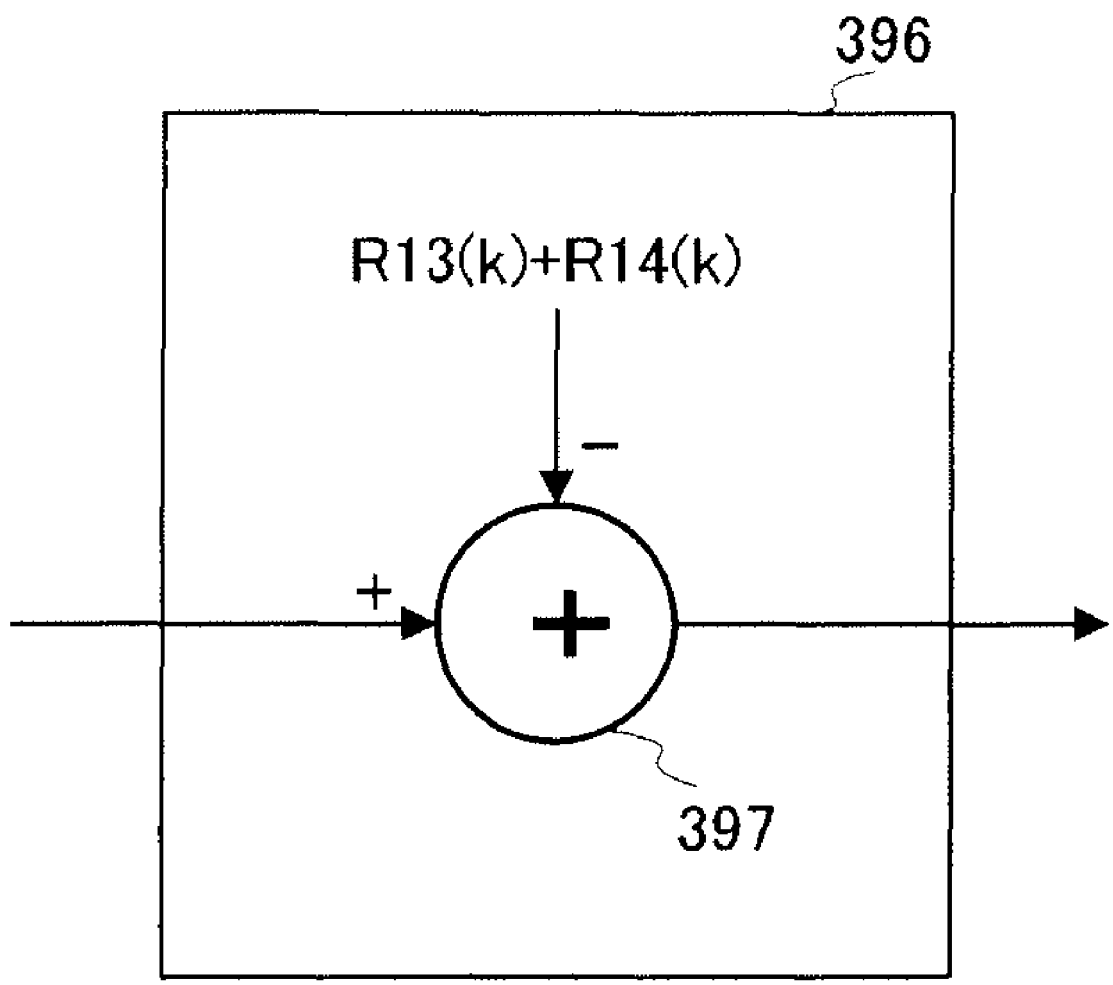
FIG. 18 is a drawing showing the configuration of a replica subtraction section in FIG. 17.

As shown in FIG. 17, interference canceller 395 has replica subtraction sect ions 396. As shown in FIG. 18, replica subtraction sections 396 have a subtracter 397.

Replica subtraction sections 396 acquire spatially multiplexed signals ($v_1(k)$ through $v_4(k)$ in FIG. 17) containing the same kind of transmission signal combinations as first signal demultiplexing section 230 output by subtracting replicas when transmission signals belonging to a different group from the transmission signal group it is wished to detect are received using antennas 210 from spatially multiplexed signals received by antennas 210 ($y_1(k)$ through $y_4(k)$ in FIG. 17). For example, replica subtraction section 396-1 subtracts, from a spatially multiplexed signal ($y_1(k)$) received using the first antenna of radio communication apparatus 300B, replicas ($R_{13}$ and $R_{14}$) of transmission signals received us ing antennas (third and fourth antennas 210-3 and 210-4) at which spatially multiplexed signals ($y_3(k)$ and $y_4(k)$) belonging to a group (here, the second group) different from that of spatially multiplexed signal ($y_1(k)$) are received, and outputs $v_1(k)$.

Next, the operation of radio communication apparatus 300B having the above configuration will be described.

Replica generation section 390 creates transmission signal reception-time replicas from received signal processing section 250A output. Specifically, received signal processing section 250A output is treated as transmit data, and replicas of radio communication apparatus 100 transmit signals are generated. In FIG. 16, $S_n(k)$ (where n=1 to 4) indicates a transmit signal replica. In propagation path multiplication section 391, the transmit signal replicas are multiplied by propagation path response estimate B, and transmission signal reception-time replicas $R_{mn}(k)$ are generated. Replicas $R_{mn}(k)$ are expressed by Equation (17) through Equation (20) below.

$$\begin{bmatrix} R_{31}(k) \\ R_{31}(k) \end{bmatrix} = \begin{bmatrix} b_{31}(k) \\ b_{31}(k) \end{bmatrix} S_1(k) \quad (17)$$

$$\begin{bmatrix} R_{32}(k) \\ R_{42}(k) \end{bmatrix} = \begin{bmatrix} b_{32}(k) \\ b_{42}(k) \end{bmatrix} S_2(k) \quad (18)$$

$$\begin{bmatrix} R_{13}(k) \\ R_{23}(k) \end{bmatrix} = \begin{bmatrix} b_{13}(k) \\ b_{23}(k) \end{bmatrix} S_3(k) \quad (19)$$

$$\begin{bmatrix} R_{14}(k) \\ R_{24}(k) \end{bmatrix} = \begin{bmatrix} b_{14}(k) \\ b_{24}(k) \end{bmatrix} S_4(k) \quad (20)$$

Interference canceller 395 performs interference cancellation using reception sequences y(k) and transmission signal reception-time replicas $R_{mn}(k)$. Specifically, replica subtraction section 396-1 subtracts reception-time replica signals of transmission signals (transmission sequences) contained in the second group from reception sequence $y_1(k)$ by means of subtracter 397, and outputs the result as $v_1(k)$.

In second signal demultiplexing section 240B, processing similar to that of second signal demultiplexing section 240A is performed on interference canceller 395 output ($v_1(k)$ through $v_4(k)$).

In the above description, second signal demultiplexing section 240B is provided in radio communication apparatus 300B in addition to second signal demultiplexing section 240A, but a configuration may also be used in which second signal demultiplexing section 240B is not included, and interference canceller 395 output is fed back to second signal demultiplexing section 240A.

In the description of this embodiment, it has been assumed that the interleaving pattern is the same for interleavers 123-1 through 123-4 of transmitting-side radio communication apparatus 100, but different patterns may also be used, and different patterns can be used on a group-by-group basis. For example, pattern A may be used for interleavers 123-1 and 123-2, and pattern B for interleavers 123-3 and 123-4. On the other hand, patterns corresponding to the interleaver patterns are used as the deinterleaving patterns of deinterleavers 252-1 through 252-4 of receiving-side radio communication apparatus 300 (including radio communication apparatuses 300A and 300B).

In this case, interference canceller 370 performs interference cancellation so as to eliminate different interleaving pattern groups. Then second signal demultiplexing section 240 performs demultiplexing of transmission signals (transmission sequences) contained in the groups. By varying the interleaving patterns in this way, even if the correlation between a signal that performs interference elimination and a signal from which interference is eliminated is high at the time of interference elimination by interference canceller 370, interference cancellation errors can be randomized by using different interleaving patterns, and the ability to correct decoding section 254 interference cancellation errors can be improved. Also, demultiplexing transmit signals (transmission sequences) having the same interleaving pattern by means of second signal demultiplexing section 240 enables the occurrence of burst interference cancellation errors to be prevented.

As a result, an effect of improving reception characteristics is obtained. Details of the effect of reducing burst interference cancellation errors by varying interleaving patterns are given in the following document: Murakami, Kobayashi, Orihashi, Matsuoka, "Investigation of the application of iterative decoding using signal point reduction in MIMO systems—BER characteristics in a Rayleigh fading environment—", IEICE Technical Report RCS2004-8, pp 41-46, April 2004.

In radio communication apparatus 300B, interleaving patterns may also be made to differ for transmission signals (transmission sequences) within a group. For example, in the first group, $x_1$ may be interleaved using pattern A and $x_2$ using pattern B, while in the second group, $x_3$ is interleaved using pattern A and $x_4$ using pattern B. In this way, second signal demultiplexing section 240A performs demultiplexing of signals of the same group, interference canceller 395 eliminates transmission signals (transmission sequences) with different interleaving patterns, and second-time second signal demultiplexing section 240B demultiplexes transmission signals (transmission sequences) with the same interleaving pattern. Thus, the sets of transmission signals (transmission sequences) differ in the first-time and second-time signal demultiplexing performed by second signal demultiplexing section 240A and second signal demultiplexing section 240B, enabling the influence of interference cancellation error propagation to be reduced.

(Embodiment 3)

Figure 19:
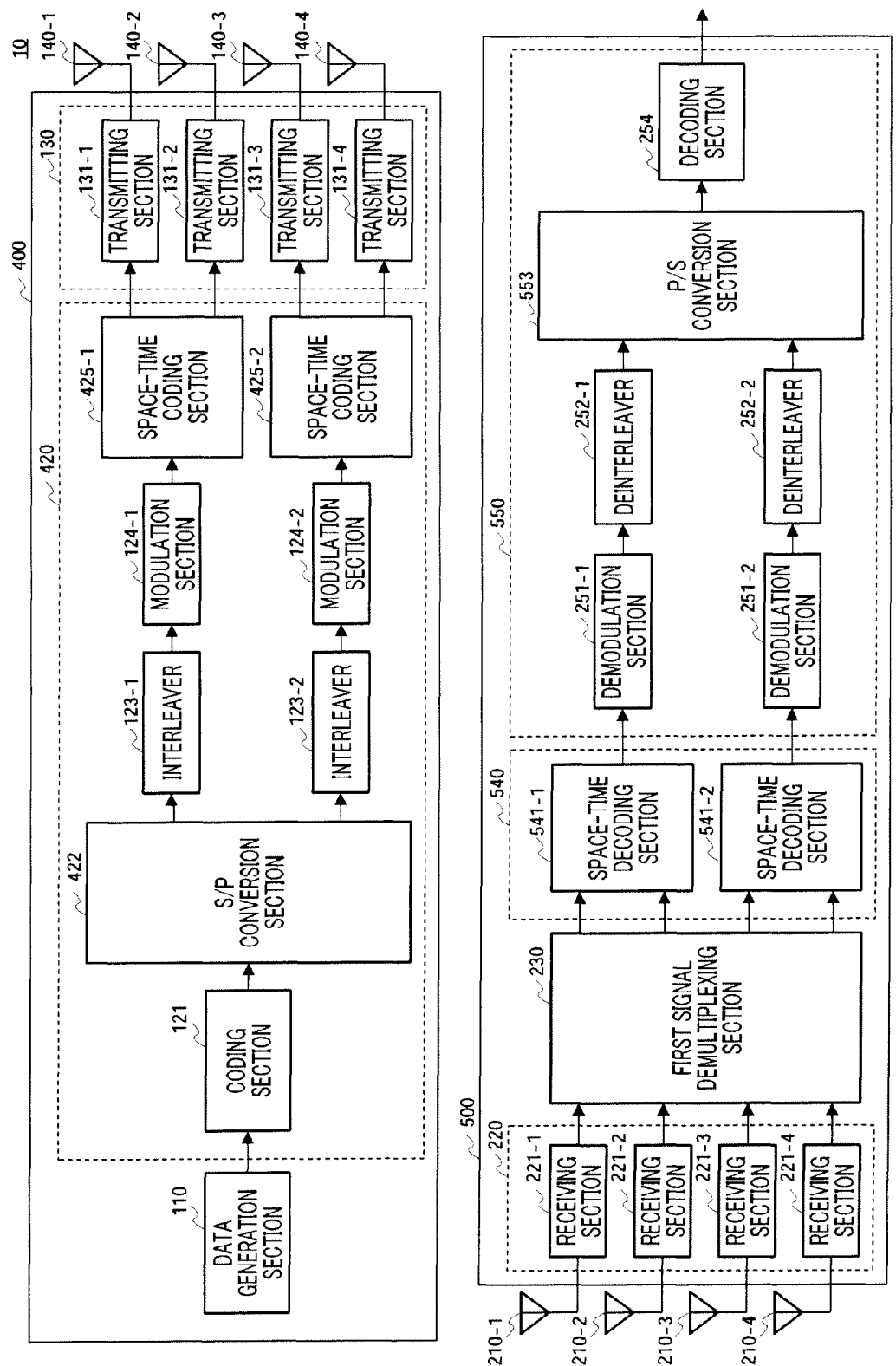
FIG. 19 is a drawing showing the configuration of a radio communication system of Embodiment 3.

As shown in FIG. 19, radio communication system 10 of Embodiment 3 has radio communication apparatus 400 and radio communication apparatus 500. In the same way as radio communication apparatus 100 of Embodiment 1, radio communication apparatus 400 transmits a transmit signal from each antenna. However, while transmit signals transmitted from radio communication apparatus 100 correspond to parallel data sequences resulting from serial/parallel conversion of one line of transmit data, transmit signals transmitted from radio communication apparatus 400 include transmit signals corresponding to a plurality of space-time coded sequences generated by parallel data sequences of one line of transmit data being further space-time coded.

As shown in FIG. 19, radio communication apparatus 400 has transmit signal composing section 420. This transmit signal composing section 420 has S/P conversion section 422 and space-time coding sections 425.

S/P conversion section 422 has post-error-correction-coding transmit data as input, and generates parallel data sequences by executing serial/parallel conversion. However, unlike S/P conversion section 122 of radio communication apparatus 100, S/P conversion section 422 generates two parallel data sequences since space-time coding sections 425 that code one information sequence into two space-time coded sequences are provided at a later stage.

Space-time coding sections 425 have parallel data sequences as input, and generate space-time coded sequences by performing space-time coding processing. Here, it is assumed that baseband signals mapped onto the IQ plane by modulation sections 124 are subjected to block coding such as STBC disclosed in "B. Vucetic and J. Yuan, 'Space-Time Coding', Wiley", with STBC that codes one information sequence into two space-time coded sequences being used. Space-time coded signals are frequency-converted from baseband signals and undergo band-limiting processing in transmitting section 130, and are transmitted from antennas 140 as high-frequency signals after amplification.

As shown in FIG. 19, radio communication apparatus 500 has second signal demultiplexing section 540 and received signal processing section 550. Second signal demultiplexing section 540 has space-time decoding sections 541.

First signal demultiplexing section 230 of radio communication apparatus 500 performs demultiplexing into spatially multiplexed signal groups containing transmission signals corresponding to space-time coded sequences space-time coded based on the same information sequence on the transmitting side. In this embodiment, transmitting-side radio communication apparatus 400 performs dual-system space-time coding, and therefore first signal demultiplexing section 230 performs demultiplexing into spatially multiplexed signal groups composed of transmission signals corresponding to the two systems of transmitting-side radio communication apparatus 400.

Second signal demultiplexing section 540 has a number of space-time decoding sections 541 corresponding to the number of groups, demultiplexes spatially multiplexed signals of each group demultiplexed by first signal demultiplexing section 230 into transmission signals contained in the relevant spatially multiplexed signals, executes space-time decoding processing on the transmission signals of each group, and outputs signals corresponding to the transmitting-side parallel data sequences to received signal processing section 550.

Received signal processing section 550 executes decoding processing and de interleaving on the space-time decoded signals of the plurality of systems, performs parallel/serial conversion by means of P/S conversion section 553, and obtains a serial data sequence.

Next, the operation of radio communication apparatus 400 and radio communication apparatus 500 having the above configurations will be described.

In radio communication apparatus 400, parallel data sequences of one line of transmit data are further space-time coded, and transmit signals corresponding to the generated plurality of space-time coded sequences (here, four space-time coded sequences) are transmitted from different antennas 140.

In radio communication apparatus 500, a degree-of-multiplexing-N (where N=4) spatially multiplexed signal received using antennas 210 undergoes orthogonal detection after amplification and frequency conversion by receiving sections 221-1 through 221-4, is converted to a baseband signal on the IQ plane, and is output to first signal demultiplexing section 230 as received signal y(k) represented by a complex digital signal using an A/D converter.

Here, y(k) is a column vector containing received signals received via antennas 210 as elements. This received signal y(k)—that is, a received signal at discrete time k obtained in a flat fading propagation environment corresponding to transmission sequence $x_n(k)$ from radio communication apparatus 400—is expressed as shown in Equation (1) in the same way as in Embodiment 1.

First signal demultiplexing section 230 performs demultiplexing into spatially multiplexed signal groups by performing linear computation in Equation (3) so that only a transmission signal corresponding to a transmission sequence coded by space-time coding section 425-1 is included in $v_1$ and $v_2$, and only a transmission signal corresponding to a transmission sequence coded by space-time coding section 425-2 is included in $v_3$ and $v_4$.

Space-time decoding sections 541-1 and 541-2 decode coded sequences coded by space-time coding sections 425-1 and 425-2 respectively.

In received signal processing section 550, space-time decoded signals of the plurality of systems undergo decoding processing and de interleaving, followed by parallel/serial conversion by P/S conversion section 553, and a serial data sequence is obtained.

Thus, according to this embodiment, although the transmission rate falls, a space-time diversity effect can be obtained, contributing to an improvement in reception quality. Also, better characteristics can be obtained than with a conventional method (ZF or MMSE), with a practical hardware scale.

That is to say, if batch demultiplexing processing by means of conventional ZF or MMSE linear processing is used instead of first signal demultiplexing section 230, diversity gain (antenna degree of freedom) is used for signal demultiplexing due to the nature of forming a reception weight for demultiplexing reception of a spatially multiplexed signal, and therefore diversity gain and space-time coding gain are impaired.

On the other hand, in this embodiment, space-time decoding is possible by using signals from which interference from a different space-time coding group has been eliminated, enabling diversity gain and space-time coding gain to be obtained. Also, while space-time coding sections 425 may execute (time-axis) space-time coding on consecutive symbol data, when multicarrier transmission is performed, the same kind of effect is obtained even if space-frequency coding is executed between adjacent subcarriers.

Also, according to this embodiment, even in a 4×4 STBC-MIMO system, space-time coding sections and space-time decoding sections common to a 2×2 STBC-MIMO system can be used, enabling circuit scale and development costs to be reduced.

Moreover, according to this embodiment, diversity gain and coding gain can be obtained by means of a receiving method in which 2-branch STBC —that is, full-rate space-time coding is applied, and furthermore first signal demultiplexing section 230 of radio communication apparatus 500 is used. If space-time coding is performed using four transmitting antennas, 4-branch STBC can be applied in which four coded sequences are created by a single space-time coding section, but the transmission rate falls since full-rate space-time coding cannot be performed.

Furthermore, in this embodiment, radio communication apparatus 400 has a configuration whereby coding is performed on transmit data before serial/parallel conversion by S/P conversion section 422—that is, a configuration in which coding section 121 is located be fore S/P conversion section 422—but a coding section that codes parallel data sequences may also be provided after S/P conversion section 422 instead of before it.

In this embodiment, also, a configuration is used in which space-time decoding by means of block coding such as STBC is employed, but the same kind of effect can also be obtained with a configuration that uses space-time coding such as STTC (Space-Time Trellis Coding) or STTTC (Space-Time Turbo Trellis Coding).

(Embodiment 4)

Embodiment 4 is an embodiment in which a multicarrier communication method is applied to radio communication system 10 of Embodiment 1.

Figure 20:
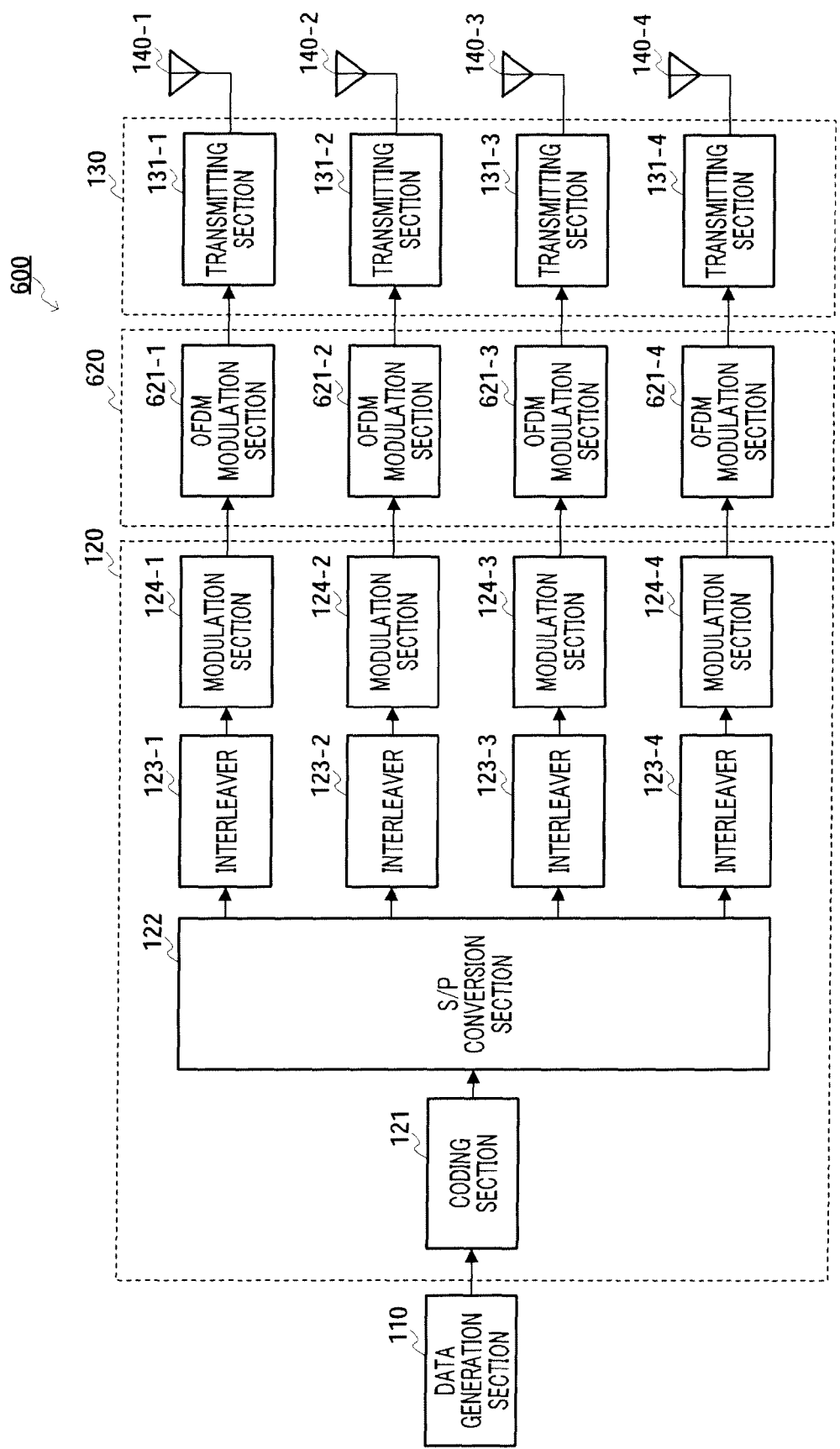
FIG. 20 is a block diagram showing the configuration of a radio communication apparatus (transmitting-side) of Embodiment 4.

As shown in FIG. 20, radio communication apparatus 600 of Embodiment 4 has OFDM modulation section 620 between transmit signal composing section 120 and transmitting section 130.

OFDM modulation section 620 executes OFDM modulation, including serial/parallel conversion, IFFT conversion, parallel/serial conversion, and guard interval (GI) insertion, on N transmit signals generated by transmit signal composing section 120. OFDM modulation section 620 has N (here, N=4) OFDM modulation sections 621. Thus, transmit signals of this embodiment are OFDM signals.

Figure 21:
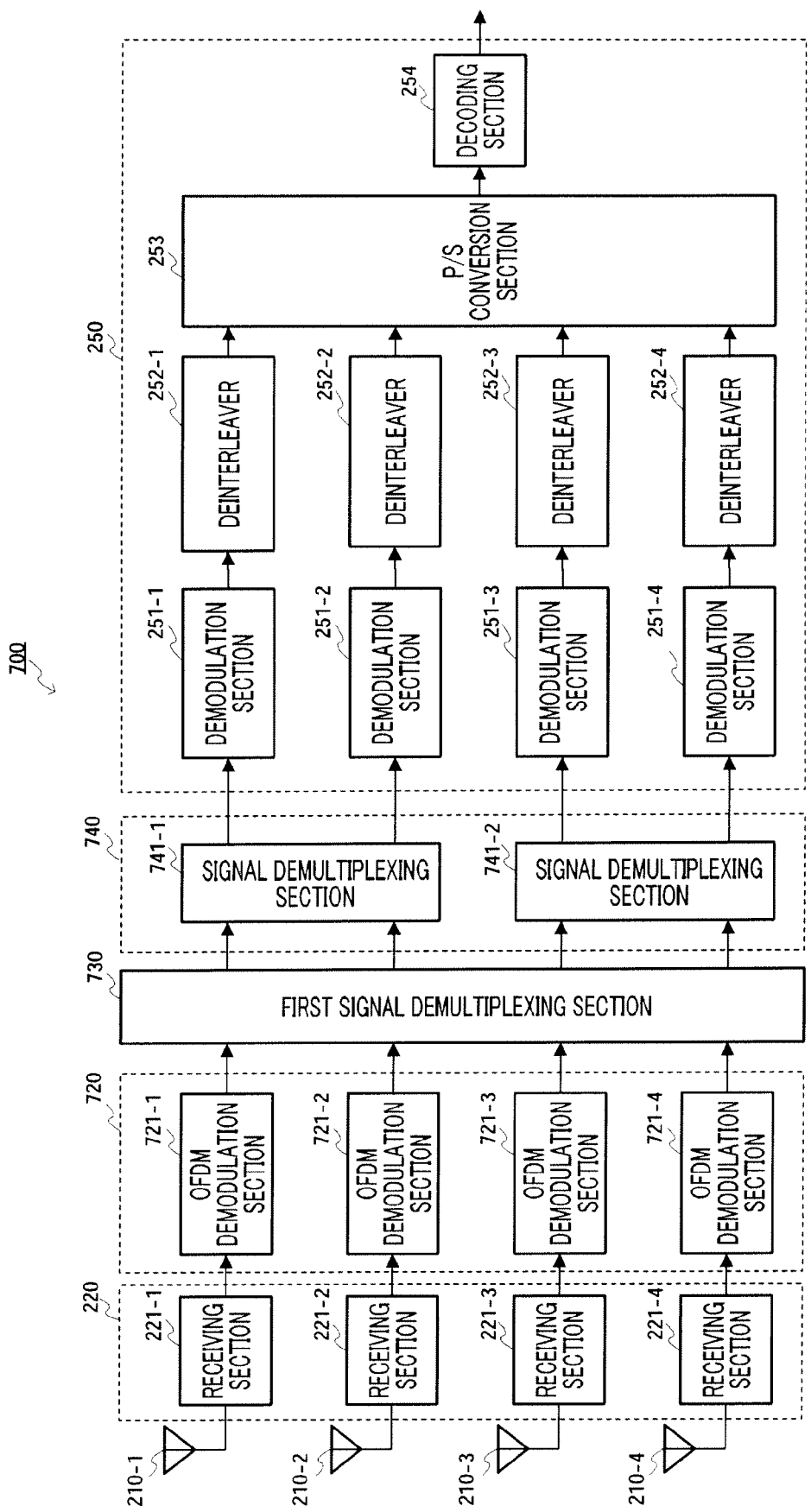
FIG. 21 is a block diagram showing the configuration of a radio communication apparatus (receiving-side) of Embodiment 4.

As shown in FIG. 21, radio communication apparatus 700 of Embodiment 4 has OFDM demodulation section 720, first signal demultiplexing section 730, and second signal demultiplexing section 740.

OFDM demodulation section 720 is equipped with GI removal sections, FFT sections, and serial/parallel conversion sections, executes OFDM demodulation processing on each spatially multiplexed signal after being received by respective antennas 210 and undergoing radio reception processing by receiving section 220, and outputs post-OFDM-demodulation spatially multiplexed signals.

Specifically, OFDM demodulation section 720 executes OFDM demodulation processing on each spatially multiplexed signal after being received by respective antennas 210 and undergoing radio reception processing by receiving section 220, and performs output for each symbol (specified by frequency and time) superimposed on each subcarrier of a spatially multiplexed signal received by each antenna 210.

For example, OFDM demodulation section 721-1 executes OFDM demodulation processing on a spatially multiplexed signal received by antenna 210-1. A spatially multiplexed signal received by antenna 210-1 contains transmission signals transmitted from antennas 140-1 through 140-4 of transmitting-side radio communication apparatus 600. Each transmission signal is an OFDM signal, and to consider symbols, also, symbols transmitted from antennas 140-1 through 140-4 of radio communication apparatus 600 are spatially multiplexed.

First signal demultiplexing section 730 executes linear computation on a (degree-of-multiplexing-N) spatially multiplexed signal from receiving section 220, performs demultiplexing into spatially multiplexed signal groups composed of a number of transmission signals (radio communication apparatus 100 transmit signals) smaller than degree-of-multiplexing N, and outputs these groups to second signal demultiplexing section 740. Specifically, first signal demultiplexing section 730 executes linear computation on each symbol received from an OFDM demodulation section, performs demultiplexing into spatially multiplexed symbol groups (corresponding to spatially multiplexed signal groups) composed of a number of transmission symbols smaller than degree-of-multiplexing N, and outputs these groups to second signal demultiplexing section 740.

Second signal demultiplexing section 740 has the spatially multiplexed signal groups demultiplexed by first signal demultiplexing section 230 as input, and demultiplexes a spatially multiplexed signal of each group into transmission signals contained in that spatially multiplexed signal. Specifically, second signal demultiplexing section 740 has spatially multiplexed symbol groups as input, and demultiplexes these into symbols contained in a spatially multiplexed signal of each group. Demultiplexed symbols are demodulated by demodulation sections 251 and become bit data.

Next, the operation of radio communication apparatus 600 and radio communication apparatus 700 having the above configurations will be described.

In radio communication apparatus 600, data generation section 110 generates a data sequence zn to be transmitted to radio communication apparatus 700. Coding section 121 performs error correction coding of data sequence zn using a predetermined coding rate.

S/P conversion section 122 converts the coded data sequence to transmission sequences $x_n(k)$ (where n=1 to 4) comprising four parallel data sequences. Here, a column vector having four elements of transmission sequence $x_n(k)$ is written as x(k).

Transmission sequences $x_n(k)$ (where n=1 to 4) are then interleaved by interleavers 123 on a sequence-by-sequence basis, and undergo OFDM modulation, including serial/parallel conversion, IFFT conversion, parallel/serial conversion, and guard interval (GI) insertion, in OFDM modulation section 620. Information regarding OFDM modulation and demodulation methods is disclosed in "Ochi, 'OFDM system technology and MATLAB simulation', Triceps", and a description thereof is omitted here.

Transmission sequences $x_n(k)$ that have undergone OFDM modulation processing are subjected to frequency conversion and band-limiting processing in transmitting section 130, and are transmitted from antennas 140 as transmit signals that are high-frequency signals after amplification.

A degree-of-multiplexing-N (where N=4) spatially multiplexed signal received by antennas 210 undergoes orthogonal detection after amplification and frequency conversion by receiving sections 221-1 through 221-4, is converted to a baseband signal on the IQ plane, and is output to OFDM demodulation section 720 as received signal y(k) represented by a complex digital signal using an A/D converter. In this description, it is assumed that frequency synchronization, phase synchronization, and symbol synchronization have been established. Here, y(k) is a column vector containing received signals received via antennas 210 as elements.

OFDM demodulation section 720 executes OFDM modulation, and outputs Nc per-subcarrier symbol data sequences. Here, an fs'th per-subcarrier symbol data sequence at discrete time k is written as Y(k, fs). Y(k, fs) is a column vector containing received signals received via antennas 210 as elements, where fs=1 to Nc.

Different per-subcarrier symbol data sequences are input to first signal demultiplexing section 730 from OFDM demodulation sections 721-1 through 721-4 corresponding to the four antennas. Here, if the fs'th subcarrier data sequence in each transmit signal (transmission sequence) from radio communication apparatus 600 is written as $X_n(k, fs)$, as long as the relative delay time from the multipath leading wave in the propagation path is within the guard interval (GI) range, a frequency selective fading environment can be treated as a flat fading propagation environment, and therefore received signal (subcarrier data sequence) Y(k, fs) received by radio communication apparatus 700 is expressed as shown in Equation (21).

$$\begin{bmatrix} y_1(k,f_s) \\ y_2(k,f_s) \\ y_3(k,f_s) \\ y_4(k,f_s) \end{bmatrix} = \begin{bmatrix} h_{11}(k,f_s) & h_{12}(k,f_s) & h_{13}(k,f_s) & h_{14}(k,f_s) \\ h_{21}(k,f_s) & h_{22}(k,f_s) & h_{23}(k,f_s) & h_{24}(k,f_s) \\ h_{31}(k,f_s) & h_{32}(k,f_s) & h_{33}(k,f_s) & h_{34}(k,f_s) \\ h_{41}(k,f_s) & h_{42}(k,f_s) & h_{43}(k,f_s) & h_{44}(k,f_s) \end{bmatrix} \begin{bmatrix} x_1(k,f_s) \\ x_2(k,f_s) \\ x_3(k,f_s) \\ x_4(k,f_s) \end{bmatrix} + \begin{bmatrix} n_1(k,f_s) \\ n_2(k,f_s) \\ n_3(k,f_s) \\ n_4(k,f_s) \end{bmatrix} \quad (21)$$

$H_n(k, fs)$ in Equation (21) indicates propagation path fluctuation received by symbol data sequence $X(k, fs)$ of the fs'th subcarrier of the n'th transmitting antenna, and is a matrix comprising (number of radio communication apparatus 600 antennas: 4) rows×(number of radio communication apparatus 700 transmitting antennas: 4) columns. $H_n(k, fs)$ row-i, column-j matrix element $h_{ij}$ indicates propagation path fluctuation on the propagation path of the fs'th subcarrier signal when a signal transmitted from j'th antenna 140 of radio communication apparatus 600 is received by i'th antenna 210 of radio communication apparatus 700. Also, $n(k, fs)$ indicates a noise vector having four elements added at the time of reception by radio communication apparatus 700 antennas 210.

First signal demultiplexing section 730 transforms Equation (21) into Equation (22) by performing linear computation on fs'th subcarrier data sequence $Y(k, fs)$ using propagation path fluctuation estimate $B_n(k, fs)$ for propagation path fluctuation $H_n(k, fs)$ of the fs'th subcarrier group estimated by utilizing a known pilot signal or the like transmitted from radio communication apparatus 600.

$$\begin{bmatrix} v_1(k,f_s) \\ v_2(k,f_s) \\ v_3(k,f_s) \\ v_4(k,f_s) \end{bmatrix} = \begin{bmatrix} g_{11}(k,fs) & g_{12}(k,fs) & 0 & 0 \\ g_{21}(k,fs) & g_{22}(k,fs) & 0 & 0 \\ 0 & 0 & g_{33}(k,fs) & g_{34}(k,fs) \\ 0 & 0 & g_{43}(k,fs) & g_{44}(k,fs) \end{bmatrix} \begin{bmatrix} x_1(k,f_s) \\ x_2(k,f_s) \\ x_3(k,f_s) \\ x_4(k,f_s) \end{bmatrix} + \begin{bmatrix} e_1(k,fs) \\ e_2(k,fs) \\ e_3(k,fs) \\ e_4(k,fs) \end{bmatrix} \quad (22)$$

By performing linear computation in this way, four degree-of-multiplexing-4 spatially multiplexed signals can be demultiplexed into two groups of spatially multiplexed signals.

The groups of spatially multiplexed signals demultiplexed by first signal demultiplexing section 730 are input to second signal demultiplexing section 740. In second signal demultiplexing section 740, the spatially multiplexed signals of each group are demultiplexed into the individual transmission signals contained in those spatially multiplexed signals. Specifically, spatially multiplexed signals $v_1(k, fs)$ and $v_2(k, fs)$ comprising two first group transmission sequences obtained on a subcarrier-by-subcarrier basis are input to signal demultiplexing section 741-1 and demultiplexed into $x_1(k, fs)$ and $x_2(k, fs)$ by signal demultiplexing section 741-1, and $v_3(k, fs)$ and $v_4(k, fs)$ of the second group are processed in a similar way by signal demultiplexing section 741-2.

In second signal demultiplexing section 740, ZF (Zero Forcing), MMSE (Minimum Mean Square Error), MLD (Maximum Likelihood Detection), or the like can be used as an algorithm for demultiplexing transmission signals contained in the spatially multiplexed signal groups. Using an MLD demultiplexing method enables diversity gain to be obtained (equivalent to diversity gain obtained in spatial multiplexing transmission with two transmitting-side antennas and two receiving-side antennas (2×2 spatial multiplexing transmission)).

Here, with 4×4 spatial multiplexing transmission, even if an attempt is made to demultiplex all transmission signals by one-stage demultiplexing processing by means of MLD, the amount of computation is extremely large, and therefore the processing time is lengthy and implementation with a practical hardware scale is difficult. However, by dividing the demultiplexing processing into two stages as described above, implementation with practical hardware becomes possible. That is to say, in first signal demultiplexing section 730 that performs first-stage demultiplexing processing, linear computation is executed on a spatially multiplexed signal, demultiplexing is performed into spatially multiplexed signal groups composed of a number of transmit signals smaller than spatially multiplexed signal degree-of-multiplexing N, and inter-group interference is eliminated. Then, in second signal demultiplexing section 740 that performs second-stage demultiplexing processing, demultiplexing processing is performed using signals from which an interference signal from the other group has been eliminated by first signal demultiplexing section 730, and therefore, even with MLD used for second-stage signal demultiplexing, the number of signal point candidates in MLD can be reduced, making implementation with practical hardware possible. Furthermore, dividing the demultiplexing processing into two stages, while not enabling the diversity gain obtained by 4×4 spatial multiplexing transmission to be obtained, does enable the diversity gain obtained by 2×2 spatial multiplexing transmission to be obtained.

Transmission signals demultiplexed by second signal demultiplexing section 740 are demodulated by demodulation sections 251, deinterleaved by deinterleavers 252, and input to P/S conversion section 253. Specifically, first-group signal sequences $x_1(k, fs)$ and $x_2(k, fs)$ are converted from a symbol data sequence to a bit data sequence by means of a predetermined modulation method by demodulation sections 251-1 and 251-2 respectively, and the bit data sequences obtained by demodulation sections 251-1 and 251-2 have their bit order restored by operations by de interleavers 252-1 and 252-2 that are the reverse of the interleaving executed on the transmitting side. The same kind of processing is also performed for second-group signal sequences $x_3(k, fs)$ and $x_4(k, fs)$.

The demultiplexing algorithm in signal demultiplexing sections 741 of second signal demultiplexing section 740 may be the same in both signal demultiplexing sections 741, or may be changed for each in a fixed manner or adaptively according to the number of modulation multi-values of the transmission sequences, the number of received signals, or the like. For example, MLD could be used in the case of BPSK or QPSK having a small number of modulation multi-values, while a linear method such as MMSE could be used in the case of 16QAM or 64QAM having a large number of modulation multi-values.

Thus, according to this embodiment, when a plurality of transmission signals are transmitted from radio communication apparatus 600, it is possible to perform signal demultiplexing in two stages by means of first signal demultiplexing section 730 and second signal demultiplexing section 740 with those as one unit on a subcarrier-by-subcarrier basis. By this means, the effect of Embodiment 1 can also be obtained in a frequency selective fading environment.

Also, better reception characteristics can be obtained than with a conventional method (ZF or MMSE), with a practical hardware scale.

If batch demultiplexing processing by means of conventional ZF or MMSE linear processing is used instead of first signal demultiplexing section 730, it is still possible to extract radio communication apparatus 600 transmission sequences (transmission signals), but when STBC or STC space-time coding is executed, if a plurality of transmission sequences from the same radio communication apparatus 600 are included, antenna degree of freedom is used for interference suppression due to the nature of forming a reception weight for demultiplexing reception of these, and therefore diversity gain and space-time coding gain are impaired.

Also, application of space frequency coding called SFBC (Space frequency block coding) is also possible using different subcarriers and different transmitting antennas, utilizing multicarrier transmission, but in this case also, if batch demultiplexing processing by means of conventional ZF or MMSE linear processing is used, antenna degree of freedom is used for interference suppression due to the nature of forming a reception weight for demultiplexing reception of these, and therefore diversity gain and space-time coding gain are impaired.

It is also possible to introduce batch demultiplexing processing based on conventional MLD instead of first signal demultiplexing section 730.

However, although reception characteristics are better than in this embodiment, the amount of MLD processing on transmission sequences from all the transmitting antennas increases exponentially relative to the number of transmission sequences and the number of modulation multi-values of a transmission sequence, making practical hardware implementation difficult.

In this embodiment, the number of second signal demultiplexing sections 740 provided is equal to the number of sets of degree-of-multiplexing-2 spatially multiplexed signals, but it is also possible to implement a configuration whereby input to second signal demultiplexing section 740 is switched sequentially by providing a suitable indicator (transmission sequence permissible delay amount, data classification, or the like) based on the transmission sequence QoS, and setting priorities for performing reception processing on a set-by-set basis. In this case, the number of signal demultiplexing sections 741 can be made smaller than a set of degree-of-multiplexing-2 spatially multiplexed signals. In this case, depending on the set, the processing delay unit transmission data is reconstituted increases, but the configuration of radio communication apparatus 700 can be simplified. Furthermore, by adopting this approach, a reception circuit that reconstitutes a degree-of-multiplexing-4 spatially multiplexed signal can be configured simply by adding first signal demultiplexing section 730 to a reception circuit that reconstitutes a degree-of-multiplexing-2 spatially multiplexed signal.

(Embodiment 5)

In Embodiment 1, transmitting-side radio communication apparatus 100 executes coding on one line of transmit data, performs serial/parallel conversion of the coded transmit data, and generates N parallel data sequences—the same number as the number of antennas. In contrast, in Embodiment 5, in the transmitting-side radio communication apparatus one line of transmit data undergoes serial/parallel conversion to a number of parallel transmit data smaller than number of antennas N, coding is executed for each parallel transmit data, serial/parallel conversion is executed for each coded parallel transmit data, and N parallel data sequences the same number as the number of antennas—are generated in total.

Figure 22:
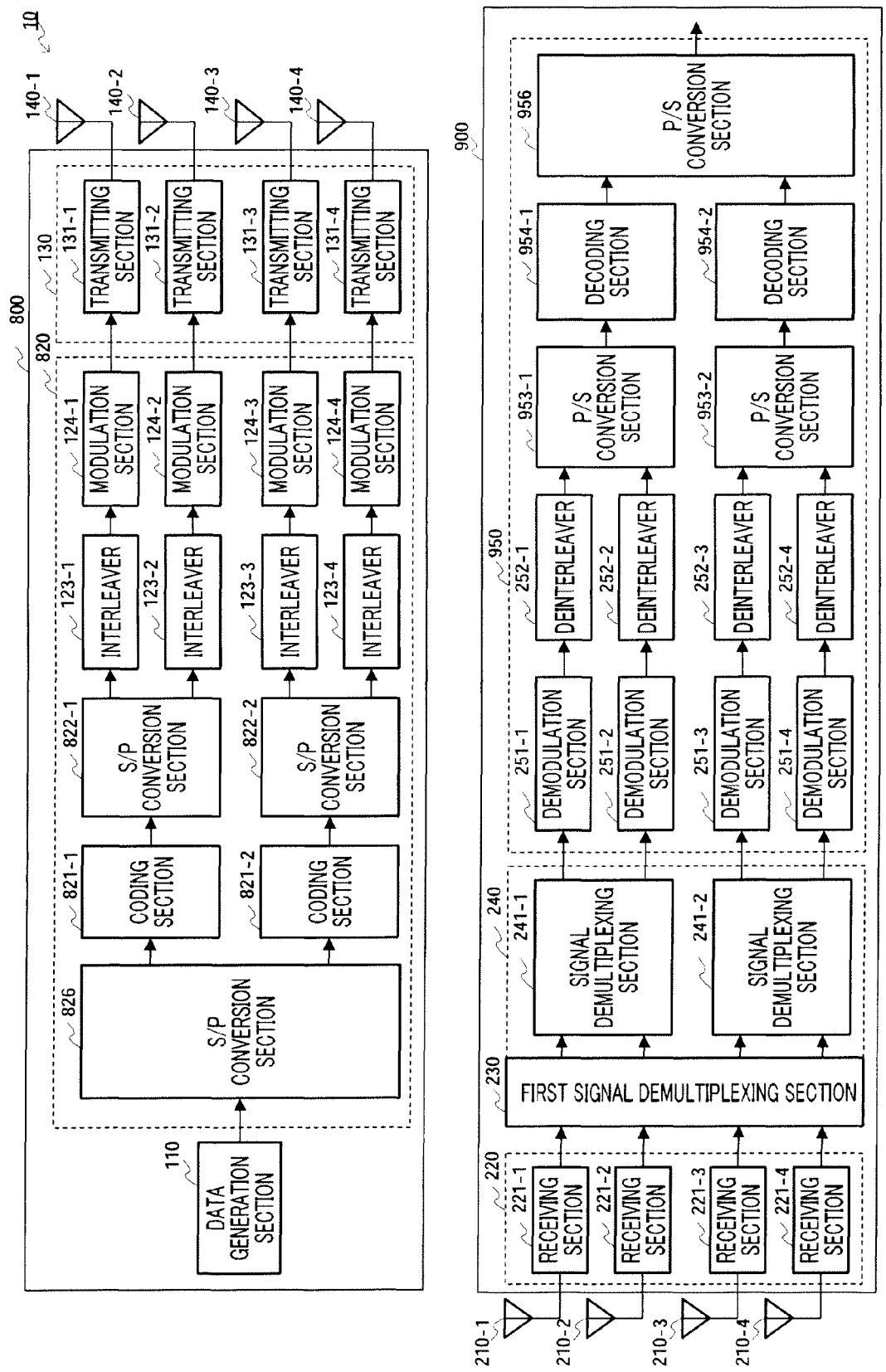
FIG. 22 is a drawing showing a configuration of a radio communication system of Embodiment 5.

As shown in FIG. 22, radio communication apparatus 800 of Embodiment 5 has transmit signal composing section 820. This transmit signal composing section 820 has coding sections 821-1 and 821-2, S/P conversion sections 822-1 and 822-2, and S/P conversion section 826.

S/P conversion section 826 has one line of transmit data as input, and generates a number of parallel transmit data smaller than number of antennas N by executing serial/parallel conversion on the transmit data. Here, two parallel transmit data are generated.

Coding sections 821 execute error correction coding on the respective parallel transmit data using a predetermined coding rate, and output post-error-correction-coding parallel transmit data to S/P conversion sections 822.

S/P conversion sections 822 further perform serial/parallel conversion on the respective post-coding-processing parallel transmit data, and generate a number of parallel data sequences equivalent to the number of antennas. Here, the two parallel transmit data each undergo further serial/parallel conversion to two parallel data sequences, so that four parallel data sequences are generated in total. The transmit data sequences are then input to interleavers 123.

In line with the above configuration of transmitting-side radio communication apparatus 800, receiving-side radio communication apparatus 900 has received signal processing section 950. This received signal processing section 950 has P/S conversion sections 953-1 and 953-2, decoding sections 954-1 and 954-2, and P/S conversion section 956.

First signal demultiplexing section 230 has the same kind of function as in Embodiment 1, but receiving section 220 executes linear computation on a (degree-of-multiplexing-N) spatially multiplexed signal from receiving section 220, and performs demultiplexing into groups of spatially multiplexed signals comprising transmission signals composed of the same parallel transmit data. That is to say, first signal demultiplexing section 230 executes linear computation on a (degree-of-multiplexing-N) spatially multiplexed signal from receiving section 220, and performs demultiplexing into spatially multiplexed signal groups on a coding-unit by coding-unit basis.

P/S conversion sections 953 perform parallel/serial conversion of deinterleaved transmission data, and output per-coding-unit serial data sequences.

Decoding sections 954 perform decoding processing on per-coding-unit serial data sequences from P/S conversion sections 953.

P/S conversion section 956 further performs parallel/serial conversion of the per-coding-unit serial data sequences that have undergone decoding processing in decoding sections 954, and outputs receive data corresponding to radio communication apparatus 100 transmit data.

Next, the operation of radio communication apparatus 800 and radio communication apparatus 900 having the above configurations will be described.

In S/P conversion section 826, one line of transmit data generated by data generation section 110 is divided into two parallel transmit data. The parallel transmit data undergo error correction coding by coding sections 821-1 and 821-2 using a predetermined coding rate.

In S/P conversion sections 822-1 and 822-2, the respective coded data sequences are each further divided into two sequences. Then transmit signals are generated for each sequence by means of the same kind of procedure as used in radio communication apparatus 100 of Embodiment 1.

In first signal demultiplexing section 230, linear computation is executed on a (degree-of-multiplexing-N) spatially multiplexed signal from receiving section 220, and demultiplexing is performed into groups of spatially multiplexed signals on a coding-unit by coding-unit basis.

In second signal demultiplexing section 240, spatially multiplexed signals of each group are demultiplexed into transmission signals contained in the relevant spatially multiplexed signals.

In P/S conversion sections 953, transmission signals of the same coding unit undergo parallel/serial conversion to coding-unit serial data sequences. The serial data sequences undergo error correction coding processing by decoding sections 954-1 and 954-2 respectively. The post-error-correction serial data sequences are combined into one sequence by P/S conversion section 956, and output as one line of received data.

By providing a plurality of coding units in this way, the communication path coding execution time can be shortened in proportion to the number of coding sections, which is advantageous in data sequence transmission that requires a high bit rate. The number of coding units may also be made the same as the number of antennas in order to provide still more coding units. A sample configuration of a radio communication apparatus for this case is shown in FIG. 23.

Figure 23:
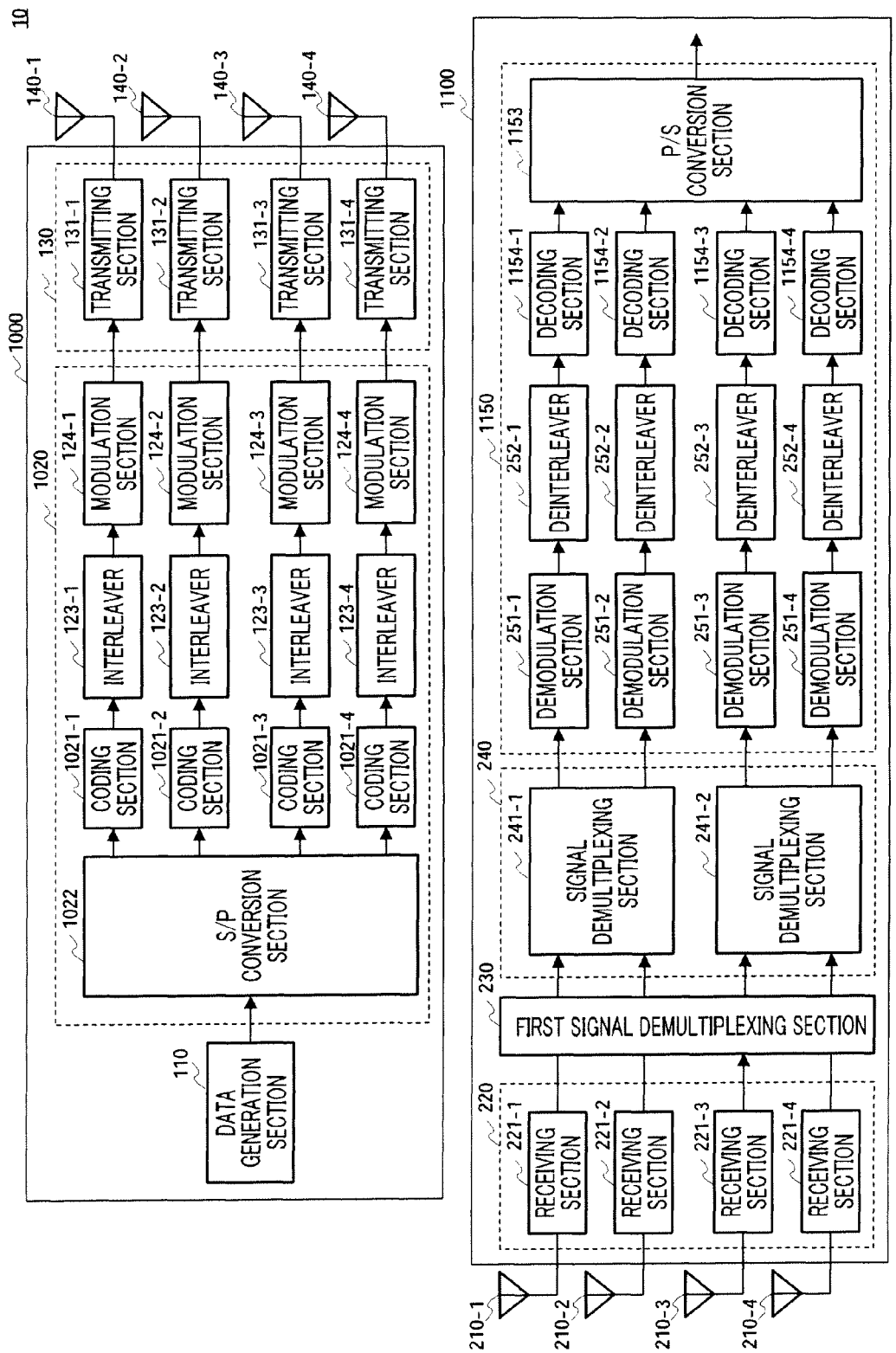
FIG. 23 is a drawing showing another configuration of a radio communication system of Embodiment 5.

As shown in FIG. 23, transmitting-side radio communication apparatus 1000 has transmit signal composing section 1020. This transmit signal composing section 1020 has coding sections 1021-1 through 1021-4 and S/P conversion section 1022. S/P conversion section 1022 generates parallel data sequences by executing serial/parallel conversion on one line of transmit data generated by data generation section 110. Coding sections 1021 execute coding processing for each parallel data sequence—that is, with the respective parallel data sequences as coding units.

Figure 24:
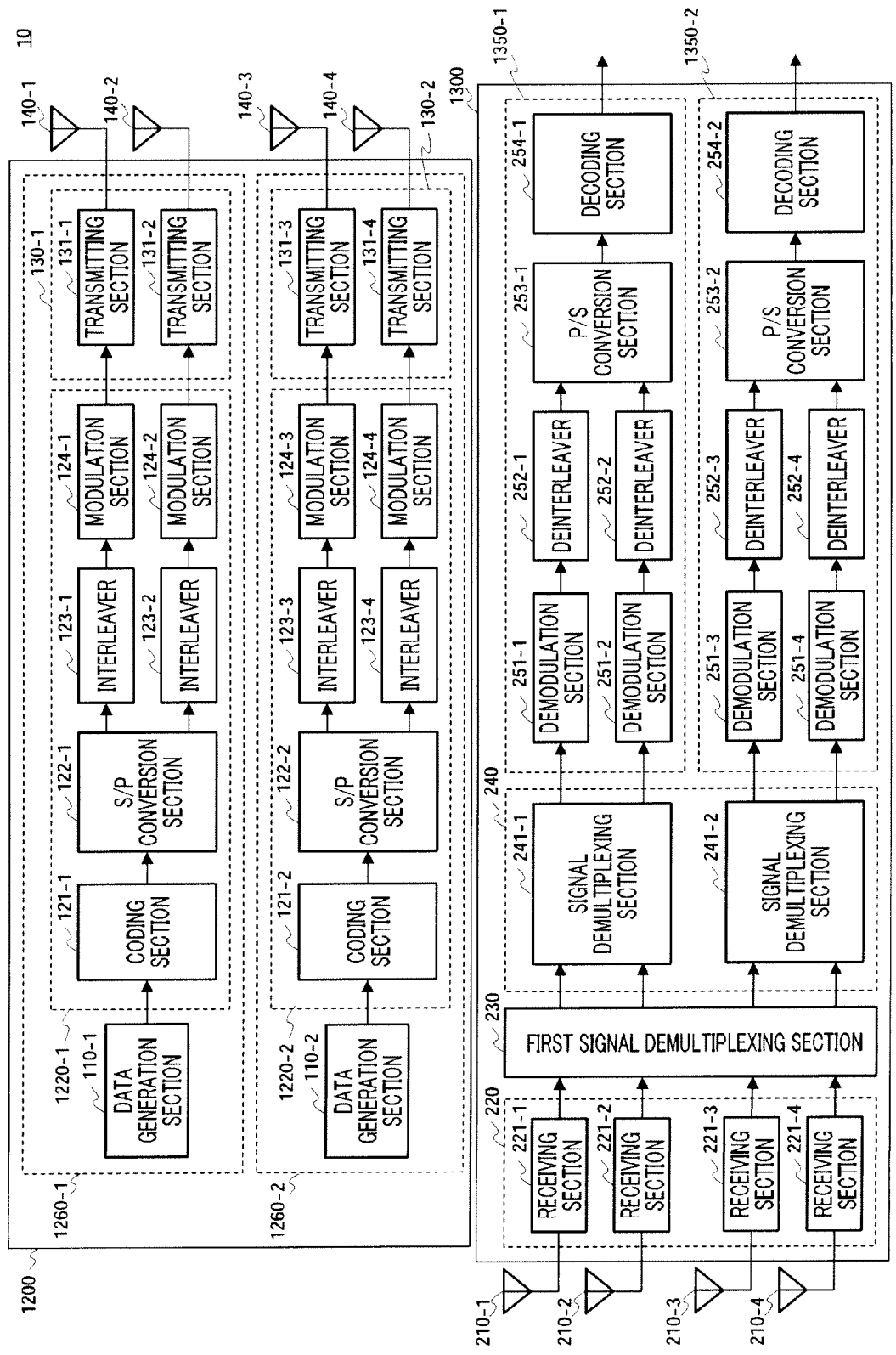
FIG. 24 is a drawing showing another configuration of a radio communication system of Embodiment 5.

Another example of a case in which a plurality of coding units are provided is shown in FIG. 24. This is a case in which there are a plurality of lines of transmit data, and coding is executed for each line of transmit data. As shown in FIG. 24, radio communication apparatus 1200 has data generation section 110-1 and data generation section 110-2, and transmit signal composing section 1220-1 and transmit signal composing section 1220-2. That is to say, radio communication apparatus 1200 has a plurality of transmission systems (in FIG. 24, two transmission systems (transmission systems 1260-1 and 1260-2)), and transmits transmit signals composed of a plurality of lines of transmit data. Each transmit signal composing section 1220 has a coding section 121. In this way, a plurality of lines of transmit data can be transmitted simultaneously. Transmission systems 1260-1 and 1260-2 may also be made independent radio communication apparatuses, with the two radio communication apparatuses being connected in a space division multiple access (SDMA) arrangement to transmit signals simultaneously.

Also, as shown in FIG. 24, radio communication apparatus 1300 has received signal processing section 1350-1 and received signal processing section 1350-2. First signal demultiplexing section 230 has the same kind of function as in Embodiment 1, but performs demultiplexing into spatially multiplexed signal groups in transmission system units. Received signal processing sections 1350 perform received signal processing for transmission signals corresponding to the transmitting-side radio communication apparatus 1200 transmission systems. By this means, it is possible to achieve highly efficient radio transmission by changing modulation section 124, interleavers 123, and signal demultiplexing section 241 of second signal demultiplexing section 240, according to the QoS of transmit data.

Figure 25:
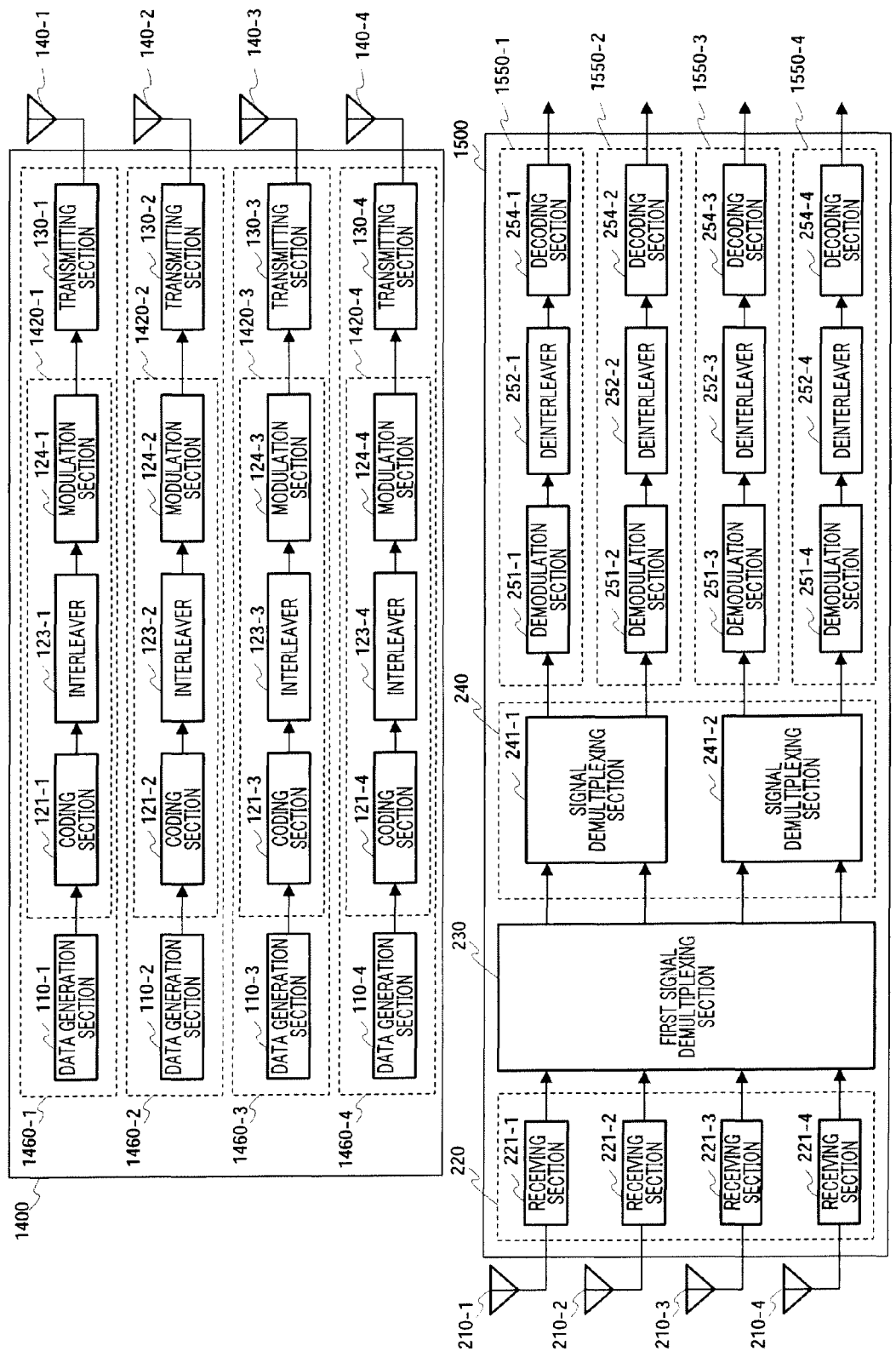
FIG. 25 is a drawing showing another configuration of a radio communication system of Embodiment 5.

Yet another example of a case in which a plurality of coding units are provided is shown in FIG. 25. This is a case in which there are the same number of lines of transmit data as the number of antennas, and coding is executed for each line of transmit data. As shown in FIG. 25, radio communication apparatus 1400 has data generation sections 110-1 through 110-4 and transmit signal composing sections 1420-1 through 1420-4. That is to say, radio communication apparatus 1400 has a plurality of transmission systems equal in number to the number of antennas (in FIG. 25, four transmission systems (transmission systems 1460-1 through 1460-4)), and transmits transmit signals composed of a plurality of lines of transmit data. Each transmit signal composing section 1460 has a coding section 121. Transmission systems 1460-1 through 1460-4 may also be made independent radio communication apparatuses, with those radio communication apparatuses being connected in a space division multiple access (SDMA) arrangement to transmit signals simultaneously. Also, as shown in FIG. 25, radio communication apparatus 1500 has received signal processing sections 1550-1 through 1550-4.

In this embodiment, single-carrier transmission has been used, but application to the same kind of multicarrier transmission as in Embodiment 4 is also possible.

Also, above radio communication apparatuses 900, 1100, 1300, and 1500 have configurations in which an interference canceller is not used, but configurations may also be used in which the interference canceller described in Embodiment 2 is provided.

Also, above radio communication apparatuses 800, 900, 1000, 1100, 1200, 1300, 1400, and 1500 have coding is not performed, but configurations may also be used in which the space-time coding sections described in Embodiment 3 are provided.

Figure 34:
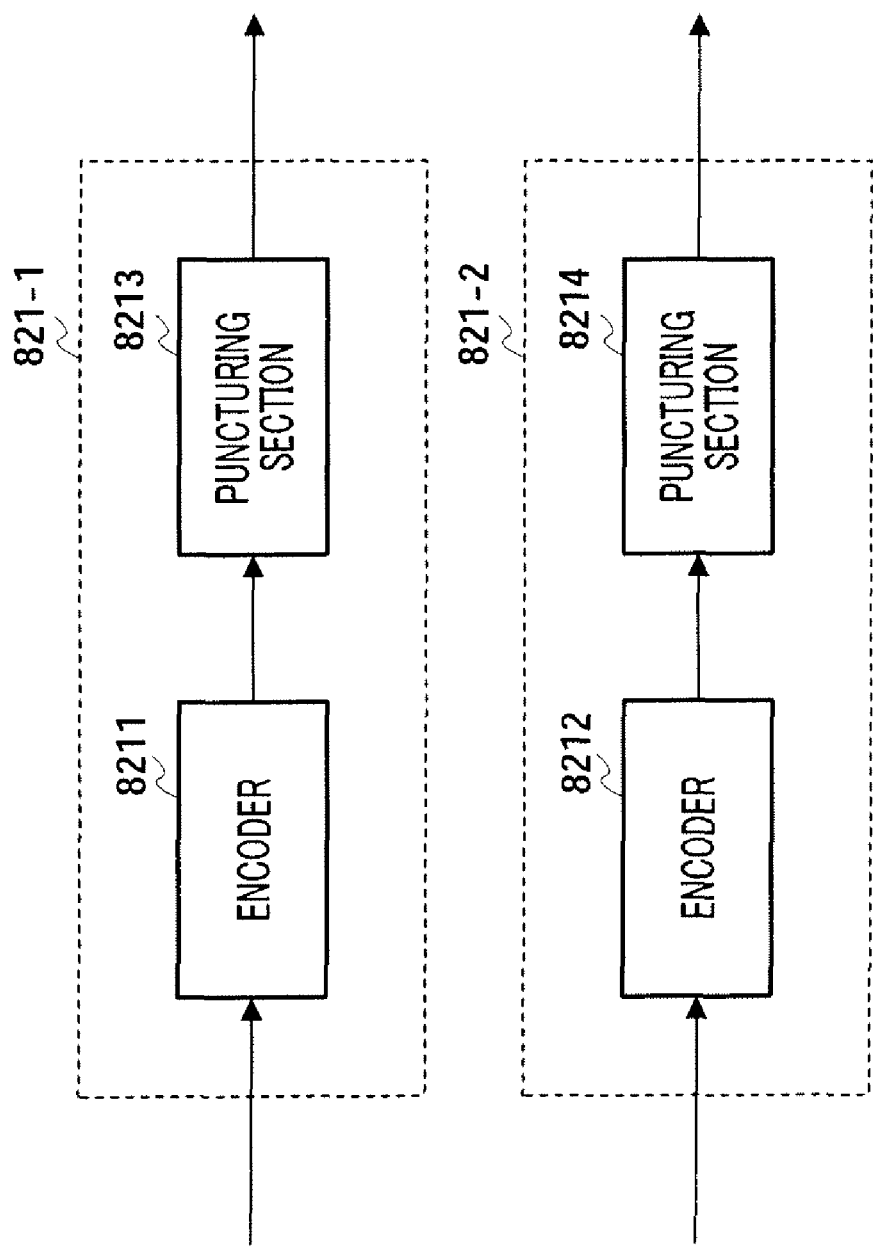
FIG. 34 is a block diagram showing another configuration of a coding section in a radio communication apparatus (transmitting-side) of Embodiment 5.

In the description of this embodiment, coding section 821-1 and coding section 821-2 in transmitting-side radio communication apparatus 800 have been assumed to have the same configuration, but different configurations may also be used, and, for example, different puncture patterns can be used. Configurations of coding section 821-1 and coding section 821-2 in this case are shown in FIG. 34. The same also applies to coding section 121-1 and coding section 121-2 in radio communication apparatus 1200, and a description of this case is omitted below.

Coding section 821-1 is equipped with encoder 8211 and puncturing section 8213 that performs puncturing using puncture pattern A. Coding section 821-2 is equipped with encoder 8212 and puncturing section 8214 that performs puncturing using puncture pattern B.

On the other hand, patterns corresponding to the puncture patterns are also used for the depuncture patterns of decoding sections 954-1 and 954-2 of receiving-side radio communication apparatus 900. The same also applies to decoding section 254-1 and decoding section 254-2 in radio communication apparatus 1300, and a description of this case is omitted below.

In this case, first signal demultiplexing section 230 performs signal demultiplexing in such a way as to eliminate a group of a different puncture pattern —that is, to include transmission sequences of the same puncture pattern in the same group. Then, second signal demultiplexing section 240 performs demultiplexing of transmission signals (transmission sequences) contained in a group. By making the puncture pattern the same within a group in this way, sections from second signal demultiplexing section 240 to P/S conversion section 956 can be configured independently on a group-by-group basis, and processing from second signal demultiplexing section 240 to P/S conversion section 956 can be executed independently on a group-by-group basis.

Figure 35:
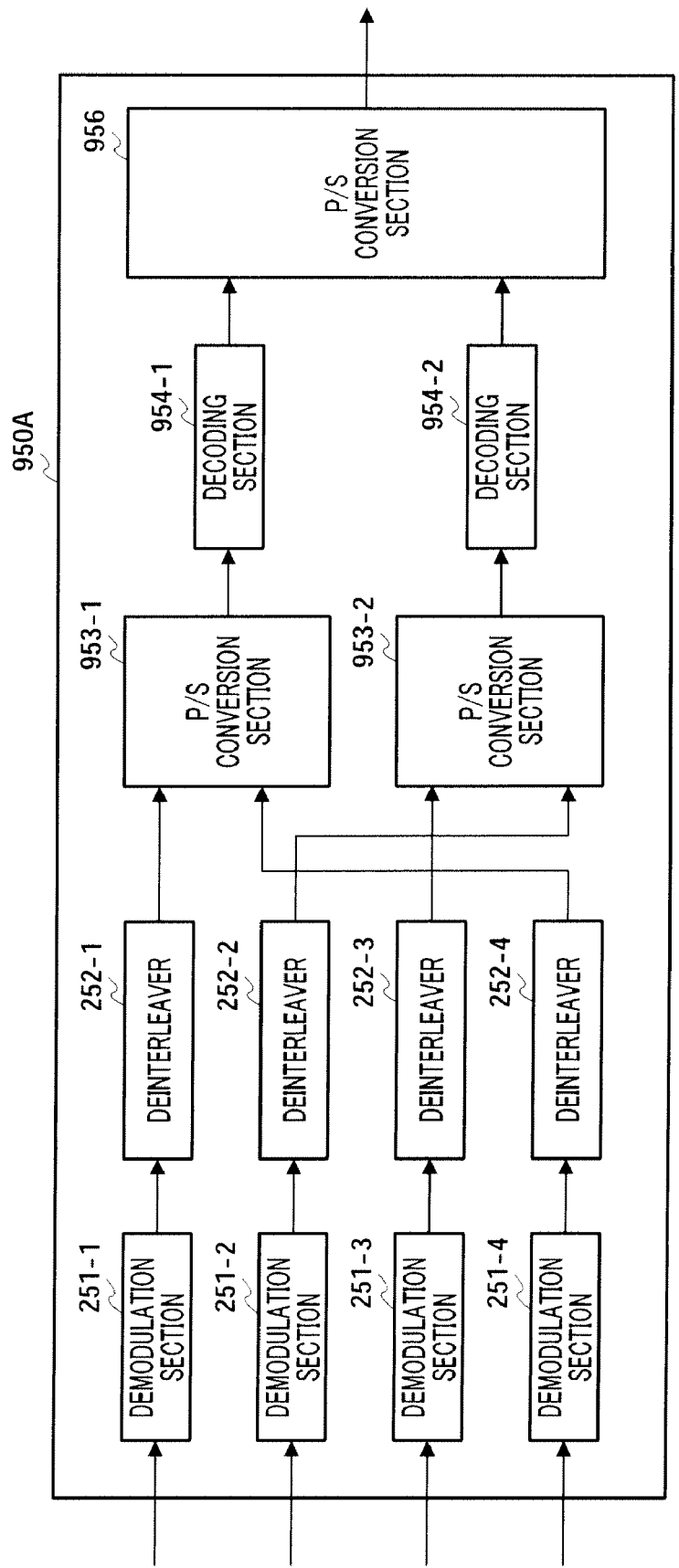
FIG. 35 is a block diagram showing another configuration of the received signal processing section in a radio communication apparatus (receiving-side) of Embodiment 5.

Also, in radio communication apparatus 900, first signal demultiplexing may be performed in such a way that the puncture pattern differs by transmission signal (transmission sequence) within a group. For example, for the first group, division may be performed into transmission sequences in which x1 is punctured using pattern A and x2 is punctured using pattern B, while for the second group, division is performed into transmission sequences in which x3 is punctured using pattern A and x4 is punctured using pattern B. FIG. 35 shows another configuration of received signal processing section 950 (received signal processing section 950A) in radio communication apparatus 900 in this case.

Here, division is performed into groups containing transmission sequences with different puncture patterns in first signal demultiplexing as described above. On the transmitting side, parallel data sequences are formed by S/P conversion sections 822 on a puncture-pattern by puncture-pattern basis. Consequently, on the receiving side it is necessary to execute P/S conversion and decoding on parallel data sequences of the same puncture pattern, and therefore input to the P/S conversion sections 953 is performed for each parallel data sequence of the same puncture pattern, as shown in FIG. 35.

(Embodiment 6)

In this embodiment, diversity gain is improved without using an interference canceller.

Figure 26:
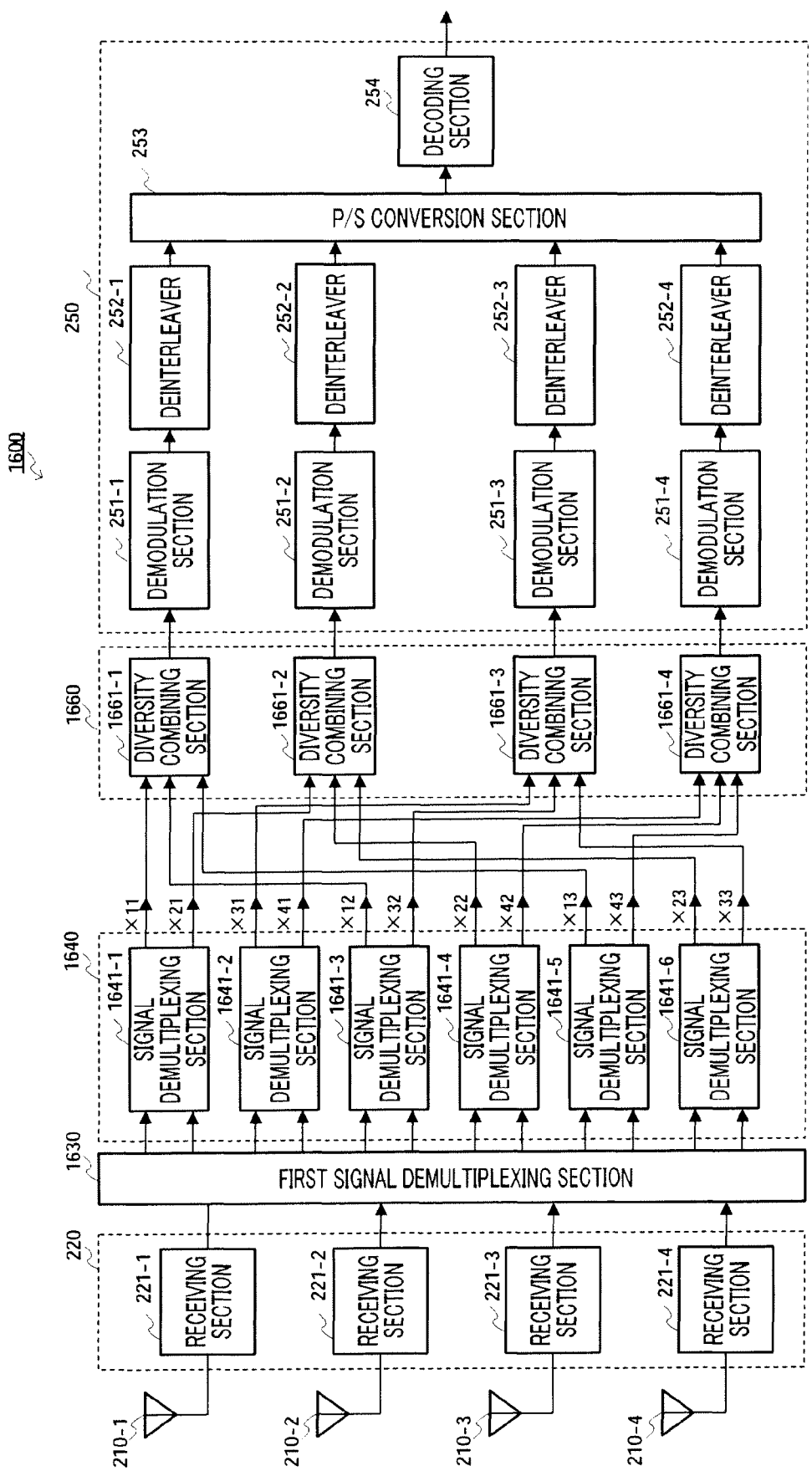
FIG. 26 is a block diagram showing a configuration of a radio communication apparatus (receiving-side) of Embodiment 6.

As shown in FIG. 26, radio communication apparatus 1600 of Embodiment 6 has first signal demultiplexing section 1630, second signal demultiplexing section 1640, and diversity combining section 1660.

First signal demultiplexing section 1630 executes linear computation on a (degree-of-multiplexing-N) spatially multiplexed signal from receiving section 220, performs demultiplexing into spatially multiplexed signal groups composed of a number of transmission signals (radio communication apparatus 100 transmit signals) smaller than degree-of-multiplexing N, and outputs these groups to second signal demultiplexing section 1640.

Second signal demultiplexing section 1640 has the spatially multiplexed signal groups demultiplexed by first signal demultiplexing section 1630 as input, and demultiplexes a spatially multiplexed signal of each group into transmission signals contained in that spatially multiplexed signal. Here, second signal demultiplexing section 1640 has a number of signal demultiplexing sections 1641 corresponding to the number of groups into which the input signals were divided by first signal demultiplexing section 1630 (in this embodiment, six signal demultiplexing sections 241-1 through 241-6), and each signal demultiplexing section 241 demultiplexes a spatially multiplexed signal of one group into the transmission signals contained in that spatially multiplexed signal.

Diversity combining section 1660 performs diversity combining for each transmission signal output from second signal demultiplexing section 1640. Here, since there are four transmission signals, four diversity combining sections 1661-1 through 1661-4 are provided.

Next, the operation of radio communication apparatus 1600 having the above configuration will be described.

A degree-of-multiplexing-N (where N=4) spatially multiplexed signal received by antennas 210 undergoes orthogonal detection after amplification and frequency conversion by receiving sections 221-1 through 221-4, is converted to a baseband signal on the IQ plane, and is output to first signal demultiplexing section 1630 as received signal y(k) represented by a complex digital signal using an A/D converter. In this description, it is assumed that frequency synchronization, phase synchronization, and symbol synchronization have been established.

Here, y(k) is a column vector containing received signals received via antennas 210 as elements. This received signal y(k)—that is, a received signal at discrete time k obtained in a flat fading propagation environment corresponding to transmission sequence $x_n(k)$ from radio communication apparatus 100 —is expressed by Equation (1).

First signal demultiplexing section 1630 transforms Equation (2) into Equations (23) through (25) by performing linear computation on received signal y(k) using propagation path fluctuation estimate B for propagation path fluctuation H estimated by utilizing a known pilot signal or the like transmitted from radio communication apparatus 100.

$$\begin{bmatrix} v_{11}(k) \\ v_{12}(k) \\ v_{13}(k) \\ v_{14}(k) \end{bmatrix} = \begin{bmatrix} g_{111}(k) & g_{112}(k) & 0 & 0 \\ g_{121}(k) & g_{122}(k) & 0 & 0 \\ 0 & 0 & g_{133}(k) & g_{134}(k) \\ 0 & 0 & g_{143}(k) & g_{144}(k) \end{bmatrix} \begin{bmatrix} x_1(k) \\ x_2(k) \\ x_3(k) \\ x_4(k) \end{bmatrix} + \begin{bmatrix} e_{11}(k) \\ e_{12}(k) \\ e_{13}(k) \\ e_{14}(k) \end{bmatrix} \quad (23)$$

$$\begin{bmatrix} v_{21}(k) \\ v_{22}(k) \\ v_{23}(k) \\ v_{24}(k) \end{bmatrix} = \begin{bmatrix} g_{211}(k) & g_{213}(k) & 0 & 0 \\ g_{221}(k) & g_{223}(k) & 0 & 0 \\ 0 & 0 & g_{232}(k) & g_{234}(k) \\ 0 & 0 & g_{242}(k) & g_{244}(k) \end{bmatrix} \begin{bmatrix} x_1(k) \\ x_2(k) \\ x_3(k) \\ x_4(k) \end{bmatrix} + \begin{bmatrix} e_{21}(k) \\ e_{22}(k) \\ e_{23}(k) \\ e_{24}(k) \end{bmatrix} \quad (24)$$

$$\begin{bmatrix} v_{31}(k) \\ v_{32}(k) \\ v_{33}(k) \\ v_{34}(k) \end{bmatrix} = \begin{bmatrix} g_{311}(k) & g_{314}(k) & 0 & 0 \\ g_{321}(k) & g_{324}(k) & 0 & 0 \\ 0 & 0 & g_{332}(k) & g_{333}(k) \\ 0 & 0 & g_{342}(k) & g_{343}(k) \end{bmatrix} \begin{bmatrix} x_1(k) \\ x_2(k) \\ x_3(k) \\ x_4(k) \end{bmatrix} + \begin{bmatrix} e_{31}(k) \\ e_{32}(k) \\ e_{33}(k) \\ e_{34}(k) \end{bmatrix} \quad (25)$$

First signal demultiplexing section 1630 can use any linear computation that transforms Equation (2) into Equations (23) through (25). For example, transformation can be performed by implementing the method shown in Embodiment 1 three times with the rows in Equation (2) replaced. Here, it can be seen from Equation (23) that $v_{11}$ and $v_{12}$ contain only $x_1$ and $x_2$ components, $v_{13}$ and $v_{14}$ contain only $x_3$ and $x_4$ components, $v_{21}$ and $v_{22}$ contain only $x_1$ and $x_3$ components, $v_{23}$ and $v_{24}$ contain only $x_2$ and $x_4$ components, $v_{31}$ and $v_{32}$ contain only $x_1$ and $x_4$ components, and $v_{33}$ and $v_{34}$ contain only $x_2$ and $x_3$ components. That is to say, first signal demultiplexing section 1630 provides a function that performs signal demultiplexing of a degree-of-multiplexing-4 spatially multiplexed signal based on three kinds of grouping in which transmission signals (transmission sequences) composing a group differ according to appropriate linear computation.

The groups of spatially multiplexed signals demultiplexed by first signal demultiplexing section 1630 are input to second signal demultiplexing section 1640. In second signal demultiplexing section 1640, the spatially multiplexed signals of each group are demultiplexed into the individual transmission signals contained in those spatially multiplexed signals. Specifically, $v_{11}$ and $v_{12}$ of the first group are demultiplexed into $x_{11}$ and $x_{21}$ by signal demultiplexing section 1641-1; $v_{13}$ and $v_{14}$ of the second group are demultiplexed into $x_{31}$ and $x_{41}$ by signal demultiplexing section 1641-2; $v_{21}$ and $v_{22}$ of the third group are demultiplexed into $x_{12}$ and $x_{32}$ by signal demultiplexing section 1641-3; $v_{23}$ and $v_{24}$ of the fourth group are demultiplexed into $x_{22}$ and $x_{42}$ by signal demultiplexing section 1641-4; $v_{31}$ and $v_{32}$ of the fifth group are demultiplexed into $x_{13}$ and $x_{43}$ by signal demultiplexing section 1641-5; and $v_{33}$ and $v_{34}$ of the sixth group are demultiplexed into $x_{23}$ and $x_{33}$ by signal demultiplexing section 1641-6.

In second signal demultiplexing section 1640, ZF (Zero Forcing), MMSE (Minimum Mean Square Error), MLD (Maximum Likelihood Detection), or the like can be used as an algorithm for demultiplexing transmission signals contained in the spatially multiplexed signal groups. Using an MLD demultiplexing method enables diversity gain to be obtained (equivalent to diversity gain obtained in spatial multiplexing transmission with two transmitting-side antennas and two receiving-side antennas (2×2 spatial multiplexing transmission)).

In diversity combining section 1660, diversity combining is performed for each transmission signal comprising output from second signal demultiplexing section 1640. Specifically, diversity combining section 1661-1 performs diversity combining using $x_{11}$, $x_{12}$, and $x_{13}$; diversity combining section 1661-2 performs diversity combining using $x_{21}$, $x_{22}$, and $x_{23}$; diversity combining section 1661-3 performs diversity combining using $x_{31}$, $x_{32}$, and $x_{33}$; and diversity combining section 1661-4 performs diversity combining using $x_{41}$, $x_{42}$, and $x_{43}$. As the diversity combining algorithm, Maximum Ratio Combining (MRC) diversity that maximizes the post-diversity-combining Signal-to-Noise power Ratio (SNR), MMSE combining diversity that maximizes the post-diversity-combining Signal-to-Noise plus Interference power Ratio (SINR), selective combining diversity that selects and outputs the highest-reliability branch, or the like, can be used.

Post-diversity-combining signal sequences—that is, transmission signals—undergo received signal processing by received signal processing section 250 and are output as receive data.

Thus, according to this embodiment, a degree-of-multiplexing-4 spatially multiplexed signal is roughly demultiplexed into six degree-of-multiplexing-2 spatially multiplexed signals by first signal demultiplexing section 1630, each of which then undergoes signal demultiplexing by second signal demultiplexing section 1640. Furthermore, second signal demultiplexing section 1640 outputs for the same transmission sequence are subjected to diversity combining. By this means, diversity gain is obtained by combining three second signal demultiplexing section 1640 outputs for which other multiplexed transmit signals differ. As a result, a radio communication apparatus can be configured that obtains higher diversity gain than when the configuration of Embodiment 1 is used with a configuration different from the configuration using an interference canceller shown in Embodiment 2.

Figure 27:
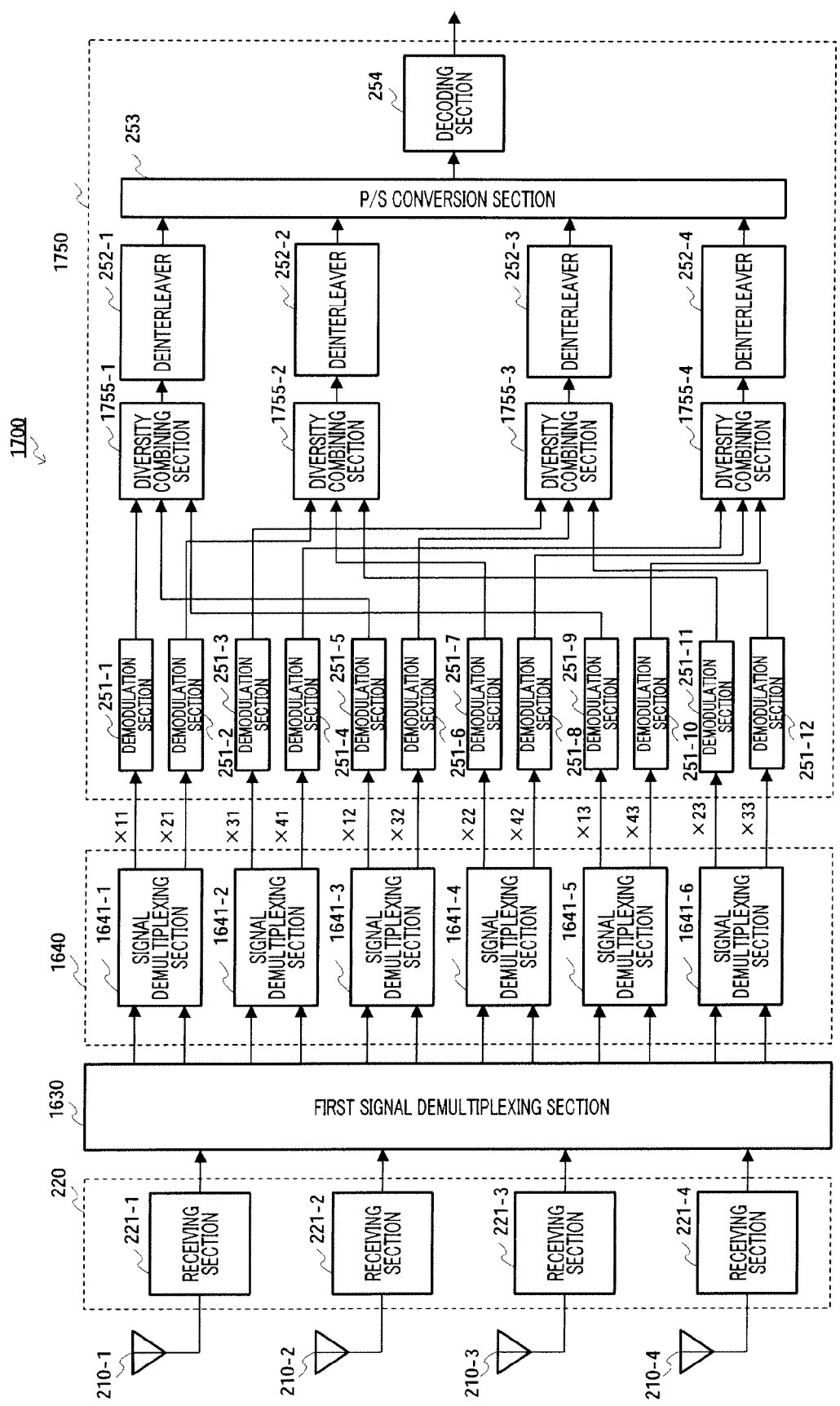
FIG. 27 is a block diagram showing another configuration of a radio communication apparatus (receiving-side) of Embodiment 6.

In this embodiment, a configuration has been employed in which diversity combining is performed using IQ plane signals output from second signal demultiplexing section 1640, but diversity combining may also be performed using likelihood information of each bit obtained after IQ plane signals have been demodulated by a demodulation section. A sample configuration of a radio communication apparatus for this case is shown in FIG. 27. As shown in FIG. 27, radio communication apparatus 1700 has received signal processing section 1750. Received signal processing section 1750 has demodulation sections 251-1 through 251-12 and diversity combining sections 1755-1 through 1755-4. Through use of this configuration, diversity combining can be performed using a different weighting factor for each bit, enabling improved reception characteristics to be obtained.

Figure 28:
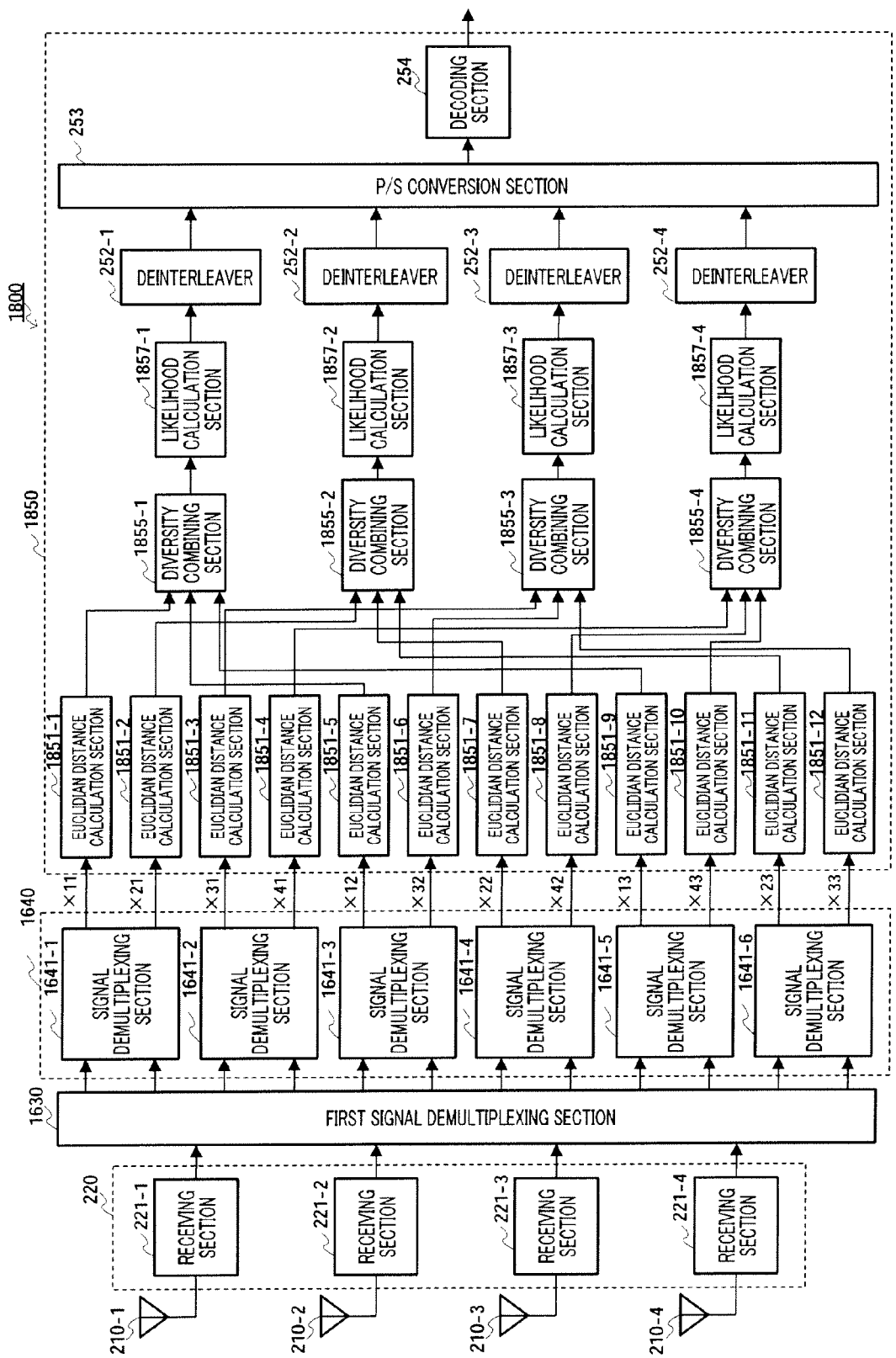
FIG. 28 is a block diagram showing another configuration of a radio communication apparatus (receiving-side) of Embodiment 6.

In this embodiment, a configuration has been employed in which diversity combining is performed using IQ plane signals output from second signal demultiplexing section 1640, but a configuration such as that of radio communication apparatus 1800 shown in FIG. 28 may also be used. Radio communication apparatus 1800 has received signal processing section 1850. Radio communication apparatus 1800 has a configuration in which the demodulation sections of radio communication apparatus 1600 are replaced by Euclidian distance calculation sections 1851 and likelihood calculation sections 1857, diversity combining is performed by diversity combining sections 1855 using Euclidian distances calculated by Euclidian distance calculation sections 1851, and then likelihood information is calculated by likelihood calculation sections 1857. In this way, detailed diversity combining can be performed using the Euclidian distance when a bit in question is 1 and the Euclidian distance when a bit in question is 0, enabling reception characteristics to be improved.

(Embodiment 7)

In this embodiment, candidate point reduction is performed using a data sequence after received signal processing has been performed.

Figure 29:
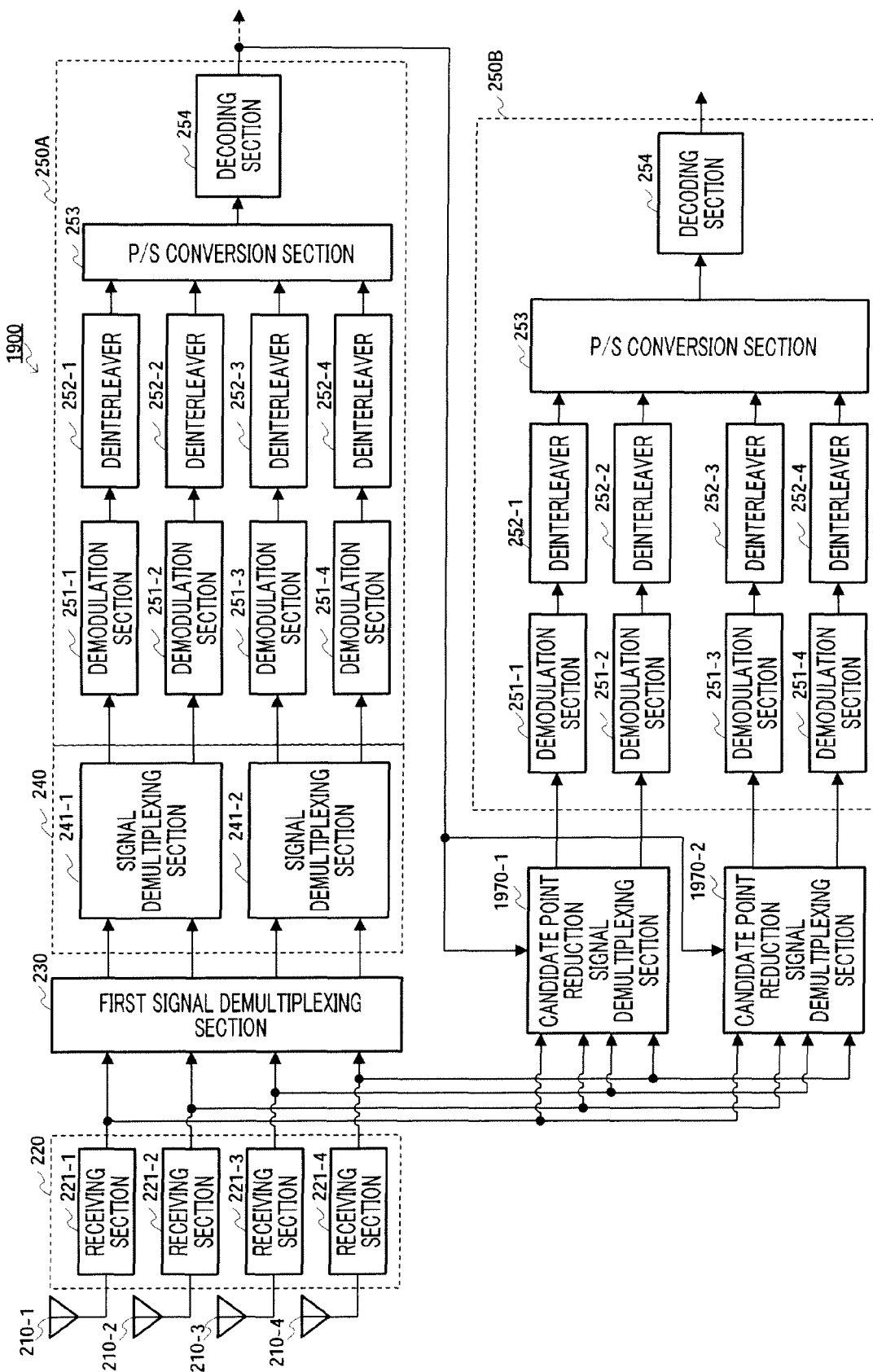
FIG. 29 is a block diagram showing the configuration of a radio communication apparatus (receiving-side) of Embodiment 7.

As shown in FIG. 29, radio communication apparatus 1900 of Embodiment 7 has candidate point reduction signal demultiplexing sections 1970.

Candidate point reduction signal demultiplexing sections 1970 perform reception sequence candidate point reduction using a signal after received signal processing in received signal processing section 250A—specifically, receive data that has once been decoded. The candidate point reduction method is explained in the following document: Murakami, Kobayashi, Orihashi, Matsuoka, "Likelihood Detection Utilizing Ordering and Decision of Partial Bits in MIMO Spatial Multiplexing Systems", IEICE Technical Report IT2003-90, ISEC2003-130, WBS2003-208, pp 97-102, March 2004.

Candidate point reduction signal demultiplexing section 1970-1 performs candidate point reduction using decoded data corresponding to second group transmission signals (transmission sequences) from a spatially multiplexed signal received by antennas 210, and then performs signal demultiplexing using MLD. Candidate point reduction signal demultiplexing section 1970-2 performs candidate point reduction using decoded data corresponding to first group transmission signals (transmission sequences) from a spatially multiplexed signal received by antennas 210.

Next, the operation of radio communication apparatus 1900 having the above configuration will be described.

A degree-of-multiplexing-N (where N=4) spatially multiplexed signal received by antennas 210 undergoes orthogonal detection after amplification and frequency conversion by receiving sections 221-1 through 221-4, is converted to a baseband signal on the IQ plane, and is output to first signal demultiplexing section 230 as received signal y(k) represented by a complex digital signal using an A/D converter. In this description, it is assumed that frequency synchronization, phase synchronization, and symbol synchronization have been established.

Here, y(k) is a column vector containing received signals received via antennas 210 as elements. This received signal y(k)—that is, a received signal at discrete time k obtained in a flat fading propagation environment corresponding to transmission sequence $x_n(k)$ from radio communication apparatus 100—is expressed by Equation (1).

In candidate point reduction signal demultiplexing sections 1970, reception sequence candidate point reduction is performed using a signal after received signal processing in received signal processing section 250A—that is, receive data that has once been decoded. Specifically, in candidate point reduction signal demultiplexing section 1970-1, candidate point reduction is performed using decoded data corresponding to second group transmission signals (transmission sequences) from a reception sequence, after which signal demultiplexing is performed using MLD. In this way, when 16QAM is used as the modulation method, for example, the number of candidate signal points is reduced from 65,536 to 256, enabling MLD to be implemented with a practical hardware scale.

In candidate point reduction signal demultiplexing section 1970-2, candidate point reduction is performed using decoded data corresponding to second group transmission signals (transmission sequences) from a reception sequence, after which signal demultiplexing is performed using MLD. In received signal processing section 250B, the same kind of processing as in received signal processing section 250A is performed on transmission signals (transmission sequences) demultiplexed by candidate point reduction signal demultiplexing sections 1970, and receive data is output. In this way, a reduction in the MLD computation scale and an improvement in reception quality can be achieved.

In the above description, received signal processing section 250B is provided in addition to received signal processing section 250A, but a configuration may also be used in which received signal processing section 250B is not included, and candidate point reduction signal demultiplexing section 1970 output is fed back to received signal processing section 250A.

In this embodiment, a configuration has been used in which candidate point reduction signal demultiplexing section 1970-1 performs candidate point reduction using decoded data corresponding to $x_3$ and $x_4$ from a reception sequence, and then performs signal demultiplexing using MLD, and candidate point reduction signal demultiplexing section 1970-2 performs signal point reduction using decoded data corresponding to first group transmission sequences from a reception sequence, but a configuration may also be used in which some of the bits composing M-ary modulation of a transmission sequence are eliminated. In this way, too, a reduction in the MLD computation scale and an improvement in reception quality can be achieved.

(Embodiment 8)

In Embodiment 8, linear computation in a first signal demultiplexing section is implemented by multiplication by a weight obtained from singular value decomposition of a propagation path response matrix.

Figure 30:
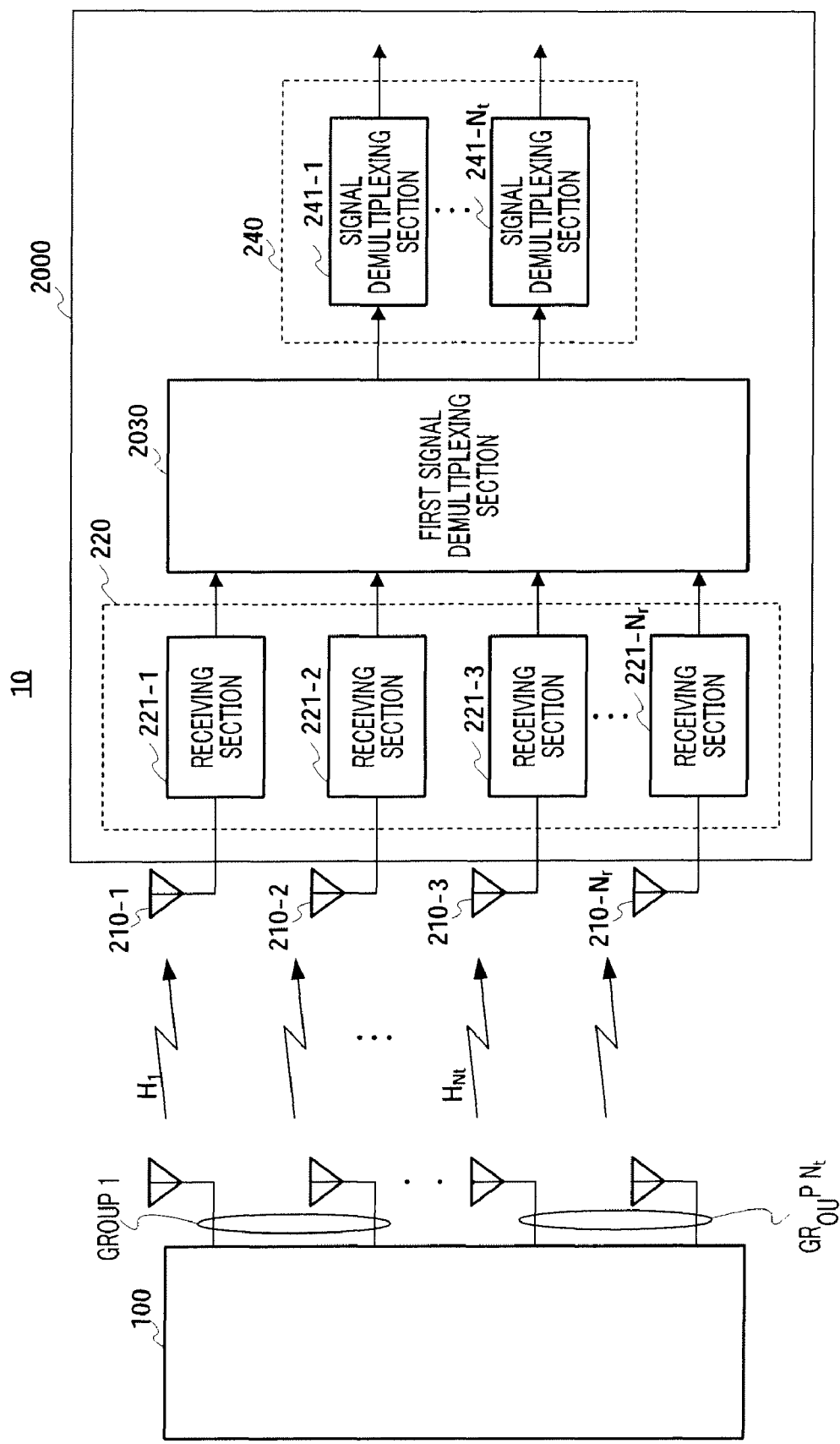
FIG. 30 is a drawing showing the configuration of a radio communication system of Embodiment 8.

As shown in FIG. 30, radio communication apparatus 2000 of Embodiment 8 has first signal demultiplexing section 2030.

First signal demultiplexing section 2030 executes linear computation on a (degree-of-multiplexing-N; in FIG. 30, N=4) spatially multiplexed signal from receiving section 220, performs demultiplexing into spatially multiplexed signal groups composed of a number of transmission signals (radio communication apparatus 100 transmit signals) smaller than degree-of-multiplexing N, and outputs these groups to second signal demultiplexing section 240. Specifically, first signal demultiplexing section 2030 performs that linear computation by multiplication by a weight obtained from singular value decomposition of a propagation path response matrix.

Next, the operation of radio communication apparatus 2000 having the above configuration will be described.

Transmit signals are transmitted from Ns antennas of radio communication apparatus 100. In this description, Ns antennas are divided into Nt groups of M(n) antennas each. Transmission sequence $x_n(k)$ indicates a transmission sequence at discrete time k transmitted to radio communication apparatus 2000 from the n'th group. It is here assumed that n is a natural number less than or equal to Nt, and when plurality M(n) transmission sequences $x_n(k)$ are transmitted in parallel using a plurality of antennas (M(n)≧1), transmission sequences $x_n(k)$ are composed of M(n)-dimensional column vectors.

Below, a case is described in which the number of antennas used for transmission by radio communication apparatus 100 and the number of transmission sequences are the same. It is also possible to transmit using a number of antennas greater than the number of transmission sequences. This can be implemented using a method whereby a transmission sequence is multiplied by a directivity weight that forms a desired directivity, or a method whereby space time coding such as STBC (Space Time Block Coding) is executed.

A degree-of-multiplexing-Ns spatially multiplexed signal received by antennas 210-1 through antennas 210-Nr undergoes orthogonal detection after amplification and frequency conversion by receiving sections 221-1 through 221-4, is converted to a baseband signal on the IQ plane, and is output to first signal demultiplexing section 230 as received signal y(k) represented by a complex digital signal using an A/D converter. In this description, it is assumed that frequency synchronization, phase synchronization, and symbol synchronization have been established.

Here, y(k) is a column vector containing received signals received via antennas 210 as elements. This received signal y(k)—that is, a received signal at discrete time k obtained in a flat fading propagation environment corresponding to transmission sequence $x_n(k)$ from radio communication apparatus 100—is expressed by Equation (26).

$$y(k) = \begin{bmatrix} H_1 & H_2 & \dots & H_{Nt} \end{bmatrix} \begin{bmatrix} x_1(k) \\ x_2(k) \\ \vdots \\ x_{Nt}(k) \end{bmatrix} + n(k) \quad (26)$$

$H_n$ in Equation (26) indicates propagation path fluctuation received by transmission sequence x(k) in the n'th group, and is a matrix comprising (number of radio base station antennas Nr) rows×(number of n'th group transmitting antennas M(n)) columns. Here, n(k) indicates a noise vector having Nr elements added at the time of reception by radio communication apparatus 2000 antennas 210. H(k) row-i, column-j matrix element $h_{ij}$ indicates propagation path fluctuation on a propagation path when a signal transmitted from the j'th antenna of radio communication apparatus 100 is received by i'th antenna 210 of radio communication apparatus 2000.

Using propagation path fluctuation estimate $B_n$ for propagation path fluctuation H, estimated by utilizing a known pilot signal or the like transmitted from radio communication apparatus 100, first signal demultiplexing section 2030 generates a group demultiplexing weight that demultiplexes a signal from a different group, and performs linear computation on received signal y(k).

Here, group demultiplexing weight $W_n$ for the desired n'th group is generated using singular value decomposition on matrix G(n) (where j≠n) composed of propagation path fluctuation estimates $B_j$ excluding the desired n'th group as shown in Equation (27).

$$G(n) = \begin{bmatrix} B_j & B_{j+1} & \dots \end{bmatrix} = U\Lambda V^H = U \begin{bmatrix} \lambda_1 & 0 & 0 \\ 0 & \ddots & 0 \\ 0 & 0 & \lambda_{Ms} \\ 0 & \dots & 0 \\ \vdots & \dots & \vdots \\ 0 & \dots & 0 \end{bmatrix} V^H \quad (27)$$

H in Equation (27) is an operator that performs complex conjugate transposition. That is to say, if the total number of transmission sequences is Ms, and the number of antennas is Nr, (Nr−Ms) left singular vectors $u_j$ for which group j excluding the desired n'th is j=(Ms+1), . . . , Nr are selected from column vectors (left singular vectors) $u_j$ composing propagation path fluctuation estimate G(n) left singular matrix U. Group demultiplexing weight matrix Wn is determined using selected left singular vectors $u_j$ as shown in Equation (28).

$$W_n = [u_{Ms+1}\ u_{Ms+2} \ldots u_{Nr}] \quad (28)$$

Selected left singular vectors $u_j$ become weights that apply directivity null to transmit signals excluding transmission sequence $x_n(k)$ from the desired n'th group. In order to generate a group demultiplexing weight, it is necessary for the condition (total number of transmission sequences from radio communication apparatus 100)≦(radio communication apparatus number of antennas Nr) to be satisfied.

By performing multiplication on received signal y(k) in radio communication apparatus 2000 as shown in Equation (29) using group demultiplexing weight Wn generated in this way, signal yn(k) in which interference signal components from other groups has been reduced can be obtained.

$$\begin{bmatrix} y_1(k) \\ y_2(k) \\ \vdots \\ y_{Nt}(k) \end{bmatrix} = [W_1\ W_2\ \ldots\ W_{Nt}]^H y(k) \quad (29)$$

Here, n is a natural number less than or equal to Nt. If channel estimation has been performed ideally, the kind of relationship shown in Equation (29) is obtained, and therefore transformations such as shown in Equation (30) and Equation (31) can be made, and yn(k) becomes a signal from which interference signal components from another radio communication apparatus 100 have been completely eliminated.

$$W_j^H H_k = 0, (j \neq k) \quad (30)$$

$$y_n(k) = W_n^H B_n x_n(k) + W_n^H n(k) \quad (31)$$

In second signal demultiplexing section 240, signal demultiplexing processing is performed on group demultiplexed signals yn(k). Group demultiplexed signals yn(k) are demultiplexed into individual transmission signals (transmission sequences) by means of signal demultiplexing processing. Received signal demultiplexing for transmission sequence xn(k) of the n'th group in this case is performed based on channel estimate Fn after inter-user demultiplexing weight multiplication obtained as a result of multiplying channel estimate $B_n$ shown in Equation (32) by inter-user demultiplexing weight Wn.

$$F_n = W_n^H B_n \quad (32)$$

In second signal demultiplexing section 240, ZF (Zero Forcing), MMSE (Minimum Mean Square Error), MLD (Maximum Likelihood Detection), or the like can be used as an algorithm for demultiplexing transmission signals from the spatially multiplexed signal groups. If an MLD demultiplexing method is used here, the number of signal point candidates in MLD can be reduced through using signals from which interference signals from other groups have been eliminated on a group-by-group basis, and implementation is possible with practical hardware.

The demultiplexing algorithm may employ a single method in a fixed manner, or may be changed adaptively according to the number of modulation multi-values of the transmission sequences, the number of received signals, or the like. For example, MLD could be used in the case of BPSK or QPSK having a small number of modulation multi-values, while a linear method such as MMSE could be used in the case of 16QAM or 64QAM having a large number of modulation multi-values.

Radio communication apparatus 2000 executes demodulation processing, de interleaving processing, and decoding processing on signals demultiplexed into sequences), and regenerates receive data.

Thus, according to this embodiment, in radio communication apparatus 2000 that receives transmission signals transmitted from radio communication apparatus 100 via a plurality of antennas, spatially multiplexed signals received by the antennas are divided into a plurality of groups, and with those groups as individual units, extracts signals from which interference from other groups has been eliminated. By this means, in processing subsequent to first signal demultiplexing section 2030, it is possible to apply reception decoding processing on an individual group basis. Therefore, when there are a plurality of transmission sequences it is necessary ultimately to convert parallel data to serial data.

However, in this embodiment, reception decoding processing can be performed simultaneously in parallel on a group-by-group basis, and therefore input data to the parallel/serial conversion section is not weighted. Also, in this embodiment, no new buffer memory need be provided to store input data temporarily, enabling data processing delays to be kept short, and an increase in hardware due to memory expansion to be suppressed.

Also, better reception characteristics than with a conventional method (ZF or MMSE) can be obtained with a practical hardware scale. If batch demultiplexing processing by means of conventional ZF or MMSE linear processing is used instead of first signal demultiplexing section 2030, it is possible to extract transmission sequences. However, if STBC (Space Time Block Coding) or STTC (Space Time Trellis Coding) is executed, or if a plurality of transmission sequences from the same group are included, antenna degree of freedom is used for interference suppression due to the nature of forming a reception weight for demultiplexing reception of these, and therefore diversity gain and space-time coding gain are impaired.

It is also possible to introduce batch demultiplexing processing based on conventional MLD instead of first signal demultiplexing section 2030. In this case, however, although reception characteristics are better than in this embodiment, the amount of MLD processing on transmission sequences from all the transmitting antennas increases exponentially relative to the number of transmission sequences and the number of their modulation multi-values, making practical hardware implementation difficult.

In this embodiment, the number of signal demultiplexing sections 241 provided is the same as number of groups Nt, but a configuration may also be used whereby input to second signal demultiplexing section 240 is switched sequentially by providing a suitable indicator (transmission sequence permissible delay amount, data classification, or the like) based on the transmission sequence QoS, and setting priorities for performing reception processing on a group-by-group basis. By this means, the number of signal demultiplexing sections 241 can be made smaller than the number of groups, and although, depending on the user, the processing delay until transmission data is reconstituted increases, the configuration of radio communication apparatus 2000 can be simplified.

Radio communication apparatus 2000 of this embodiment may also have the interference canceller configuration described in Embodiment 2.

Also, while radio communication apparatus 2000 of this embodiment has a configuration in which space-time coding is not performed, a configuration may also be used in which the space-time coding sections described in Embodiment 3 are provided. This enables reception characteristics close to full diversity gain to be obtained with a practical hardware scale without using MLD on a degree-of-multiplexing-Ns spatially multiplexed signal. Furthermore, much of the reception circuitry has many elements common to reception circuitry for a spatially multiplexed signal with degree-of-multiplexing M(n) smaller than Ns, enabling the circuit scale to be reduced and development costs to be cut.

Furthermore, in this embodiment, radio communication apparatus 100 may collect coded transmission sequences together in one group in the same space-time coding section as shown in FIG. 19. This allows inter-group interference elimination and space-time decoding to be performed independently, enabling space-time-coding coding gain and diversity gain to be obtained.

(Embodiment 9)

A characteristic of Embodiment 9 is that a plurality of space-time coded transmit signals (signal sequences) are transmitted using a spatially mutually-distant plurality of antennas.

Figure 31:
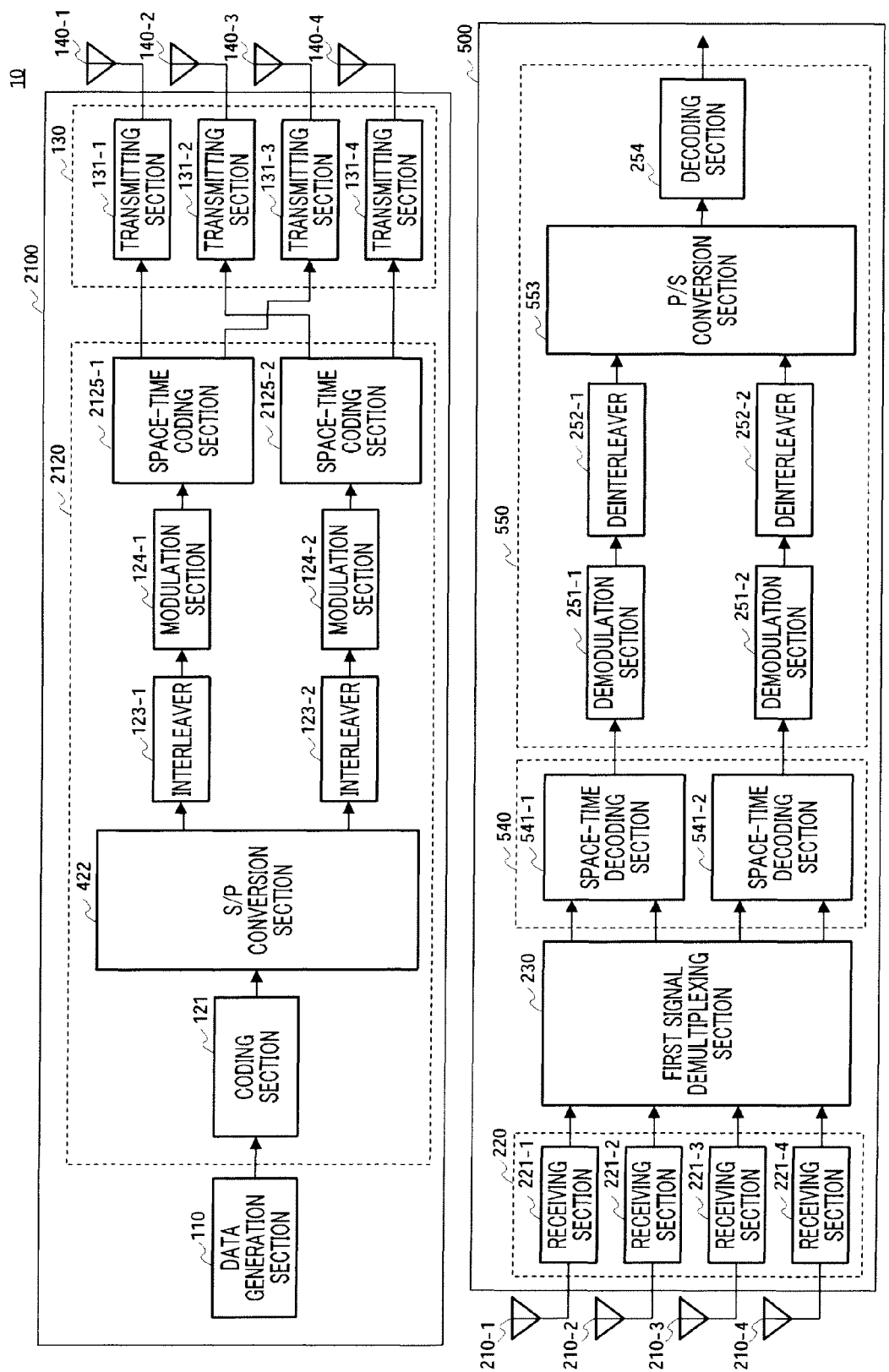
FIG. 31 is a drawing showing a configuration of a radio communication system of Embodiment 9.

As shown in FIG. 31, radio communication apparatus 2100 of Embodiment 9 has transmit signal composing section 2120, and transmit signal composing section 2120 has space-time coding sections 2125.

Space-time coding sections 2125 have parallel data sequences as input, and generate space-time coded sequences by performing space-time coding processing. Each space-time coding section 2125 sends space-time coded sequences as transmit signals to non-adjacent antennas—that is, spatially mutually-distant antennas. Here, it is assumed that baseband signals mapped onto the IQ plane by modulation sections 124 are subjected to block coding such as STBC disclosed in "B. Vucetic and J. Yuan, 'Space-Time Coding', Wiley", with STBC that codes one information sequence into two space-time coded sequences being used.

Transmitting antennas 140-1 through 140-4 are arranged in a straight line in the order 140-1, 140-2, 140-3, 140-4. Two space-time coded signals output from space-time coding section 2125-1 are sent to transmitting sections 131-1 and 131-3 respectively, and transmitted from transmitting antennas 140-1 and 140-3 respectively. On the other hand, two space-time coded signals output from space-time coding section 2125-2 are sent to transmitting sections 131-2 and 131-4 respectively, and transmitted from transmitting antennas 140-2 and 140-4 respectively.

By using this configuration, the spatial correlation between transmission sequences space-time coded by the same space-time coding section 2125 can be kept low, enabling large diversity gain to be obtained in space-time decoding on the receiving side.

In this embodiment, a configuration has been used in which transmitting antennas 140 of radio communication apparatus 2100 are arranged in a straight line, but a configuration may also be used in which transmitting antennas 140 are arranged at the vertices of a polygon or on the circumference of a circle, or on the sides of a polygon. With such configurations, also, spatial correlation can be kept low by selecting spatially mutually-distant transmitting antennas to be grouped together.

Figure 32:
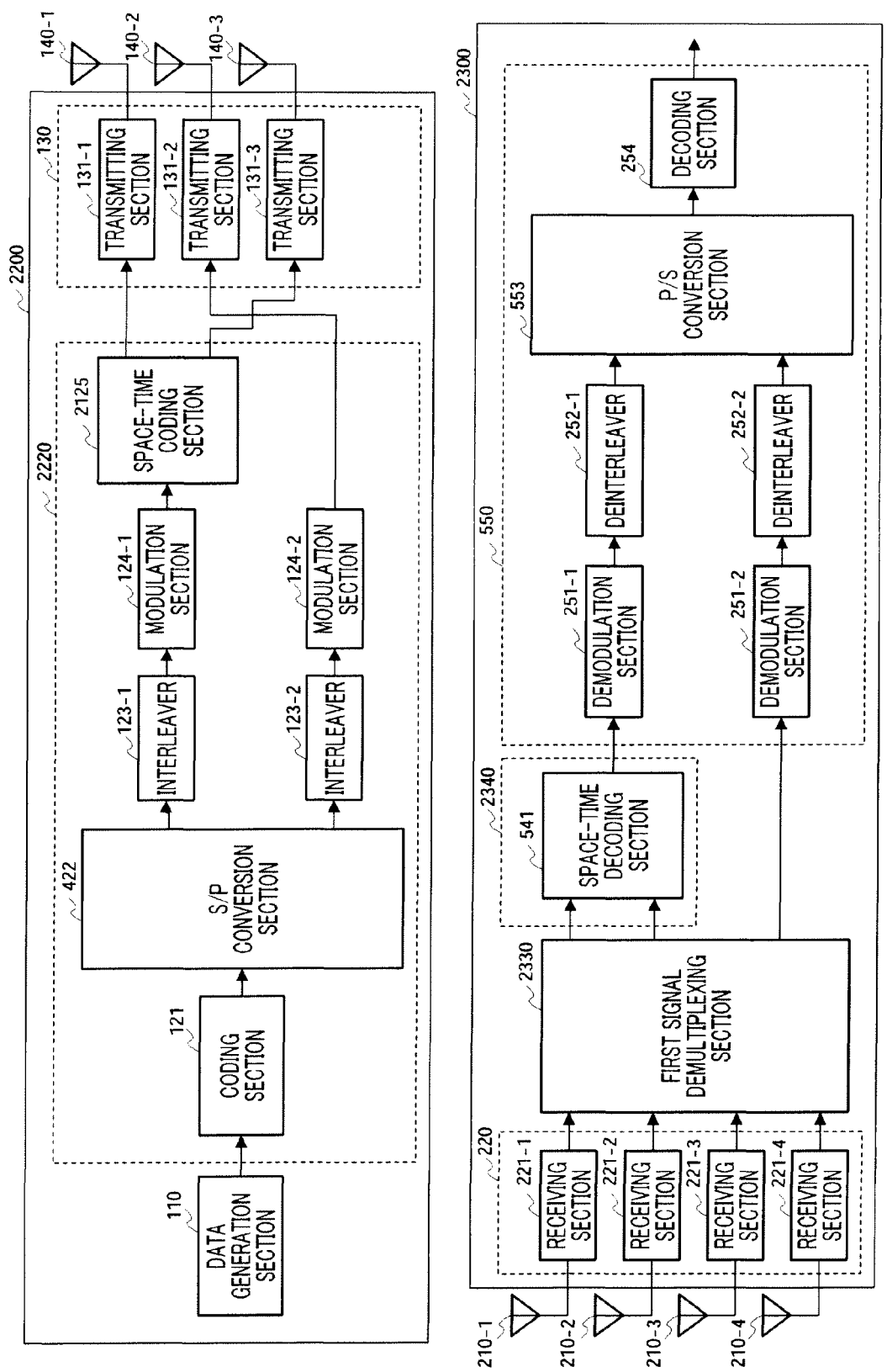
FIG. 32 is a drawing showing another configuration of a radio communication system of Embodiment 9.

In this embodiment, a configuration has been shown for a case in which the number of transmission streams is 2 and the number of antennas is 4 (2×4 space-time coding), but another space-time coding configuration may also be used. For example, when the number of transmission streams is 2 and the number of antennas is 3, the kind of configuration shown in FIG. 32 can be used. As shown in FIG. 32, radio communication apparatus 2200 has transmit signal composing section 2220, and transmit signal composing section 2220 has space-time coding section 2125. Transmit signal composing section 2220 executes space-time coding on one of the parallel data sequences generated from one line of transmit data, and generates transmit signals.

Space-time coding section 2125 sends space-time coded sequences as transmit signals to non-adjacent antennas—that is, spatially mutually-distant antennas. In FIG. 32, transmitting antenna 140-1 and transmitting antenna 140-3 are most distant from each other, and two transmission sequences output from space-time coding section 2125 are transmitted respectively from these spatially mutually-distant transmitting antennas.

As shown in FIG. 32, receiving-side radio communication apparatus 2300 has first signal demultiplexing section 2330 and second signal demultiplexing section 2340, and second signal demultiplexing section 2340 has space-time decoding section 541. First signal demultiplexing section 2330 demultiplexes received signal sequences into a group of space-time coded transmission sequences and a transmission sequence that has not been space-time coded. Then space-time decoding section 541 performs decoding on the space-time coded transmission sequences. In this way, the spatial correlation between space-time coded transmission sequences can be reduced, and space-time coding gain can be increased.

Figure 33:
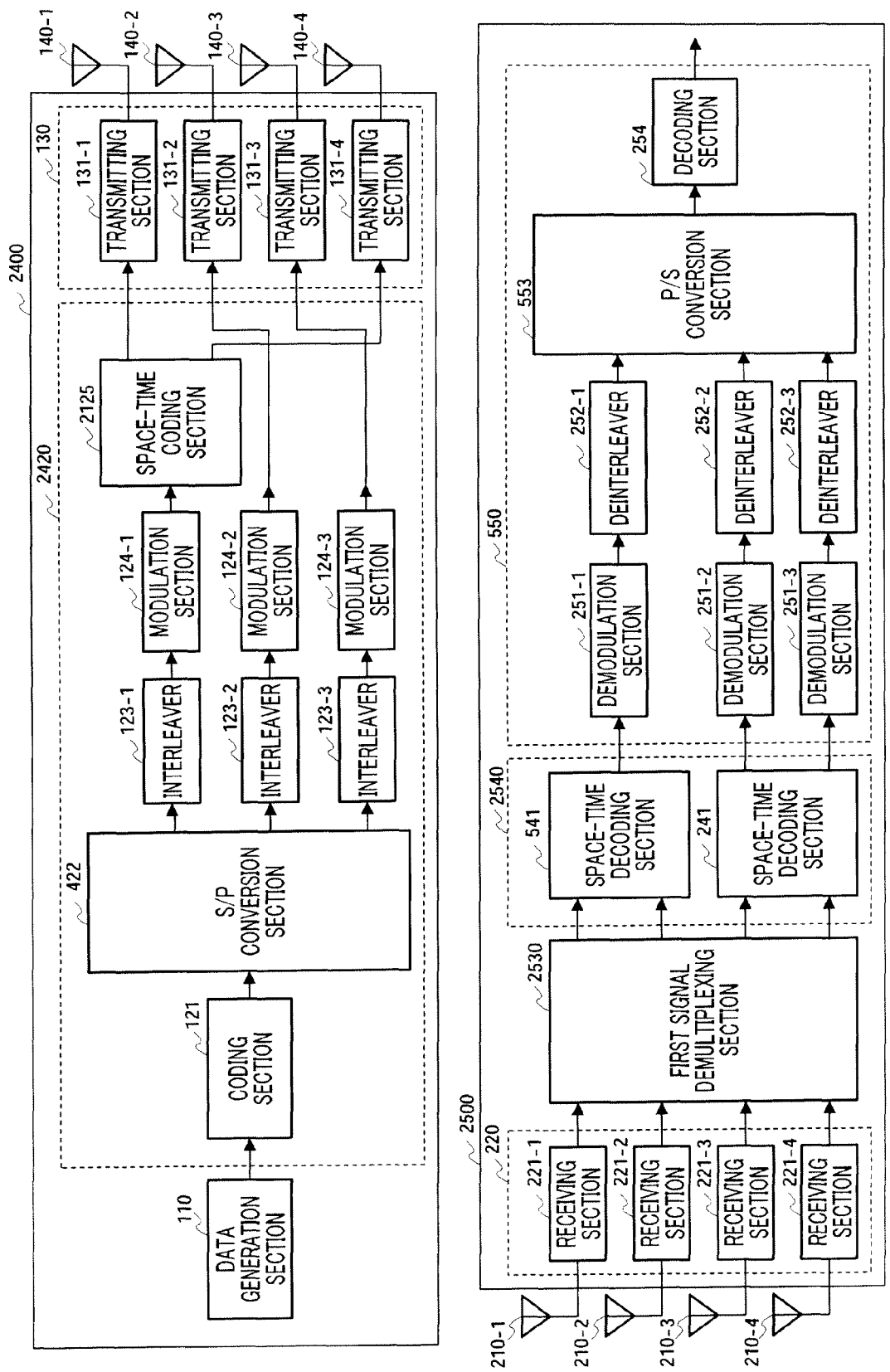
FIG. 33 is a drawing showing another configuration of a radio communication system of Embodiment 9.

Also, when the number of transmission streams is 3 and the number of transmitting antennas is 4, the kind of configuration shown in FIG. 33 can be used. As shown in FIG. 33, radio communication apparatus 2400 has transmit signal composing section 2420. Transmission sequences space-time coded by space-time coding section 2125 are transmitted from transmitting antennas 140-1 through 140-4. In this way, the spatial correlation between space-time coded transmission sequences can be reduced, and space-time coding gain can be increased. Receiving-side radio communication apparatus 2500 has first signal demultiplexing section 2530 and second signal demultiplexing section 2540. First signal demultiplexing section 2530 demultiplexes received signal sequences into a group of space-time coded transmission sequences and transmission sequences that have not been space-time coded. Second signal demultiplexing section 2540 has space-time decoding section 541 and signal demultiplexing section 241, and demultiplexes the space-time coded transmission sequence group by means of space-time decoding section 541 and demultiplexes the transmission sequences that have not been space-time coded by means of signal demultiplexing section 241.

The transmission sequence space-time coded by space-time coding section 2125 may also be transmitted using transmitting antenna 140-1 and transmitting antenna 140-3, while the two transmission sequences that have not been space-time coded are transmitted using transmitting antenna 140-2 and transmitting antenna 140-3. In this way, processing can be executed in a low spatial correlation state in space-time decoding section 541 and signal demultiplexing section 241, enabling reception characteristics to be improved.

Embodiment 10

In Embodiment 10, a configuration is disclosed for a case in which the number of receiving antennas of a receiving-side radio communication apparatus is greater than the number of transmitting antennas of a transmitting-side radio communication apparatus. Below, a case is described, as an example, in which the number of transmitting antennas of a transmitting-side radio communication apparatus is 4 and the number of receiving antennas of a receiving-side radio communication apparatus is 6.

Figure 36:
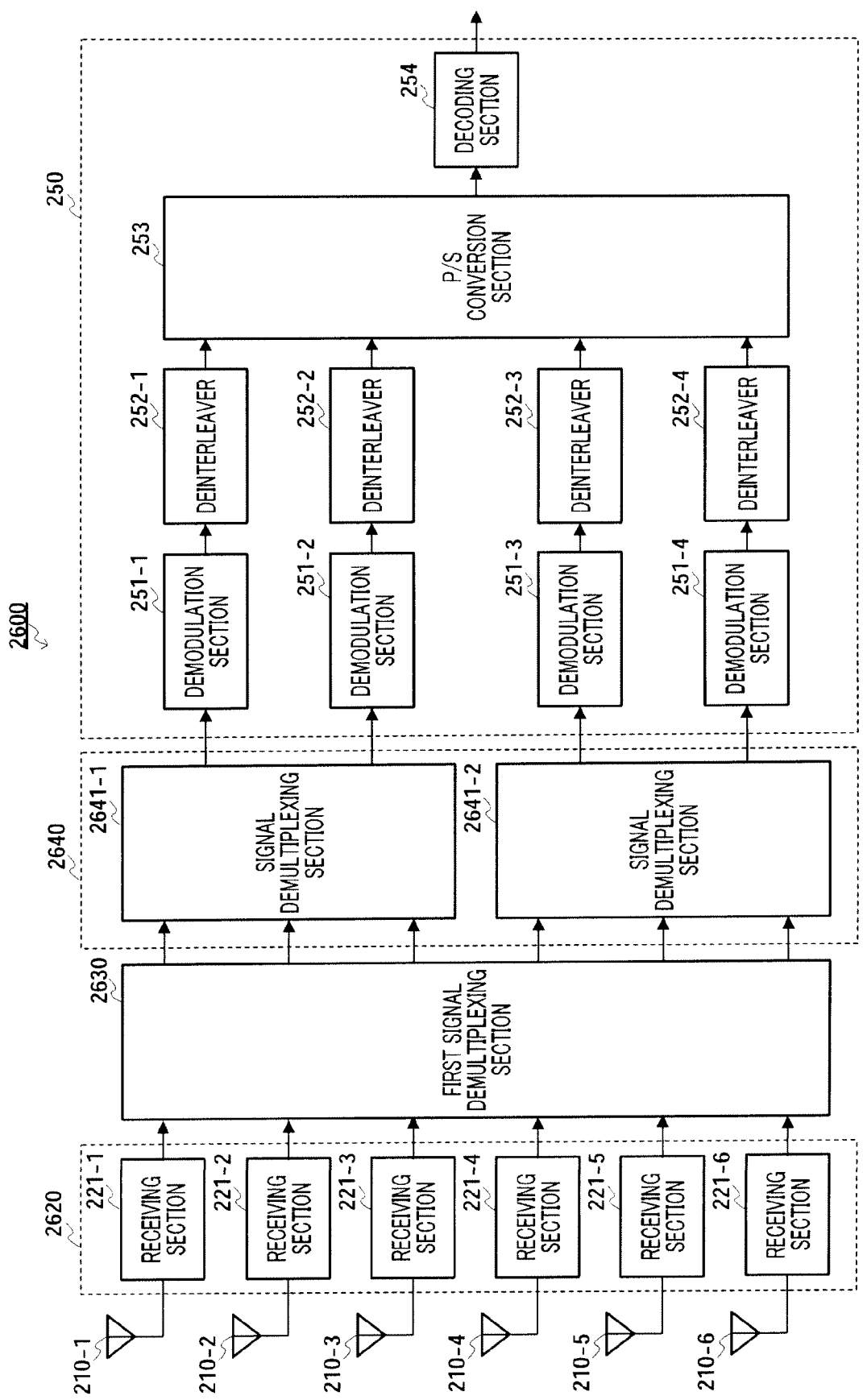
FIG. 36 is a block diagram showing the configuration of a radio communication apparatus (receiving-side) of Embodiment 10.

FIG. 36 is a drawing showing the configuration of receiving-side radio communication apparatus 2600. As shown in FIG. 36, radio communication apparatus 2600 has receiving section 2620, first signal demultiplexing section 2630, second signal demultiplexing section 2640, and received signal processing section 250. Receiving section 2620 has receiving sections 221-1 through 221-6. Second signal demultiplexing section 2640 has two signal demultiplexing sections 2641-1 and 2641-2. Received signal processing section 250 has demodulation sections 251-1 through 251-4, deinterleavers 252-1 through 252-4, P/S conversion section 253, and decoding section 254.

Receiving sections 221-1 through 221-6 execute predetermined radio reception processing (down-conversion, A/D conversion, and so forth) on spatially multiplexed signals received via respective corresponding antennas 210, and output a post-radio-reception-processing spatially multiplexed signal to first signal demultiplexing section 2630.

First signal demultiplexing section 2630 linear computation on the (degree-of-multiplexing-N) spatially multiplexed signal from receiving section 2620, performs demultiplexing into spatially multiplexed signal groups composed of a number of transmission signals (radio communication apparatus transmit signals) smaller than degree-of-multiplexing N, and outputs these groups to second signal demultiplexing section 2640.

Second signal demultiplexing section 2640 has the spatially multiplexed signal groups demultiplexed by first signal demultiplexing section 2630 as input, and demultiplexes a spatially multiplexed signal of each group into transmission signals contained in that spatially multiplexed signal. Here, second signal demultiplexing section 2640 has a number of signal demultiplexing sections 2641 corresponding to the number of groups into which the input signals were divided by first signal demultiplexing section 2630 (in this embodiment, two signal demultiplexing sections 2641-1 and 2641-2), and each signal demultiplexing section 2641 demultiplexes a spatially multiplexed signal of one group into the transmission signals contained in that spatially multiplexed signal.

Demodulation sections 251 perform demodulation processing corresponding to the radio communication apparatus 100 modulation method on each transmission signal (radio communication apparatus 100 transmit signal) demultiplexed by second signal demultiplexing section 2640.

Deinterleavers 252 perform deinterleaving in a pattern corresponding to the radio communication apparatus 100 interleaving pattern on each post-demodulation-processing transmission signal.

P/S conversion section 253 performs parallel/serial conversion that is the reverse of the radio communication apparatus 100 serial/parallel conversion on the deinterleaved transmission signals, and outputs a serial data sequence.

Decoding section 254 executes decoding processing corresponding to the radio communication apparatus 100 coding method on the serial data sequence, and outputs receive data corresponding to the radio communication apparatus 100 transmit data.

Next, the operation of radio communication apparatus 2600 will be described. Transmitting-side operation is the same as that of radio communication apparatus 100 of Embodiment 1, and therefore a description thereof is omitted here.

In radio communication apparatus 2600, a degree-of-multiplexing-N (where N=4) spatially multiplexed signal received by six antennas 210 undergoes orthogonal detection after amplification and frequency conversion by receiving sections 221-1 through 221-6, is converted to a baseband signal on the IQ plane, and is output to first signal demultiplexing section 2630 as received signal y(k) represented by a complex digital signal using an A/D converter. In this description, it is assumed that frequency synchronization, phase synchronization, and symbol synchronization have been established.

Here, y(k) is a column vector containing received signals received via antennas 210 as elements. This received signal y(k)—that is, a received signal at discrete time k obtained in a flat fading propagation environment corresponding to transmission sequence $x_n(k)$ from radio communication apparatus 100—is expressed by Equation (33).

$$y(k)=H(k)x(k)+n(k) \qquad (33)$$

H(k) in Equation (33) indicates propagation path fluctuation received by radio communication apparatus 100 transmission sequence $x_n(k)$, and is a matrix comprising (number of radio communication apparatus 2600 receiving antennas: 6) rows×(number of radio communication apparatus 100 transmitting antennas: 4) columns. Here, n(k) indicates a noise vector having six elements added at the time of reception by radio communication apparatus 2600 antennas 210.

Writing Equation (33) in detail gives Equation (34).

$$\begin{bmatrix} y_1(k) \\ y_2(k) \\ y_3(k) \\ y_4(k) \\ y_5(k) \\ y_6(k) \end{bmatrix} = \begin{bmatrix} h_{11}(k) & h_{12}(k) & h_{13}(k) & h_{14}(k) \\ h_{21}(k) & h_{22}(k) & h_{23}(k) & h_{24}(k) \\ h_{31}(k) & h_{32}(k) & h_{33}(k) & h_{34}(k) \\ h_{41}(k) & h_{42}(k) & h_{43}(k) & h_{44}(k) \\ h_{51}(k) & h_{52}(k) & h_{53}(k) & h_{54}(k) \\ h_{61}(k) & h_{62}(k) & h_{63}(k) & h_{64}(k) \end{bmatrix} \begin{bmatrix} x_1(k) \\ x_2(k) \\ x_3(k) \\ x_4(k) \end{bmatrix} + \begin{bmatrix} n_1(k) \\ n_2(k) \\ n_3(k) \\ n_4(k) \\ n_5(k) \\ n_6(k) \end{bmatrix} \qquad (34)$$

H(k) row-i, column-j matrix element $h_{ij}$ indicates propagation path fluctuation on a propagation path when a signal transmitted from j'th antenna 140 of radio communication apparatus 100 is received by i'th antenna 210 of radio communication apparatus 2600.

First signal demultiplexing section 2630 transforms Equation (34) into Equation (35) by performing linear computation on received signal y(k) using propagation path fluctuation estimate B for propagation path fluctuation H estimated by utilizing a known pilot signal or the like transmitted from radio communication apparatus 100.

$$\begin{bmatrix} v_1(k) \\ v_2(k) \\ v_3(k) \\ v_4(k) \\ v_5(k) \\ v_6(k) \end{bmatrix} = \begin{bmatrix} g_{11}(k) & g_{12}(k) & 0 & 0 \\ g_{21}(k) & g_{22}(k) & 0 & 0 \\ g_{31}(k) & g_{32}(k) & 0 & 0 \\ 0 & 0 & g_{43}(k) & g_{44}(k) \\ 0 & 0 & g_{53}(k) & g_{54}(k) \\ 0 & 0 & g_{63}(k) & g_{64}(k) \end{bmatrix} \begin{bmatrix} x_1(k) \\ x_2(k) \\ x_3(k) \\ x_4(k) \end{bmatrix} + \begin{bmatrix} e_1(k) \\ e_2(k) \\ e_3(k) \\ e_4(k) \\ e_5(k) \\ e_6(k) \end{bmatrix} \qquad (35)$$

First signal demultiplexing section 2630 can use any linear computation that transforms Equation (34) into Equation (35). An example of linear computation executed by first signal demultiplexing section 2630 is shown below.

First, in step 1, the following operations are executed:

$$y_1(k) - \frac{h_{14}(k)}{h_{54}(k)}y_5(k),\; y_2(k) - \frac{h_{24}(k)}{h_{54}(k)}y_5(k),\; y_3(k) - \frac{h_{34}(k)}{h_{54}(k)}y_5(k),$$

$$y_4(k) - \frac{h_{44}(k)}{h_{54}(k)}y_5(k)$$

and Equation (36) is obtained as a result.

$$\begin{bmatrix} y_1^1(k) \\ y_2^1(k) \\ y_3^1(k) \\ y_4^1(k) \\ y_5^1(k) \\ y_6^1(k) \end{bmatrix} = \begin{bmatrix} h_{11}^1(k) & h_{12}^1(k) & h_{13}^1(k) & 0 \\ h_{21}^1(k) & h_{22}^1(k) & h_{23}^1(k) & 0 \\ h_{31}^1(k) & h_{32}^1(k) & h_{33}^1(k) & 0 \\ h_{41}^1(k) & h_{42}^1(k) & h_{43}^1(k) & 0 \\ h_{51}^1(k) & h_{52}^1(k) & h_{53}^1(k) & h_{54}^1(k) \\ h_{61}^1(k) & h_{62}^1(k) & h_{63}^1(k) & h_{64}^1(k) \end{bmatrix} \begin{bmatrix} x_1(k) \\ x_2(k) \\ x_3(k) \\ x_4(k) \end{bmatrix} + \begin{bmatrix} n_1^1(k) \\ n_2^1(k) \\ n_3^1(k) \\ n_4^1(k) \\ n_5^1(k) \\ n_6^1(k) \end{bmatrix} \quad (36)$$

In step 2, the following operations are executed:

$$y_1(k) - \frac{h_{13}(k)}{h_{43}(k)}y_4^1(k),\; y_2^1(k) - \frac{h_{23}^1(k)}{h_{43}^1(k)}y_4^1(k),\; y_3^1(k) - \frac{h_{33}^1(k)}{h_{43}^1(k)}y_4^1(k),$$

$$y_4^1(k) + \frac{h_{44}(k)}{h_{54}(k)}y_5(k)$$

and Equation (37) is obtained as a result.

$$\begin{bmatrix} y_1^2(k) \\ y_2^2(k) \\ y_3^2(k) \\ y_4^2(k) \\ y_5^2(k) \\ y_6^2(k) \end{bmatrix} = \begin{bmatrix} h_{11}^2(k) & h_{12}^2(k) & 0 & 0 \\ h_{21}^2(k) & h_{22}^2(k) & 0 & 0 \\ h_{31}^2(k) & h_{32}^2(k) & 0 & 0 \\ h_{41}^2(k) & h_{42}^2(k) & h_{43}^2(k) & h_{44}^2(k) \\ h_{51}^2(k) & h_{52}^2(k) & h_{53}^2(k) & h_{54}^2(k) \\ h_{61}^2(k) & h_{62}^2(k) & h_{63}^2(k) & h_{64}^2(k) \end{bmatrix} \begin{bmatrix} x_1(k) \\ x_2(k) \\ x_3(k) \\ x_4(k) \end{bmatrix} + \begin{bmatrix} n_1^2(k) \\ n_2^2(k) \\ n_3^2(k) \\ n_4^2(k) \\ n_5^2(k) \\ n_6^2(k) \end{bmatrix} \quad (37)$$

In step 3, the following operations are executed:

$$y_4^2(k) - \frac{h_{41}^2(k)}{h_{11}^2(k)}y_1^2(k),\; y_5^2(k) - \frac{h_{51}^2(k)}{h_{11}^2(k)}y_1^2(k),\; y_6^2(k) - \frac{h_{61}^2(k)}{h_{11}^2(k)}y_1^2(k)$$

and Equation (38) is obtained as a result.

$$\begin{bmatrix} y_1^3(k) \\ y_2^3(k) \\ y_3^3(k) \\ y_4^3(k) \\ y_5^3(k) \\ y_6^3(k) \end{bmatrix} = \begin{bmatrix} h_{11}^3(k) & h_{12}^3(k) & 0 & 0 \\ h_{21}^3(k) & h_{22}^3(k) & 0 & 0 \\ h_{31}^3(k) & h_{32}^3(k) & 0 & 0 \\ 0 & h_{42}^3(k) & h_{43}^3(k) & h_{44}^3(k) \\ 0 & h_{52}^3(k) & h_{53}^3(k) & h_{54}^3(k) \\ 0 & h_{62}^3(k) & h_{63}^3(k) & h_{64}^3(k) \end{bmatrix} \begin{bmatrix} x_1(k) \\ x_2(k) \\ x_3(k) \\ x_4(k) \end{bmatrix} + \begin{bmatrix} n_1^3(k) \\ n_2^3(k) \\ n_3^3(k) \\ n_4^3(k) \\ n_5^3(k) \\ n_6^3(k) \end{bmatrix} \quad (38)$$

In step 4, the following operations are executed:

$$y_4^3(k) - \frac{h_{42}^3(k)}{h_{12}^3(k)}y_1^3(k),\; y_5^3(k) - \frac{h_{52}^3(k)}{h_{12}^3(k)}y_1^3(k),\; y_6^3(k) - \frac{h_{62}^3(k)}{h_{12}^3(k)}y_1^3(k)$$

and Equation (39) is obtained as a result.

$$\begin{bmatrix} y_1^4(k) \\ y_2^4(k) \\ y_3^4(k) \\ y_4^4(k) \\ y_5^4(k) \\ y_6^4(k) \end{bmatrix} = \begin{bmatrix} h_{11}^4(k) & h_{12}^4(k) & 0 & 0 \\ h_{21}^4(k) & h_{22}^4(k) & 0 & 0 \\ h_{31}^4(k) & h_{32}^4(k) & 0 & 0 \\ 0 & 0 & h_{43}^4(k) & h_{44}^4(k) \\ 0 & 0 & h_{53}^4(k) & h_{54}^4(k) \\ 0 & 0 & h_{63}^4(k) & h_{64}^4(k) \end{bmatrix} \begin{bmatrix} x_1(k) \\ x_2(k) \\ x_3(k) \\ x_4(k) \end{bmatrix} + \begin{bmatrix} n_1^4(k) \\ n_2^4(k) \\ n_3^4(k) \\ n_4^4(k) \\ n_5^4(k) \\ n_6^4(k) \end{bmatrix} \quad (39)$$

By performing the linear computation in above steps 1 through 4 in this way, first signal demultiplexing section 2630 obtains the expression shown in Equation (35). Here, if transmission sequences $x_1$ and $x_2$ are defined as a first group, and $x_3$ and $x_4$ are defined as a second group, it can be seen that and $v_1$, $v_2$, and $v_3$ in Equation (35) contain only first group components (transmission signals), and $v_4$, $v_5$, and $v_6$ contain only second group components (transmission signals). That is to say, first signal demultiplexing section 2630 performs a ZF (Zero Forcing) operation that eliminates interference between the two groups on a degree-of-multiplexing-4 spatially multiplexed signal, and performs demultiplexing into groups composed of two degree-of-multiplexing-2 spatially multiplexed signals. The linear computation in above steps 1 through 4 is ZF (Zero Forcing) computation, but computation is not performed up to a final stage of demultiplexing all the transmission signals contained in a spatially multiplexed signal as is usually done, but is halted prior to that.

The groups of spatially multiplexed signals demultiplexed by first signal demultiplexing section 2630 are input to second signal demultiplexing section 2640. In second signal demultiplexing section 2640, the spatially multiplexed signals of each group are demultiplexed into the individual transmission signals contained in those spatially multiplexed signals. Specifically, $v_1(k)$, $v_2(k)$, and $v_3(k)$ of the first group are input to signal demultiplexing section 2641-1 and demultiplexed into $x_1(k)$ and $x_2(k)$ by signal demultiplexing section 2641-1, and $v_4(k)$, $v_5(k)$, and $v_6(k)$ of the second group are processed in a similar way by signal demultiplexing section 2641-2.

In second signal demultiplexing section 2640, ZF (Zero Forcing), MMSE (Minimum Mean Square Error), MLD (Maximum Likelihood Detection), or the like can be used as an algorithm for demultiplexing transmission signals contained in the spatially multiplexed signal groups. Using an MLD demultiplexing method enables diversity gain to be obtained (equivalent to diversity gain obtained in spatial multiplexing transmission with two transmitting-side antennas and three receiving-side antennas (2×3 spatial multiplexing transmission)).

Here, with 4×6 spatial multiplexing transmission, even if an attempt is made to demultiplex all transmission signals by one-stage demultiplexing processing by means of MLD, the amount of computation is extremely large, and therefore the processing time is lengthy and implementation with a practical hardware scale is difficult. However, by dividing the demultiplexing processing into two stages as described above, implementation with practical hardware becomes possible.

That is to say, in first signal demultiplexing section 2630 that performs first-stage demultiplexing processing, linear computation is executed on a spatially multiplexed signal, demultiplexing is performed into spatially multiplexed signal groups composed of a number of transmit signals smaller than spatially multiplexed signal degree-of-multiplexing N, and inter-group interference is eliminated. Then, in second signal demultiplexing section 2640 that performs second-stage demultiplexing processing, demultiplexing processing is performed using signals from which an interference signal from the other group has been eliminated by first signal demultiplexing section 2630, and therefore, even with MLD used for second-stage signal demultiplexing, the number of signal point candidates in MLD can be reduced, making implementation with practical hardware possible. Furthermore, dividing the demultiplexing processing into two stages, while not enabling the diversity gain obtained by 4×6 spatial multiplexing transmission to be obtained, does enable the diversity gain obtained by 2×3 spatial multiplexing transmission to be obtained.

Transmission signals demultiplexed by second signal demultiplexing section 2640 are demodulated by demodulation sections 251, deinterleaved by deinterleavers 252, and input to P/S conversion section 253. Specifically, first-group signal sequences $x_1(k)$ and $x_2(k)$ are converted from a symbol data sequence to a bit data sequence by means of a predetermined modulation method by demodulation sections 251-1 and 251-2 respectively, and the bit data sequences obtained by demodulation sections 251-1 and 251-2 have their bit order restored by operations by deinterleavers 252-1 and 252-2 that are the reverse of the interleaving executed on the transmitting side. The same kind of processing is also performed for second-group signal sequences $x_3(k)$ and $x_4(k)$.

The bit data sequences whose bit order has been restored by deinterleavers 252 undergo parallel/serial conversion by P/S conversion section 253, and are output as a serial data sequence. In decoding section 254, decoding processing corresponding to the coding method used by radio communication apparatus 100 is executed on the serial data sequence, and receive data corresponding to the radio communication apparatus 100 transmit data is output.

The demultiplexing algorithm in signal demultiplexing sections 2641 of second signal demultiplexing section 2640 may be the same in both signal demultiplexing sections 2641, or may be changed for each in a fixed manner or adaptively according to the number of modulation multi-values of the transmission sequences, the number of received signals, or the like. For example, MLD could be used in the case of BPSK or QPSK having a small number of modulation multi-values, while a linear method such as MMSE could be used in the case of 16QAM or 64QAM having a large number of modulation multi-values.

Thus, according to this embodiment, in radio communication apparatus 2600 that receives transmission signals transmitted from radio communication apparatus 100 via a plurality of antennas, spatially multiplexed signals received by the antennas are divided into a plurality of groups. Then, with those groups as individual units, first signal demultiplexing section 2630 performs signal demultiplexing by means of ZF computation that eliminates inter-group interference. Second signal demultiplexing section 2640 then performs demultiplexing into the transmission signals contained in each group.

By this means, conventional circuitry (2×3 MIMO reception circuitry) configured to demultiplex a degree-of-multiplexing-2 spatially multiplexed signal using three reception systems, for example, can be used as it is for processing subsequent to first signal demultiplexing section 2630. As a result, in a radio communication apparatus handling reception of a spatially multiplexed signal with a plural degree of multiplexing, reception circuitry can be partially shared by different degrees of multiplexing, and the hardware scale of the radio communication apparatus can be reduced. Moreover, little circuitry needs to be newly developed to handle reception of a plural degree of multiplexing, enabling hardware development costs to be reduced.

With regard to processing subsequent to first signal demultiplexing section 2630, since it is possible for reception decoding processing to be applied on an individual group basis, when there are a plurality of transmission sequences it is necessary ultimately to convert parallel data to serial data. However, in this embodiment, the configuration enables reception decoding processing to be performed simultaneously in parallel on a group-by-group basis, and therefore input data to P/S conversion section 253 is not weighted, and no new buffer memory need be provided to store input data temporarily, enabling data processing delays to be kept short, and an increase in hardware due to memory expansion to be suppressed.

Also, better reception characteristics can be obtained than by demultiplexing a spatially multiplexed signal into transmission signals in one stage by means of ZF, MMSE, or the like. The reason is that, while diversity gain due to reception by a plurality of antennas is lost when a spatially multiplexed signal is subjected to signal demultiplexing by means of linear processing such as ZF or MMSE, when this configuration is used, MLD can be employed on a group-by-group basis after demultiplexing into groups is performed by first signal demultiplexing section 2630, enabling 2-branch diversity gain to be obtained.

If a degree-of-multiplexing-4 signal is demultiplexed directly by means of MLD in 4×6 spatial multiplexing transmission, 6-branch diversity gain is obtained, but when a modulation method with many signal points such as 16QAM or 64QAM is used, the number of signal points increases dramatically, making implementation with a practical hardware scale difficult.

Also, if transmission is performed after multiplication by a transmission weight based on channel matrix singular value decomposition, eigenvalue decomposition of a matrix comprising the product of a channel matrix and its Hermitian conjugate, or the like, optimal reception characteristics can be obtained on the receiving side without using MLD, but implementation is difficult because of the necessity of channel matrix feedback to the transmitting side and singular value decomposition or eigenvalue decomposition computations.

In contrast, with this embodiment, second signal demultiplexing section 2640 is provided with two signal demultiplexing sections 2641, and the configuration subsequent to first signal demultiplexing section 2630 comprises independent reception systems (2×3 MIMO reception systems) that receive degree-of-multiplexing-2 spatially multiplexed signals, composed of a signal demultiplexing section 2641, demodulation sections 251, and deinterleavers 252 for first group use, and a signal demultiplexing section 2641, demodulation sections 251, and deinterleavers 252 for second group use. The configuration is not limited to this, and a configuration may also be employed in which one 2×3 MIMO reception system is used by the first group and second group on a time division basis.

By using the above-described configuration, adding first signal demultiplexing section 230 to a 2×3 MIMO reception system enables a circuit configuration (4×6 MIMO reception system) to be implemented that receives a degree-of-multiplexing-4 spatially multiplexed signal. Also, in this case, it is possible to implement a configuration whereby input to second signal demultiplexing section 2640 is switched sequentially by providing a suitable indicator (transmission sequence permissible delay amount, data classification, or the like) based on the transmission sequence QoS, and setting priorities for performing reception processing for each group after first signal demultiplexing. This enables an effect of simplifying the configuration of radio communication apparatus 2600 to be obtained.

In this embodiment, first signal demultiplexing section 2630 is configured so as to perform signal demultiplexing with $x_1(k)$ and $x_2(k)$ as the first group and $x_3(k)$ and $x_4(k)$ as the second group, but the sets of transmission sequences $x_n(k)$ contained in the groups may be different. For example, if a configuration is employed in which two transmission sequences for which the QoS is the same or almost the same are made one group, and an appropriate signal demultiplexing section 2641 is used based on the transmission sequence QoS, MLD can be used in the signal demultiplexing section 2641 for a group composed of transmission sequences with a high QoS, and MMSE can be used in the signal demultiplexing section 2641 for a group of transmission sequences with a low QoS.

The methods described earlier in Embodiment 1 may also be used in first signal demultiplexing section 2630 as an evaluation criterion for determining the sets of transmission sequences $x_n$ making up groups.

While this embodiment has been described using the configuration in FIG. 36, the receiver configuration is not limited to this. Application is also possible in the same way to the first signal demultiplexing section in a configuration using an interference canceller such as described in Embodiment 2. Application is also possible in the same way to the first signal demultiplexing section in a configuration using space-time coding such as described in Embodiment 3 and Embodiment 9. Application is also possible in the same way to the first signal demultiplexing section in a configuration using a multicarrier communication method such as described in Embodiment 4. Application is also possible in the same way to the first signal demultiplexing section in a configuration in which the number of encoders differs such as described in Embodiment 5. Application is also possible in the same way to the first signal demultiplexing section in a configuration in which diversity combining is performed such as described in Embodiment 6. Application is also possible in the same way to the first signal demultiplexing section in a configuration in which signal point reduction is performed such as described in Embodiment 7. And application is also possible in the same way to the first signal demultiplexing section in a configuration using weight multiplication such as described in Embodiment 8.

The disclosures of Japanese Patent Application No. 2006-099973, filed on Mar. 31, 2006, and Japanese Patent Application No. 2007-85225, filed on Mar. 28, 2007, including the specifications, drawings and abstracts, are incorporated herein by reference in their entirety.

Industrial Applicability

A MIMO receiving apparatus and MIMO communication system of the present invention are useful in enabling the hardware scale to be kept small even if the number of antennas used for MIMO communication increases.

The invention claimed is:

1. A Multi-Input Multi-Output (MIMO) receiving apparatus comprising:
a receiving section that receives a degree-of-multiplexing-N spatially multiplexed signal in which mutually different transmission signals are spatially multiplexed via a plurality of propagation paths, where N is a number of the mutually different transmission signals;
a first signal demultiplexing section that executes linear computation on the received spatially multiplexed signal and demultiplexes the received spatially multiplexed signal into groups of spatially multiplexed signals, each group comprising a number of the transmission signals smaller than N;
a second signal demultiplexing section that demultiplexes the spatially multiplexed signal of each group into each transmission signal contained in the spatially multiplexed signal;
a first signal processing section that processes the demultiplexed transmission signals;
a replica generation section that generates a replica of each transmission signal after processing by the first signal processing section, multiplies each replica by a propagation path estimate of the transmission signal corresponding to each replica, and generates a reception-time replica of the transmission signal;
a subtraction section that subtracts the reception-time replicas corresponding to other transmission signals other than a desired transmission signal from the groups of spatially multiplexed signals demultiplexed by the first signal demultiplexing section to obtain the desired transmission signal;
a combining section that performs diversity combining of the desired transmission signal obtained from the spatially multiplexed signal of each propagation path; and
a second signal processing section that processes a transmission signal obtained after the diversity combining.

2. A Multi-Input Multi-Output (MIMO) receiving apparatus comprising:
a receiving section that receives a degree-of-multiplexing-N spatially multiplexed signal in which mutually different transmission signals are spatially multiplexed via a plurality of propagation paths, where N is a number of the mutually different transmission signals;
a first signal demultiplexing section that executes linear computation on the received spatially multiplexed signal and demultiplexes the received spatially multiplexed signal into groups of spatially multiplexed signals, each group comprising a number of the transmission signals smaller than N;
a second signal demultiplexing section that demultiplexes the spatially multiplexed signal of each group into each transmission signal contained in the spatially multiplexed signal;
a first signal processing section that processes the demultiplexed transmission signals;
a third signal demultiplexing section that demultiplexes one of the spatially multiplexed signals into each transmission signal contained in the spatially multiplexed signal after reducing candidate signal points of the spatially multiplexed signal of each propagation path using a signal obtained after processing by the first signal processing section; and
a second signal processing section that processes the transmission signal demultiplexed by the third signal demultiplexing section.

3. The MIMO receiving apparatus according to claim 2, wherein the third signal demultiplexing section reduces candidate signal points of the spatially multiplexed signals of different groups.

4. The MIMO receiving apparatus according to claim 2, wherein the third signal demultiplexing section reduces a number of bits when a transmission signal contained in the spatially multiplexed signal undergoes M-ary modulation on a transmitting side.

* * * * *